(12) United States Patent
Greene

(10) Patent No.: US 6,636,215 B1
(45) Date of Patent: Oct. 21, 2003

(54) HARDWARE-ASSISTED Z-PYRAMID CREATION FOR HOST-BASED OCCLUSION CULLING

(75) Inventor: Edward C. Greene, Portola Valley, CA (US)

(73) Assignee: NVIDIA Corporation, Santa Clara, CA (US)

( * ) Notice: Subject to any disclaimer, the term of this patent is extended or adjusted under 35 U.S.C. 154(b) by 372 days.

(21) Appl. No.: 09/802,684

(22) Filed: Mar. 9, 2001

Related U.S. Application Data

(63) Continuation-in-part of application No. 09/121,317, filed on Jul. 22, 1998, now Pat. No. 6,480,205.
(60) Provisional application No. 60/188,052, filed on Mar. 9, 2000.

(51) Int. Cl.[7] ............................................. G06T 15/00

(52) U.S. Cl. ..................................................... 345/422

(58) Field of Search ................................ 345/419, 420, 345/422, 421, 581, 582, 619, 625

(56) References Cited

U.S. PATENT DOCUMENTS

| | | | |
|---|---|---|---|
| 5,509,110 A | 4/1996 | Latham | 395/121 |
| 5,579,455 A | 11/1996 | Greene et al. | 395/122 |
| 5,613,050 A | 3/1997 | Hochmuth et al. | 395/122 |
| 6,014,472 A | 1/2000 | Minami et al. | 382/285 |
| 6,480,205 B1 * | 11/2002 | Greene et al. | 345/631 |

OTHER PUBLICATIONS

J. Airey, "Increasing Update Rates in the Building Walk-through System with Automatic Model–Space Subdivision and Potentially Visible Set Calculations," PhD Thesis, Technical Report TR90–027, Computer Science Dept., UNC Chapel Hill, 1990.

D. Bartz, M. Meißner, and T. Hüttner, "Extending Graphics Hardware For Occlusion Queries In OpenGL," To appear in the Eurographics/SIGGRAPH workshop on graphics hardware, 1998, University of Tübingen.

L. Carpenter, "The A–Buffer, an Antialiased Hidden Surface Method," Proc. of SIGGRAPH '84, Computer Graphics, vol. 18, No. 3, Jul. 1984, pp.: 103–108.

J. Clark, "Hierarchical Geometric Models for Visible Surface Algorithms," Communications of the ACM, vol. 19, No. 10, Oct. 1976, pp. 296–303.

S. Coorg and S. Teller, "Temporally Coherent Conservative Visibility," Proc. Of 12th ACM Symposium on Computational Geometry, 1996, pp.: 78–87.

M. Cox and P. Hanrahan, "Pixel Merging for Object–Parallel Rendering: a Distributed Snooping Algorithm," Parallel Rendering Symposium, 1993, pp.: 49–56.

M. Deering, S. Schlapp, and M. Lavelle, "FBRAM: A new Form of Memory Optimized for 3D Graphics," Proc. of SIGGRAPH '94, Jul. 1994, pp.: 167–174.

(List continued on next page.)

*Primary Examiner*—Phu K. Nguyen
(74) *Attorney, Agent, or Firm*—Silicon Valley IP Group, PC; Kevin J. Zilka

(57) ABSTRACT

Roughly described, the invention is employed within a z-buffer-system having a host processor and graphics hardware that performs hierarchical z-buffering. The z-buffer system renders three-dimensional scenes having geometric primitives that are organized in bounding boxes or rooms-with-portals. As an image is being generated, some but not all z-pyramid values are written from the graphics system into memory that can be quickly accessed by the host processor. This enables the host processor to perform visibility tests that cull occluded bounding boxes or portals, thereby accelerating rendering by reducing the number of primitives that need to be sent to graphics hardware and processed.

63 Claims, 29 Drawing Sheets

OTHER PUBLICATIONS

H. Fuchs, J. Goldfeather, J. Hultquist, S. Spach, J. Austin, F. Brooks, Jr., J. Eyles, and J. Poulton, "Fast Spheres, Shadows, Textures, Transparencies, and Image Enhancements in Pixel–Planes," Proc. of SIGGRAPH '85, Jul. 22–26, 1985, pp.: 111–120, vol. 19, No. 3.

T. Funkhouser and C. Séquin, "Adaptive Display Algorithm for Interactive Frame Rates During Visualization of Complex Virtual Environments," Proc. of SIGGRAPH '93, Aug. 1–6, 1993, pp.: 247–254.

B. Garlick, D. Baum, and J. Winget, "Interactive Viewing of Large Geometric Databases Using Multiprocessor Graphics Workstations," SIGGRAPH '90, Course Notes #28 (Parallel Algorithm and Architectures for 3D Image Generation).

N. Greene, "Hierarchical Polygon Tiling with Coverage Masks," Proc. of SIGGRAPH '96, Aug. 1996, pp. 65–74.

N. Greene, "Hierarchical Rendering of Complex Environments," PhD Thesis, Univ. of California at Santa Cruz, Report UCSC CRL–95–27, Jun. 1995.

N. Greene, M. Kass, and G. Miller, "Hierarchical Z–Buffer Visibility," Proc. of SIGGRAPH '93, Aug. 1–6, 1993, pp.: 231–238.

N. Greene, "Occlusion Culling with Optimized Hierarchical Z–Buffering," SIGGRAPH Technical Sketch, SIGGRAPH '99 Conference Abstracts and Applications, Aug. 1999.

N. Greene, "Optimized Hierarchical Occlusion Culling for Z–Buffer Systems," SIGGRAPH '99 Conference Abstracts and Applications CD–ROM, Aug. 1999.

S.–Y. Guan, A. Bleiweiss, and R. Lipes, "Parallel Implementation of Volume Rendering on Denali Graphics Systems," Parallel Processing Symposium, 1995, pp.: 700–706.

H. Hoppe, "Progressive Meshes," Proc. of SIGGRAPH '96, Aug. 4–9, 1996, pp.: 99–108.

T. Hudson, D. Manocha, J. Cohen, M. Lin, K. Hoff, and H. Zhang, "Accelerated Occlusion Culling using Shadow Frusta," Proc. of ACM Symposium on Computational Geometry, 1997.

Intel Corporation, "Accelerated Graphics Port Interface Specification," Revision 2.0, May 4, 1998.

D. Luebke and C. Georges, "Portals and Mirrors: Simple, Fast Evaluation of Potentially Visible Sets," Symposium on Interactive 3D Graphics, 1995, pp. 105–106, 212.

D. Meagher, "The Octree Encoding Method for Efficient Solid Modeling," PhD Thesis, Electrical Engineering Dept., Rensselaer Polytechnic Institute, Troy, New York, Aug. 1982.

B. Naylor, "Partitioning Tree Image Representation and Generation from 3D Geometric Models," Proc. of Graphics Interface, 1992.

N. Scott, D. Olsen, and E. Gannett, "An Overview of the VISUALIZE fx Graphics Accelerator Hardware," The Hewlett–Packard Journal, May 1998, pp.: 28–34.

O. Sudarsky and C. Gotsman, "Dynamic Scene Occlusion Culling," IEEE Transactions on Visualization and Computer Graphics, vol. 5, No. 1, Jan.–Mar. 1999, pp.: 13–29.

S. Teller, "Visibility Computations in Densely Occluded Polyhedral Environments," PhD Thesis, Univ. of California at Berkeley, Report UCB/CSD 92/708, Oct. 1992.

J. Warnock, "A Hidden Surface Algorithm for Computer Generated Halftone Pictures," PhD Thesis, Technical Report TR 4–15, Computer Science Dept., Univ. of Utah, Jun. 1969.

F. Xie and M. Shantz, "Adaptive Hierarchical Visibility in a Tiled Architecture," Proc. Eurographics/SIGGRAPH Workshop on Graphics Hardware, Aug. 1999, pp.: 75–84.

H. Zhang, "Effective Occlusion Culling for the Interactive Display of Arbitrary Models," PhD Thesis, Computer Science Dept., UNC Chapel Hill, 1998.

H. Zhang, D. Manocha, T. Hudson, and K. Hoff, "Visibility Culling using Hierarchical Occlusion Maps," Proc. of SIGGRAPH '97, Aug. 3–8, 1997, pp.: 77–88.

* cited by examiner

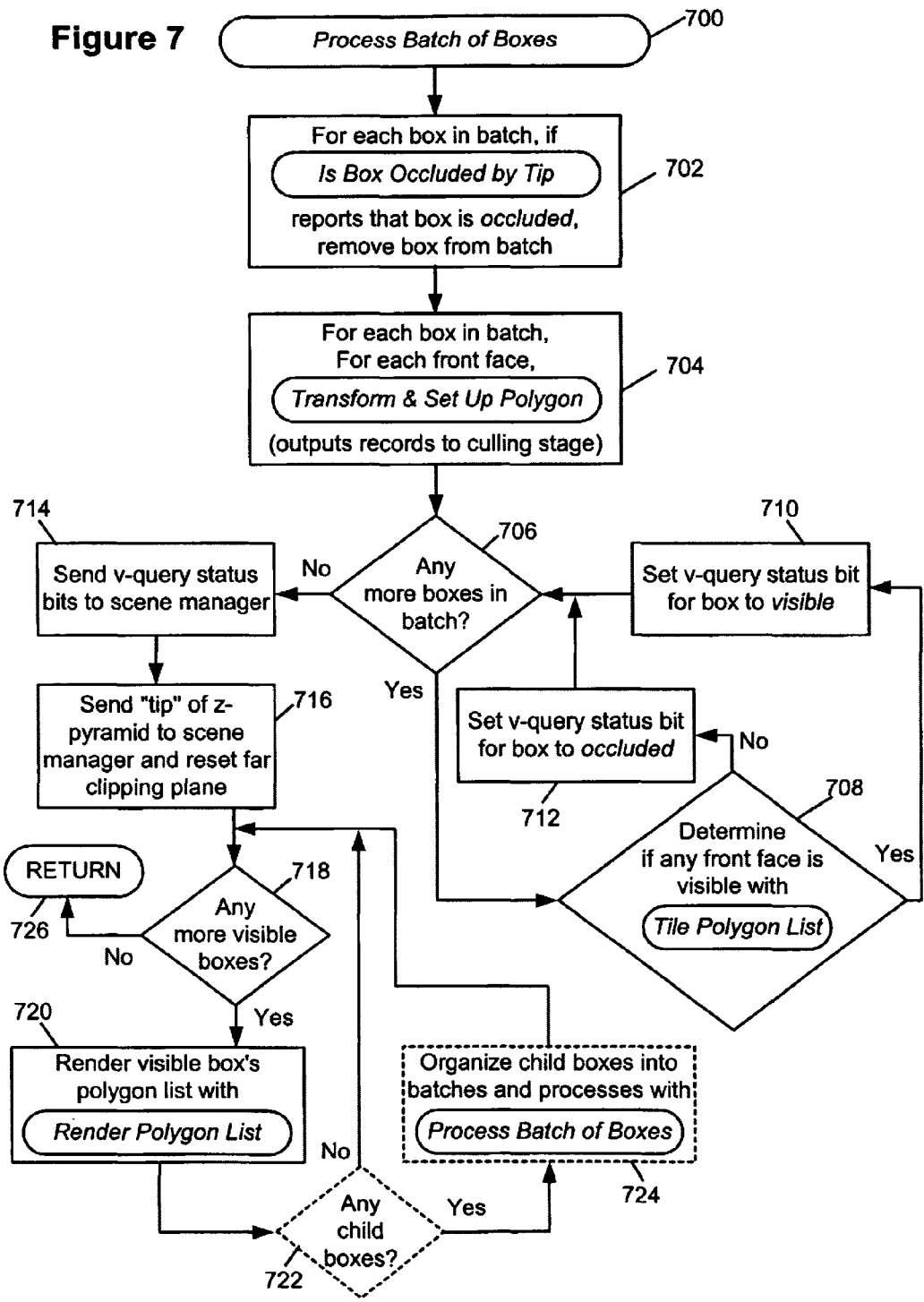

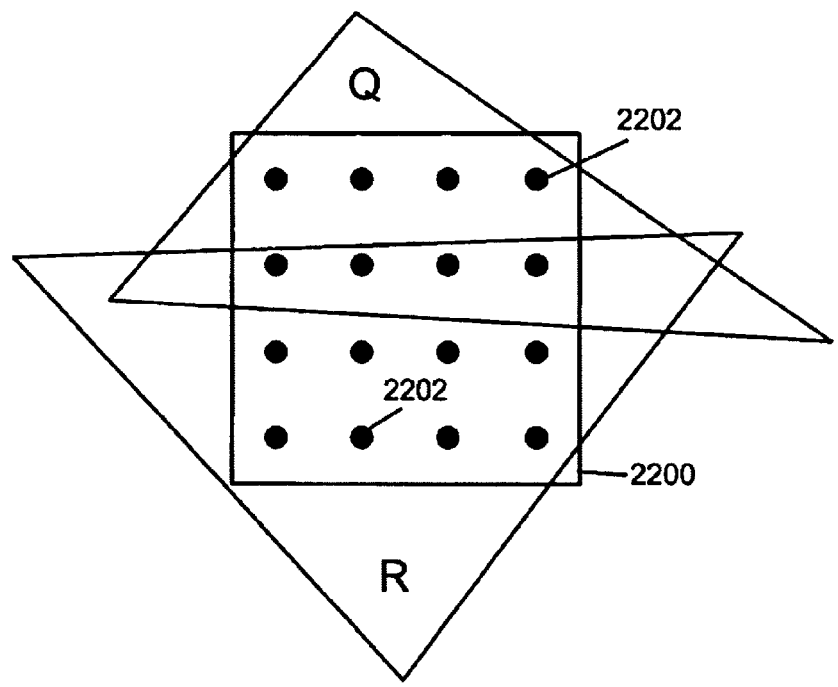
Figure 22a
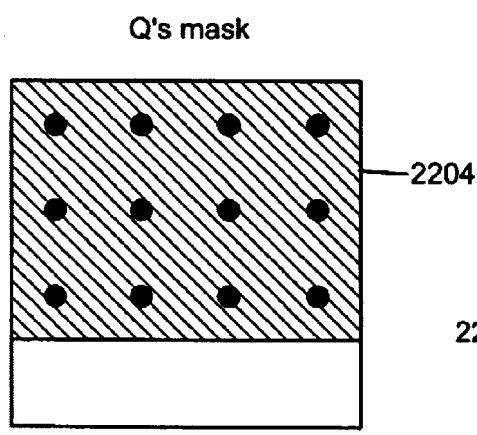 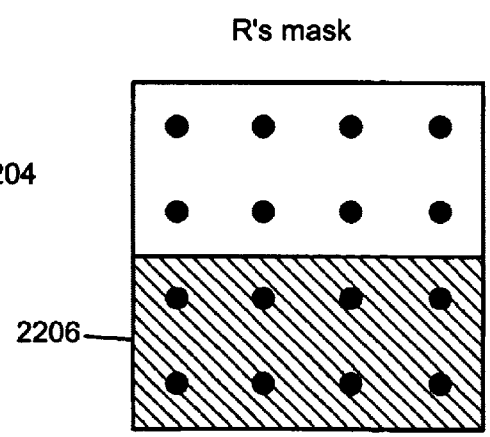
Figure 22b Figure 22c

HARDWARE-ASSISTED Z-PYRAMID CREATION FOR HOST-BASED OCCLUSION CULLING

CROSS-REFERENCE TO OTHER APPLICATIONS

This application claims priority to U.S. Provisional Application No. 60/188,052, filed Mar. 9, 2000, which is incorporated by reference herein.

This application is also a Continuation-in-Part of U.S. patent application Ser. No. 09/121,317, filed Jul. 22, 1998 now U.S. Pat. No. 6,480,205 the disclosure of which is incorporated herein by reference.

BACKGROUND OF THE INVENTION

1. Field of the Invention

The invention, generally, relates to computer graphics and, more particularly, to a new and improved method and apparatus for rendering images of three-dimensional scenes using z-buffering.

2. References

The following documents are all incorporated herein by reference.

J. Airey, "Increasing Update Rates in the Building Walkthrough System with Automatic Model-Space Subdivision and Potentially Visible Set Calculations," PhD Thesis, Technical Report TR90-027, Computer Science Dept., UNC Chapel Hill, 1990.

L. Carpenter, "The A-Buffer, an Antialiased Hidden Surface Method," Proc. of SIGGRAPH '84, July 1984, 103–108.

J. H. Clark, "Hierarchical Geometric Models for Visible Surface Algorithms," Communications of the ACM 19(10), October 1976, 547–554.

S. Coorg and S. Teller, "Temporally Coherent Conservative Visibility," Proc. Of $12^{th}$ ACM Symposium on Computational Geometry, 1996.

M. Deering, S. Schlapp, and M. Lavelle, "FBRAM: A new Form of Memory Optimized for 3D Graphics," Proc. of SIGGRAPH '94, July 1994, 167–174.

Jay Duluk, personal communication, 1999.

H. Fuchs, J. Goldfeather, J. Hulquist, S. Spach, J. Austin, F. Brooks, Jr., J. Eyles, and J. Poulton, "Fast Spheres, Shadows, Textures, Transparencies, and Image Enhancements in Pixel-Planes," Proc. of SIGGRAPH '85, July 1985, 111–120.

T. Funkhouserand C. Sequin, "Adaptive Display Algorithm for Interactive Frame Rates During Visualization of Complex Virtual Environments," Proc. of SIGGRAPH '93, August 1993, 247–254.

B. Garlick, D. Baum, and J. Winget, "Interactive Viewing of Large Geometric Databases Using Multiprocessor Graphics Workstations," Siggraph '90 Course Notes: Parallel Algorithms and Architectures for 3D Image Generation, 1990.

N. Greene, M. Kass, and G. Miller, "Hierarchical Z-Buffer Visibility," Proc. of SIGGRAPH '93, July 1993, 231–238.

N. Greene, "Hierarchical Rendering of Complex Environments," PhD Thesis, Univ. of California at Santa Cruz, Report UCSC CRL-95-27, June 1995.

N. Greene, "Hierarchical Polygon Tiling with Coverage Masks," Proc. of SIGGRAPH '96, August 1996.

H. Hoppe, "Progressive Meshes," Proc. of SGGRAPH '96, August 1996, 99–108.

T. Hudson, D. Manocha, J. Cohen, M. Lin, K. Hoff, and H. Zhang, "Accelerated Occlusion Culling Using Shadow Frusta," Proc. Of ACM Symposium on Computational Geometry, 1997.

Adam Levinthal, personal communication, 1999.

D. Luebke and C. Georges, "Portals and Mirrors: Simple, Fast Evaluation of Potentially Visible Sets," ACM Interactive 3D Graphics Conference, 1995.

D. Meagher, "The Octree Encoding Method for Efficient Solid Modeling," PhD Thesis, Electrical Engineering Dept., Rensselaer Polytechnic Institute, Troy, N.Y., August 1982.

B. Naylor, "Partitioning Tree Image Representation and Generation from 3D Geometric Models," Proc. of Graphics Interface, 1992.

N. Scott, D. Olsen, and E. Gannett, "An Overview of the VISUALIZE fx Graphics Accelerator Hardware," The Hewlett-Packard Journal, 49(2), May 1998, 28–34.

O. Sudarsky and C. Gotsman, "Dynamic Scene Occlusion Culling," IEEE Transactions on Visualization and Computer Graphics, 5(1), January 1999.

Gary Tarolli, personal communication, 1999.

S. Teller, "Visibility Computations in Densely Occluded Polyhedral Environments," PhD Thesis, Univ. of California at Berkeley, Report UCB/CSD 92/708, October 1992.

"Denali Technical Overview," Kubota Pacific Computer, January 1993.

J. Warnock, "A Hidden Surface Algorithm for Computer Generated Halftone Pictures," PhD Thesis, TR 4-15, Computer Science Dept., Univ. of Utah, June 1969.

F. Xie and M. Shantz, "Adaptive Hierarchical Visibility in a Tiled Architecture," Proc. Eurographics/Siggraph Workshop on Graphics Hardware, August 1999, 75–84.

H. Zhang, D. Manocha, T. Hudson, and K. Hoff, "Visibility Culling Using Hierarchical Occlusion Maps," Proc. of SIGGRAPH '97, August 1997, 77–88.

H. Zhang, "Effective Occlusion Culling for the Interactive Display of Arbitrary Models," PhD Thesis, Computer Science Dept., UNC Chapel Hill, 1998.

3. Description of Related Art

Rendering is the process of making a perspective image of a scene from a stored geometric model. The rendered image is a two-dimensional array of pixels, suitable for display.

The model is a description of the objects to be rendered in the scene stored as graphics primitives, most typically as mathematical descriptions of polygons in three-dimensional space, together with other information related to the properties of the polygons. Part of the rendering process is the determination of occlusion, whereby the objects and portions of objects which are occluded from view by other objects in the scene are eliminated.

As the performance of polygon-rendering systems advances, the range of practical applications grows, fueling demand for ever more powerful systems capable of rendering ever more complex scenes. There is a compelling need for low-cost high-performance systems capable of handling scenes with high depth complexity, i.e., "densely occluded" scenes (for example, a scene in which ten polygons overlap on the screen at each pixel, on average).

In a typical z-buffer system for rendering polygons, each polygon in the scene is rasterized using a z-buffer to determine visibility at image samples. In many systems a host processor takes advantage of hardware assistance by sending each polygon in the scene on a bus to graphics hardware that rasterizes the polygon and maintains the z-buffer. Other z-buffer systems employ hierarchical z-buffering, which uses a "z-pyramid" instead of a conventional single-level z-buffer, as described in N. Greene, M. Kass, and G. Miller, "Hierarchical Z-Buffer Visibility," Proceedings of SIGGRAPH '93, July 1993, pages 231–238, incorporated by reference herein. Hierarchical z-buffering can be very expensive to implement in its full form in hardware, so implementations of this algorithm in the past have maintained the z-pyramid and performed z-buffer visibility checking entirely in software.

As an alternative to hardware implementation of a full z-pyramid, some systems use only a two-level z-pyramid which includes just the two finest-resolution levels of a full z-pyramid. For example, some flight simulators use a two-level z-pyramid in which the coarser level contains "zfar" values for rectangular regions of the screen. The rectangular screen regions are called "spans." Having spans enables "skip over" of regions where a primitive is occluded over an entire span.

Another alternative to conventional hierarchical z-buffering is to separate culling from rendering in a hardware graphics pipeline by employing a culling stage that culls occluded geometry and passes visible geometry on to be rendered by a conventional z-buffer rendering stage. See N. Greene, *Occlusion Culling with Optimized Hierarchical Z-Buffering*, Siggraph Technical Sketch, Siggraph '99 Conference Abstracts and Applications, August 1999; and N. Greene, *Optimized Hierarchical Occlusion Culling for Z-Buffer Systems*, Siggraph '99 Conference Abstracts and Applications CD-ROM, August 1999, both incorporated by reference herein. This method is also described in the above-incorporated CIP parent patent application.

There is presently an obstacle to achieving high performance in processing densely occluded scenes. Typically, all "on-screen" polygons in the scene are processed one-by-one by the host and sent on a bus to graphics hardware, which also processes polygons one by one. This is particularly inefficient for densely occluded scenes, because most polygons are occluded, and even the occluded polygons need to be sent on the bus, transformed to image space, and processed in other ways.

In the prior art, this problem has been addressed by organizing the model in three-dimensional bounding boxes and having the host processor cull occluded bounding boxes. With this approach, which will be called "box culling," only the polygons in visible bounding boxes need to be sent through the hardware rendering pipeline, thereby reducing bus traffic, transformation, rasterization, and other computations on polygons.

Another prior-art method, which is sometimes used to cull occluded regions of architectural models, is to organize the scene as "rooms with portals." See Seth Teller, "Visibility Computations in Densely Occluded Polyhedral Environments," PhD Thesis, Univ. of California at Berkeley, Report UCB/CSD 92/708, October 1992; John Airey, "Increasing Update Rates in the Building Walkthrough System with Automatic Model-Space Subdivision and Potentially Visible Set Calculations," PhD Thesis, Technical Report TR90-027, Computer Science Dept., UNC Chapel Hill, 1990; and Tom Funkhouser and Carlo Sequin, "Adaptive Display Algorithm for Interactive Frame Rates During Visualization of Complex Virtual Environrents," *Proc. of SIGGRAPH* '93, August 1993, 247–254, all incorporated herein by reference. The term "portal" applies to apertures such as doors and windows. Room-to-room visibility relationships are computed and then stored for future reference. When rendering a frame, the "room" containing the viewpoint is determined, and the primitives composing this room are rendered. For all other rooms, the room is rendered only if one of its portals is visible.

While box culling can improve z-buffer rendering efficiency of densely occluded scenes, such methods have been mostly limited to all-software implementations. This is because where hardware assisted z-buffer rendering is available, the z-buffer is maintained entirely in the hardware. The z-buffer typically is quickly accessible to the host processor for visibility testing of bounding boxes or room portals. In some systems the host can read graphics memory over a bus for the purpose of occlusion testing, but this is a slow and laborious process that rarely improves rendering efficiency.

Some systems read the entire z-buffer from graphics memory into host memory in order to facilitate box culling or rooms-with-portals culling in software by the host processor. For example, N. Greene, M. Kass, and G. Miller, "Hierarchical Z-Buffer Visibility," *Proc. of SIGGRAPH* '93, July 1993, 231–238, incorporated by reference herein, describes a temporal coherence algorithm in which, after each frame is rendered by conventional z-buffer hardware, the host processor reads the entire full-resolution z-buffer from graphics memory into host memory. The host processor then, in software, forms a z-pyramid from the depth information just read, and uses it to perform preliminary software-only box culling for the next frame. While such a system can improve rendering efficiency for densely occluded scenes with strong temporal coherence, it does so at the expense of enormous bandwidth requirements for copying the z-buffer from graphics memory to host memory. In a typical graphics system having an image resolution of 1000×1000 pixels, at 24 bits of depth information per pixel, and in which a frame rate of 50 Hz is desired, this method requires 150 MByte/sec of bandwidth just for copying depth values—and this does not even allow for processing time on the host. Copying the z-buffer significantly more often than once per frame would be too slow for contemporary real time systems.

To provide hardware assistance for box culling and rooms-and-portals culling, some graphics accelerators support "visibility queries" on bounding boxes and portals. These systems maintain a conventional one-level z-buffer in the graphics hardware. To determine whether a bounding box is visible, the host sends a description of the box to the graphics hardware, which tests its front faces against the z-buffer to determine whether the box is visible at one or more image samples. The visibility status of the box is then reported back to the host processor. The operations just described are referred to herein as a "visibility query" on a bounding box. Visibility queries on portals are analogous.

The use of visibility queries to cull occluded bounding boxes and rooms is supported by graphics accelerators that were once made by Kubota Pacific (see "Denali Technical Overview," Kubota Pacific Computer, January 1993, incorporated by reference herein) and graphics accelerators that are currently made by Hewlett-Packard. (See N. Scott, D. Olsen, and E. Gannett, "An Overview of the VISUALIZE fx Graphics Accelerator Hardware," *The Hewlett-Packard Journal*, 49(2), May 1998, pages 28–34, incorporated by reference herein).

One major problem with prior-art systems that employ hardware-assisted visibility queries is that there is a substantial delay between when the host processor issues a visibility query and when it receives a reply, and in the meantime, it is not known if the primitives within the corresponding box or room need to be processed. This uncertainty makes efficient scene management problematic. If the processor waits for the query reply before processing the associated primitives, time is wasted. If instead the processor goes ahead and sends the primitives through the pipeline, the processing devoted to these primitives will be wasted if the box turns out to be occluded.

Significant communication delays are fundamental to this method of performing hardware-assisted visibility queries because pipeline queues often contain numerous primitives. If boxes wait their turn in queues, delays are long, and if queues are skipped over, culling efficiency is impaired because the z-buffer used to test visibility is not up to date. Consequently, in many cases, culling with hardware-assisted visibility queries is not an effective way to accelerate rendering of densely occluded scenes.

A second problem with hardware-assisted visibility queries in z-buffer systems is that when a scene's bounding boxes overlap deeply on the screen, testing boxes for visibility with an ordinary z-buffer requires a great deal of rasterization. It is much more efficient to test boxes for visibility with hierarchical z-buffering.

Hence, there is a need for a graphics architecture which enables hardware-assisted culling of occluded bounding boxes and portals without incurring substantial communication delays.

SUMMARY OF THE INVENTION

The invention is based in part on the discovery that for many densely occluded scenes, the vast majority of occluded geometries can be culled successfully using only a tiny percentage of the depth information in a full z-pyramid.

Roughly described, the invention involves az-buffer system having a host processor and graphics hardware that maintains z values in a pyramid having at least two levels. To enable the host processor to cull occluded parts of the scene, the system copies only the tip of the z-pyramid into host memory. The host processor is then able to perform bounding box (or other) culling itself, very efficiently, before sending polygons to the graphics hardware for rendering. As in prior art systems that copy an entire z-buffer to host memory, by culling occluded geometries on the host, the system is able to greatly reduce memory and bus traffic requirements in sending geometric information to the hardware for processing. But because the host uses only a very small amount of depth information, representing only the tip of a z-pyramid, to perform its culling, bandwidth requirements for copying such information from graphics memory into host memory are drastically reduced. In addition, the communication delays inherent in a system that performs hardware-assisted visibility queries is also avoided.

In a system whose graphics hardware creates and maintains a full z-pyramid, as much as 90% or more of occluded geometries in a densely occluded scene often can be culled using a z-pyramid tip containing less than 1% of the data in the z-pyramid, copied to the host on the order of 20–30 times per rendered frame. Most graphics accelerators today, however, do not maintain a full z-pyramid. Such systems maintain only a conventional single-level z-buffer, or at most a pyramid containing only two levels of resolution. It will be appreciated, however, that any reduction of the amount of depth information written into host memory is a significant improvement over the copying of an entire z-buffer. Thus where one or more coarser resolution levels of depth information is available, some benefits can be obtained by copying only the coarser resolution level or levels to host memory for pre-culling of geometries. Where the hardware does not maintain depth information at a resolution level that is as coarse as desired for writing to the host, the graphics hardware can create the information at that level "on-the-fly" as needed for writing to the host. If desired, the host processor can then form even coarser levels of the z-pyramid by itself in software.

BRIEF DESCRIPTION OF THE DRAWINGS

FIG. 6 is a block diagram of a first variation of a culling and rendering subsystem.

FIG. 7 is a flowchart of the method for processing a batch of bounding boxes.

FIG. 22a is an illustration of a 4×4 tile covered by two triangles.

FIG. 22b is an illustration of the coverage mask of triangle Q in FIG. 22a.

FIG. 22c is an illustration of the coverage mask of triangle R in FIG. 22a.

DETAILED DESCRIPTION

Figure 1:
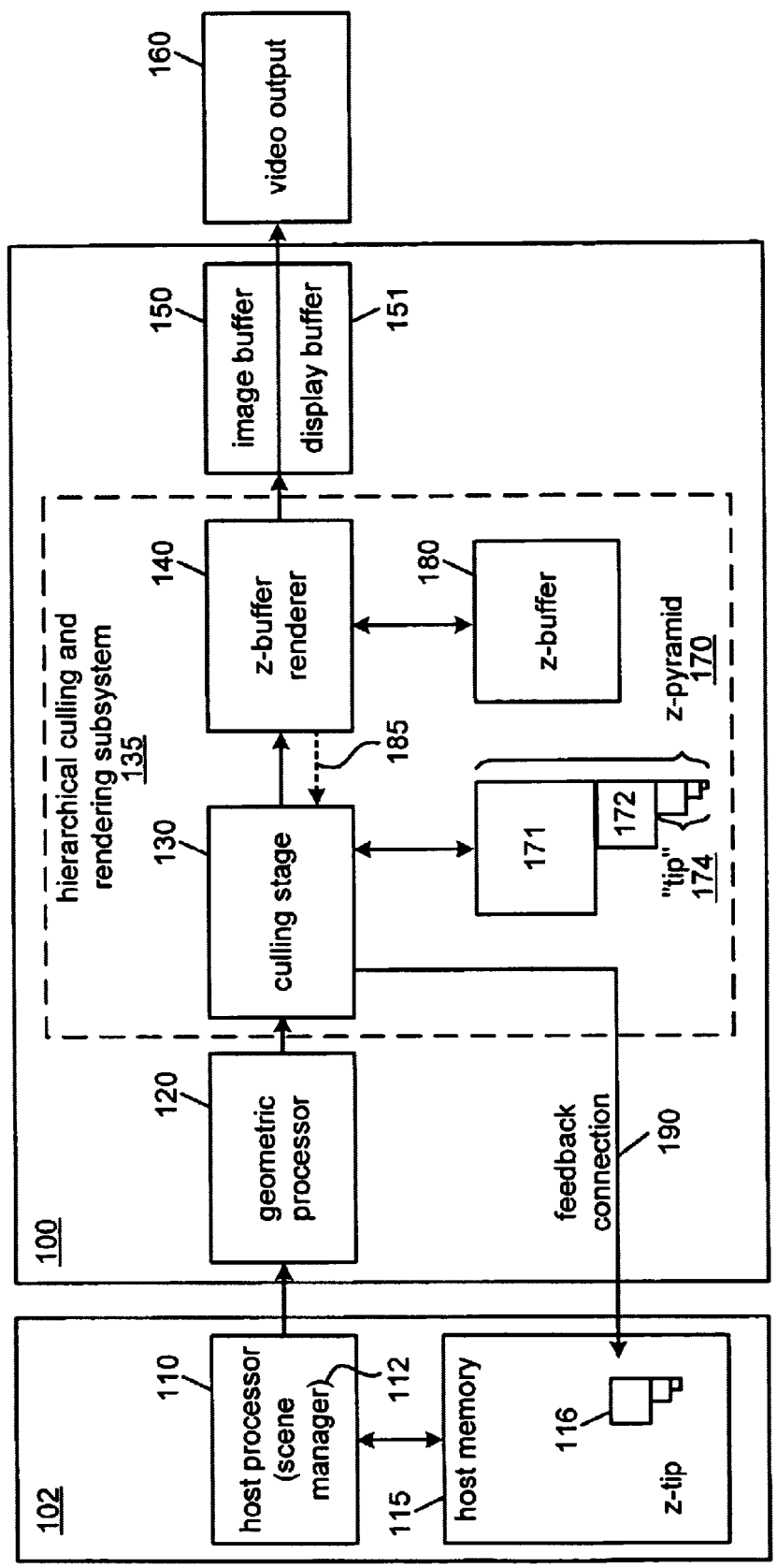
FIG. 1 is a block diagram of the preferred embodiment of the invention.

In a preferred embodiment of the invention, the graphics pipeline separates the culling of occluded geometry from the rendering of visible geometry, so that culling operations can be optimized independently. Thus, a separate culling stage in the graphics pipeline culls occluded geometry and passes visible geometry on to a rendering stage.

The culling stage maintains its own z-pyramid in which z-values are stored at low precision in order to reduce storage requirements and memory traffic. For example, z-values may be stored as 8-bit values instead of the customary 24-bit or 3 2-bit values. Alternatively, depth information can be stored in so-called "mask-zfar" data structures which require less storage than a z-pyramid consisting of arrays of z-values. The "mask-zfar" data structure is described in detail herein and in the parent patent application. Other aspects and variations of structures and methods that can benefit from the present invention are also set forth in the parent patent application.

Definitions

Culling procedures that may fail to cull occluded geometry but never cull visible geometry are defined as "conservative."

Z-buffering, also sometimes referred to herein as depth buffering, determines which scene primitive is visible at each sample point on an "image raster."

Each sample point on the image raster is defined as an "image sample," and the depth at an image sample is called a "depth sample."

A conventional, single level z-buffer maintains at least one depth sample for each point in the image raster. If individual points in the image raster correspond to individual pixels, it is referred to as "point sampling."

An alternative is to maintain multiple depth samples within each pixel to permit antialiasing by oversampling and filtering. Thus it is possible for a depth buffer to have a resolution which is finer than that of the ultimate image.

A "z-pyramid" is a depth buffer having at least two levels of hierarchy—that is, the term excludes a conventional single-level depth buffer, whether point-sampled or oversampled. A "z-pyramid" is a form of "hierarchical depth buffer," and is sometimes referred to herein simply as a pyramid.

A "cell" in the z-pyramid is the region of the screen corresponding to a value in the z-pyramid. Preferably, at the finest level of the z-pyramid, cells correspond to depth samples-depths at pixels when point sampling and depths at subpixel samples when oversampling. At coarser levels of the z-pyramid, cells typically correspond to square regions of the screen, as with image pyramids in general.

N×N decimation from level to level of the z-pyramid is used in embodiments described herein. N×N blocks of cells that are implicit in the structure of the z-pyramid are identified as "tiles" or "N×N tiles."

Each "tile" is an N×N array of "cells," which are "samples" at the finest level of the pyramid and square regions of the screen at coarser levels of the pyramid. An N×N tile at the finest level corresponds to a cell inside its "parent" tile at the next coarser level, and so on.

The terms "z-buffer" and "depth buffer" include both hierarchical depth buffers and conventional single-level depth buffers, as well as any other form of arrangement for holding information about pixel depth in an image being rendered. Note that these terms do not limit the encodings by which depth information is stored in the buffer. Any encoding mechanism will suffice, so long as the necessary depth information is present in one-form or another.

The "resolution" of a z-pyramids considered herein to be the resolution of its finest resolution level. Similarly, the resolution of any depth buffer is considered herein to be the resolution of its finest resolution level, which in the case of conventional single-level depth buffers, is the resolution of the single level. Also, if depth information is provided with a plurality of levels of progressively coarser resolution, even if provided over time instead of being stored at once in memory, the resolution of such depth information is considered herein to be the resolution of the finest resolution level of such depth information.

The "precision" of a depth buffer is the number of bits with which the buffer stores depth values. If not all depth values in a depth buffer share a common precision, then the depth buffer (or any given level of a depth pyramid) can still have an "average precision."

Although embodiments described herein assume that objects to be rendered by the graphics hardware are provided as polygons, the invention can also be applied to other types of geometric primitives, for example, quadric surfaces. The term "primitive" applies to all types of geometric primitives including polygons.

As used herein, the term "object" (or "geometric object") is more general than the term "primitive" (or "geometric primitive"), since it may refer to a primitive, abounding box, a face of a bounding box, and so forth.

The term "bounding box," sometimes herein shortened to "box," is applied to bounding volumes of any shape, including the degenerate case of a single polygon (thus, the term includes polygonal "portals" employed by some culling methods). #### A primitive, bounding box, or other geometric object is "occluded" if it is known to be occluded at all image samples that it covers, it is "visible" if it is known to be visible at one or more image samples, and otherwise, it is "potentially visible."

For convenience, in some cases, visible and potentially visible objects are collectively referred to as "visible."

Apparatus

FIG. 1 is a symbolic block diagram of a system incorporating the invention. The numeral 100 identifies a graphics system for rendering geometric models represented by polycons, and the numeral 102 identifies a host system in communication with the graphics system. The host system 102 system includes a scene manager 112 running in a host processor 110 which sends scene geometry to a geometric processor 120 in the graphics system 100. The geometric processor 120, in turn, transforms the geometry to perspective space and sends it on to a culling stage 130, which culls occluded geometry and passes visible polygons to a z-buffer rendering stage 140 which generates the output image in image buffer 150 which is converted to video format in a video output stage 160. In one embodiment, the graphics system 100 can operate in a mode in which no color values are written to image buffer 150 and no output image is created. Also in one embodiment, the image buffer 150 has a resolution equal to that of the ultimate screen image. In another embodiment, the graphics system 100 can operate in a mode in which the output image is anti-aliased by oversampling and filtering, in which case the image buffer can have finer resolution than the ultimate screen image. In the latter case, either the ultimate screen resolution image can be computed on-the-fly from the information in the image buffer 150, or the ultimate screen resolution image can be computed and stored in a separate display buffer 151, having the same resolution as the ultimate screen image, for subsequent conversion to video format.

Both the culling stage 130 and the z-buffer renderer 140 have their own dedicated depth buffers, a z-pyramid 170 in the case of the culling stage 130 and a conventional z-buffer 180 in the case of the z-buffer renderer 140. In one embodiment, the z-buffer 180 and the finest level of the z-pyramid 170 have the same resolution and the same arrangement of image samples.

A "feedback connection" 190 enables the graphics system 135 to report the visibility status of bounding boxes to the scene manager 112 and, also, to send z-pyramid z-values to the scene manager 112. As described in more detail hereinafter, preferably only the tip 174 of the z-pyramid 170 is sent to the scene manager 112. In addition, the ability to report visibility status on feedback connection 190 can often be omitted.

The culling stage 130 is optimized for very high-performance culling by performing hierarchical z-buffering using a dedicated z-pyramid 170 in which z-values are stored at low precision (for example, 8 bits per z-value) in order to conserve storage and memory bandwidth.

In addition to storing z-values at low precision, the culling stage 130 may also compute z-values at low precision to accelerate computation and simplify computational logic.

Since z-values in the z-pyramid 170 are stored at low precision, each value represents a small range of depths. Therefore, visibility at image samples is not always established definitively by the culling stage 130.

However, computations within the culling stage 130 are structured so that culling is conservative, meaning that some occluded geometry can fail to be culled but visible geometry is never culled. Visibility at image samples is established definitively by the z-buffer renderer 140, since z-values within its z-buffer 180 are stored at full precision (e.g. 32 bits per z-value).

Because of the difference in depth-buffer precision between the z-buffer 180 and the z-pyramid 170, some potentially visible polygons sent from the culling stage 130 onto the z-buffer renderer 140 may not contribute visible samples to the ultimate output image.

The total amount of storage required by the low-precision z-pyramid in the culling stage is less than the total amount of storage required by the z-buffer in the rendering stage. For example, if each z-value in a z-pyramid having 4×4 decimation is stored in 8 bits and each z-value in a z-buffer having the same resolution is stored in 32 bits, the number of bits in each z-value in the z-buffer is four times the number of bits in each z-value in the z-pyramid, and the total bits of storage in the z-buffer is approximately 3.75 times the total bits of storage in the z-pyramid.

If instead, each z-value in the z-pyramid is stored in 4 bits, the number of bits in each z-value in the z-buffer is eight times the number of bits in each z-value in the z-pyramid, and the total bits of storage in the z-buffer is approximately 7.5 times the total bits of storage in the z-pyramid.

Figure 2:
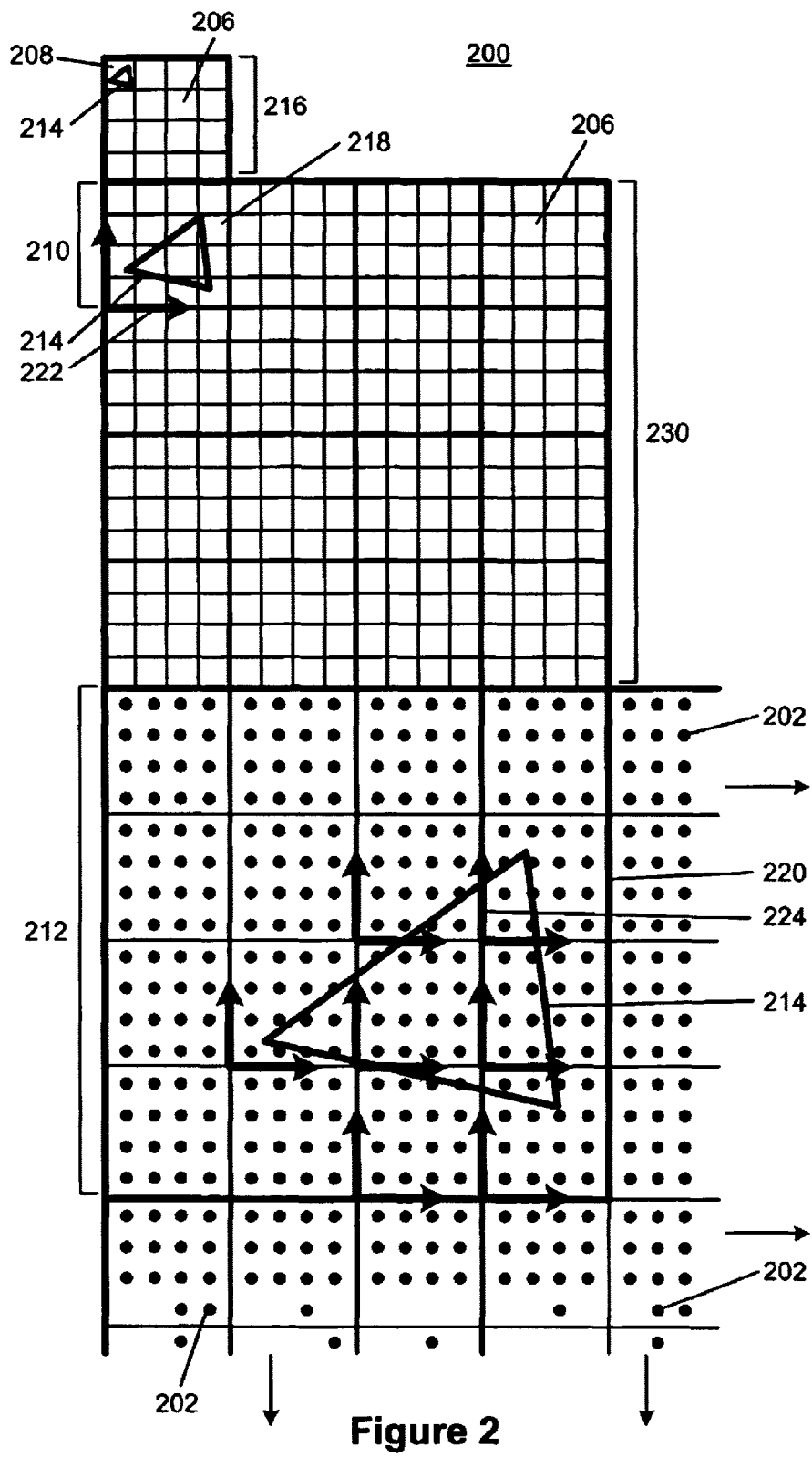
FIG. 2 is an illustration of a z-pyramid organized in 4×4 tiles.

To facilitate reading and writing in blocks, the z-pyramid is organized preferably in N×N tiles, as illustrated in FIG. 2 for a three-level pyramid 200 organized in 4×4 tiles. Each tile is a 4×4 array of "cells," which are samples 202 at the finest level of the pyramid and square regions of the screen 206 at the other levels.

4×4 tiles are preferred over other alternatives, such as 2×2 or 8×8 tiles, because with 16 z-values, 4×4 tiles are large enough for efficient memory access and small enough that the utilization of fetched values is reasonably high.

Within the z-pyramid, tiles are "nested:" an N×N tile at the finest level corresponds to a cell inside its "parent tile" at the next-to-finest level, this parent tile corresponds to a cell inside a "grandparent tile" at the adjacent coarser level, and so forth for all "ancestors" of a given tile.

For example, 4×4 tile 220 corresponds to cell 218 inside parent tile 210, and tile 210 corresponds to cell 208 inside grandparent tile 216. In this example, tile 220 "corresponds to" cell 218 in the sense that tile 220 and cell 218 cover the same square region of the screen.

In FIG. 2, the image raster is a 64×64 array of depth samples 202 arranged in a uniform grid, only part of which is shown to conserve space.

When point sampling, these depth samples correspond to a 64×64 array of pixels. Alternatively, when oversampling with a 4×4 array of depth samples within each pixel, this image raster corresponds to a 16×16 array of pixels. Of course, z-pyramids normally have much higher resolution than illustrated in this example. As mentioned, as used herein, the resolution of a z-pyramid is considered to be the resolution of the z-pyramid's finest level.

The z-value associated with each cell of a z-pyramid is the farthest depth sample in the corresponding region of the screen. For example, in FIG. 2 the z-value associated with cell 208 is the farthest of the 16 corresponding z-values in tile 210 in the adjacent finer level and, also, is the farthest of the 256 depth samples in the corresponding region of the finest level 212 (this region is a 4×4 array of 4×4 tiles).

Thus, the finest level of the z-pyramid 200 is a z-buffer containing the depth of the nearest primitive encountered so far at each image sample, and the other levels contain zfar values, indicating the depths of the farthest depth samples in the z-buffer within the corresponding square regions of the screen.

Since a z-pyramid has a plurality of levels which are each a depth buffer, it can also be described as a hierarchical depth buffer.

Although the z-pyramid of FIG. 2 is organized in N×N tiles, in general, z-pyramid tiles are not necessarily square and need not have the same number of rows and columns. The illustrated structure of nested squares can be modified to accommodate non-square images of arbitrary resolution by storing values for only cells within a rectangular region of each pyramid level. In FIG. 2 of the drawings, image samples are arranged on a regular grid. Alternatively, samples can be "jittered" to reduce aliasing.

The Scene Manager

The scene manager 112 is implemented in software running on a host processor 110. It reads the scene model from host memory 115, maintains geometric data structures for the scene model, and initiates the flow of geometry through the graphics system 100. It also initiates commands, such as those that initialize the image buffer 150 and depth buffers prior to rendering a frame (all values in the z-buffer 180 and z-pyramid 170 are initialized to the depth of the far clipping plane).

The system is structured to operate with or without "box culling" (culling of parts of the scene that are inside occluded bounding boxes). Preferably, densely occluded scenes are rendered with box culling, since this accelerates frame generation.

Rendering a Scene without Box Culling

Figure 3:
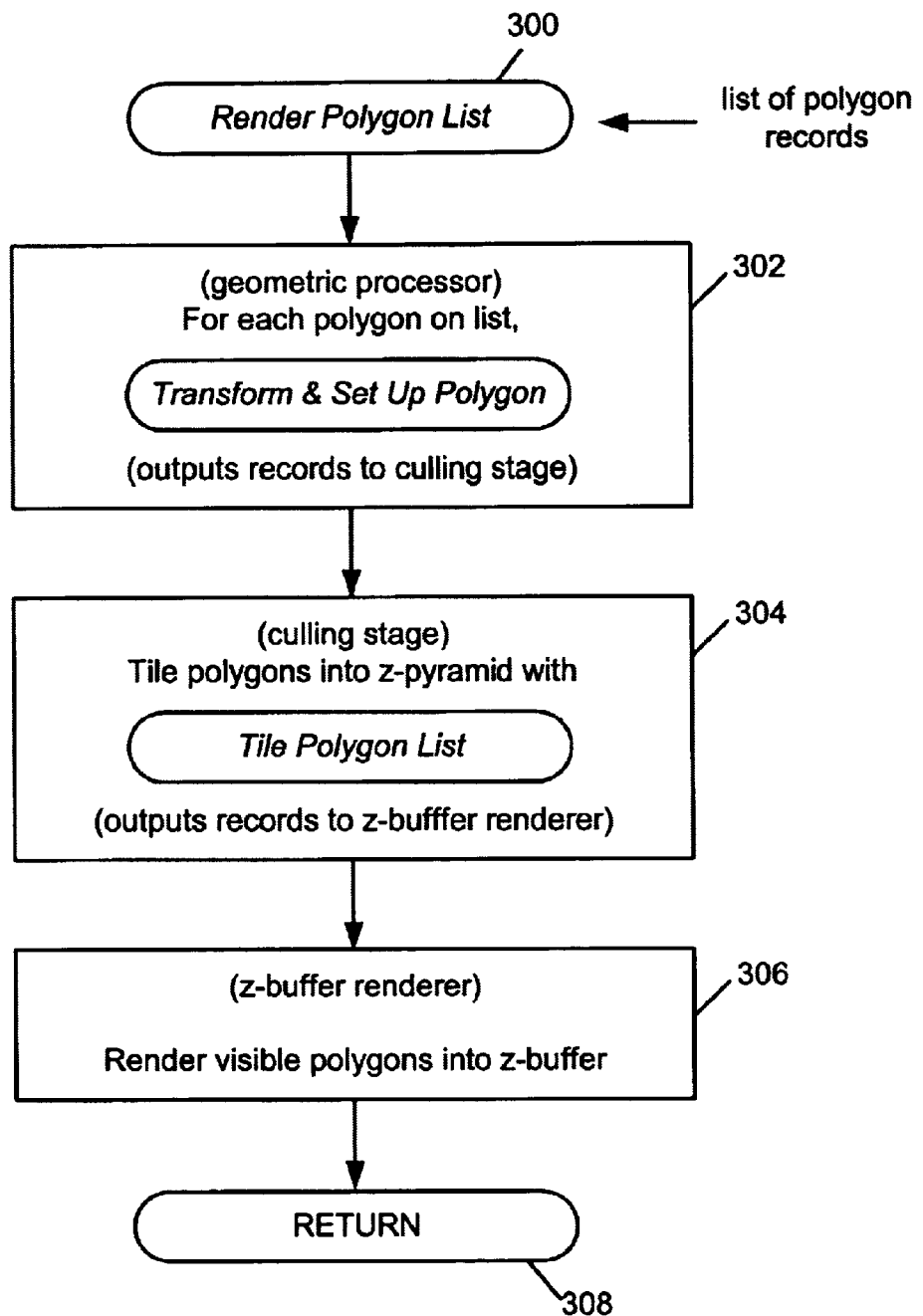
FIG. 3 is a flowchart of the method for rendering a list of polygons.

In this mode of operation, the scene manager 112 can send all polygons in the scene through the graphics system 100 in a single stream. Each polygon in the stream is transformed to perspective space by the geometric processor 120, tiled into the z-pyramid 170 by the culling stage 130 and, if not culled by the culling stage 130, z-buffered into the image buffer 150 by the z-buffer renderer 140. This sequence of operations is summarized in procedure Render Polygon List 300, shown in the flowchart of FIG. 3. According to the procedure 300, the geometric processor 120 receives records for polygons from the scene manager 112 and processes them using procedure Transform & Set Up Polygon 900 (step 302), which transforms each polygon to perspective space and performs "set up" computations.

Transform &Set Up Polygon 900 also creates two records for each polygon, a tiling record containing geometric information that the culling stage 130 needs to perform hierarchical tiling, and a rendering record containing the information needed by the z-buffer renderer 140 to render the polygon. The geometric processor 120 outputs these records to the culling stage 130.

In step 304 of Render Polygon List 300, the culling stage 130 processes these records using procedure Tile Polygon List 800, which tiles each polygon into the z-pyramid 170 and determines whether it is visible. For each visible polygon, the culling stage 130 sends the corresponding rendering record on to the z-buffer renderer 140, which renders the polygon into the image buffer 150 using conventional z-buffering (step 306). When all polygons have been processed, the output image is complete.

Procedures Transform & Set Up Polygon 900 and Tile Polygon List 800 will be described in more detail later.

Rendering a Scene with Box Culling

To render a scene with box culling, the model is organized in bounding boxes having polygonal faces. Before processing the geometry inside a box, the box is tested for occlusion, and if it is occluded, the geometry contained in the box is culled. Box culling can accelerate rendering a great deal. Although the boxes in this example are rectangular solids, a box can be defined by any collection of convex polygons.

Processing the boxes in a scene in near-to-far order maximizes culling efficiency and minimizes computation and memory traffic. One way to facilitate near-to-far traversal is to organize polygons into a spatial hierarchy such as an octree. However, building and maintaining a spatial hierarchy complicates the software interface and requires additional storage.

Another way to achieve favorable traversal order is to take advantage of temporal (frame) coherence. This method, which is described in the parent application with reference to the "Render Frames Using Coherence" algorithm, is based on the principle that bounding boxes that were visible in the last frame are likely to be visible in the current frame and should, therefore, be processed first.

Yet another way to achieve favorable traversal order is to sort boxes into strict near-to-far order at the beginning of a frame. However, this method requires considerable computation when there are numerous boxes.

Yet another way to achieve favorable traversal order is to sort the boxes into only approximate near-to-far order, for example, using the following method.

Figure 5:
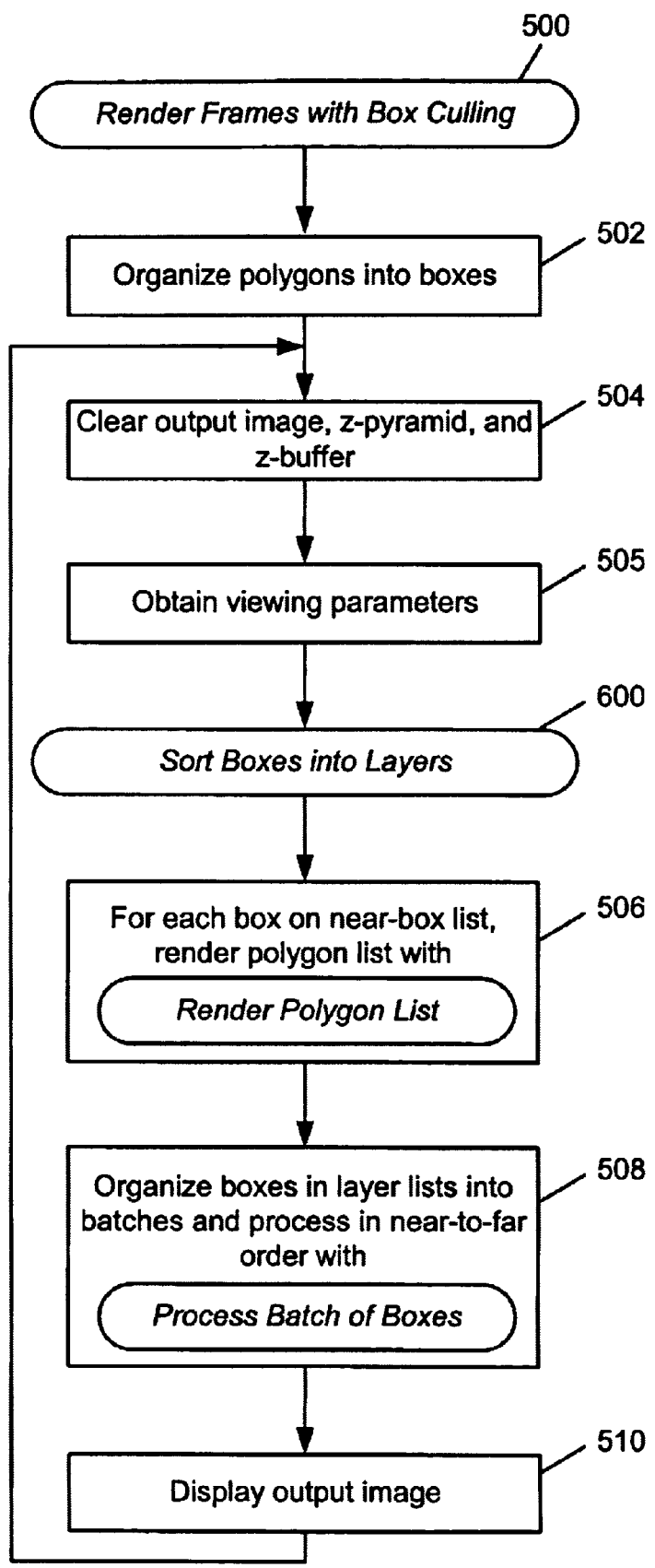
FIG. 5 is a flowchart of the method for rendering frames with box culling.

Procedure Render Frames with Box Culling 500, illustrated in FIG. 5 of the drawings, is used to render a sequence of frames with box culling. In step 502, scene polygons are organized into bounding boxes, each containing some manageable number of polygons (e.g., between 50 and 100).

The record for each box includes a polygon list, which may be a list of pointers to polygons rather than polygon records. If a particular polygon does not fit conveniently in a single box, the polygon's pointer can be stored with more than one box. Alternatively, the polygon can be clipped to the bounds of each of the boxes that it intersects.

Next, step 504 begins the processing of a frame by clearing the image buffer 150, the z-pyramid 170, and the z-buffer 180 (z-values are initialized to the depth of the far clipping plane).

Next, at step 505, viewing parameters for the next frame to be rendered are obtained.

Then, procedure Sort Boxes into Layers 600 organizes the bounding boxes into "layers," the record for each layer including the boxes whose "nearest corner" lies within that layer. Sort Boxes into Layers 600 also makes a list of boxes that intersect the near face of the view frustum. Boxes on this "near-box list" are known to be visible.

Next, step 506 loops over all boxes on the near-box list and renders the polygon list of each box with Render Polygon List 300. Next, step 508 processes layers in near-to-far order, processing the boxes on each layer's list as a "batch" with Process Batch of Boxes 700, which tests boxes for visibility and renders the polygons in visible boxes.

When all boxes have been processed, the output image is complete so the image is displayed at step 510 and control returns to step 504 to process the next frame.

As mentioned, bounding box culling involves testing the nearest faces of the box for occlusion. If all potentially visible faces of the box can be proven occluded, then all geometry within the box is also occluded and can be culled. There are a number of ways to take advantage of hardware assistance in determining whether a box is visible. One way is to send visibility queries to the hardware, and another way is to test the faces of the box against a copy of the tip of a z-pyramid maintained in host memory 115. An embodiment which relies only on the latter mechanism is described later. FIG. 7 illustrates an embodiment of a box culling method which uses both mechanisms. The method of FIG. 7 processes boxes in batches rather than individually because of the high latency incurred when visibility queries are sent to typical graphics hardware. If visibility queries can be batched and sent consecutively, then the hardware can pipeline the queries and the latency will be incurred only once per batch. A method that culls boxes without using visibility queries to the graphics system might not incur a latency and therefore might not benefit from the processing of boxes in batches. In such an embodiment, it would be sufficient to process boxes individually.

In the method of FIG. 7, the scene manager 112 culls boxes which are occluded by the "tip" of the z-pyramid and sends the remaining boxes to the geometric processor 120, which transforms the boxes and sends them to the culling stage 130, which determines the visibility of each box and reports its status to the scene manager 112 on the feedback connection 190. When this visibility information is sent, the "tip" of the z-pyramid is also sent to the scene manager 112 on the feedback connection 190.

Then, for each visible box, the scene manager 112 sends the box's list of polygons out to be rendered, and if boxes are nested, processes the "child" boxes that are inside each visible box using this same procedure. This cycle of operations, which alternates between processing in v-query mode when testing boxes for visibility and processing in rendering mode when rendering scene polygons, continues until the whole scene has been rendered.

Considering now the steps of procedure Process Batch of Boxes 700 (FIG. 7), in step 702, the scene manager 112 tests each box in the batch to see if it is occluded by the tip of the z-pyramid using procedure Is Box Occluded by Tip 1900, which will be discussed later. Occluded boxes are removed from the batch. Next, the scene manager 112 sends records for the front faces of each box in the batch to the geometric processor 120.

Using procedure Transform & Set Up Polygon 900, the geometric processor 120 transforms each face to perspective space and performs the other geometric computations required to create the tiling record for the face, which is then output to the culling stage 130 (step 704). While boxes remain to be processed (step 706), the visibility of each box is established by the culling stage 130, which determines whether its front faces contain at least one visible sample using procedure Tile Polygon List 800 operating in v-query mode (step 708).

If step 708 establishes that the box is visible, the corresponding "v-query status bit" is set to visible in step 710; otherwise, it is set to occluded in step 712. As indicated by step 706, this sequence of steps for processing boxes continues until all boxes in the batch have been processed.

Then, step 714 sends the v-query status bits for the batch of boxes from the culling stage 130 to the scene manager 112 on the feedback connection 190. Next, step 716 copies the tip of the z-pyramid to the scene manager 112 on the feedback connection 190. The "tip" includes the farthest z-value in the pyramid, the coarsest N×N tile in the pyramid, and perhaps some additional levels of the pyramid (but not the entire pyramid, since this would involve too much work).

If the farthest z-value in the z-pyramid is nearer than the depth of the far clipping plane maintained by the scene manager 112, step 716 resets the far clipping plane to this farthest z-value. Copying the tip of the pyramid enables the scene manager 112 to cull occluded boxes at step 702, as will be described later.

Next, the scene manager 112 checks the v-query status of each box in the batch and initiates processing of the geometry inside each visible box (step 718). In step 720, the list of polygons associated with a visible box is rendered with procedure Render Polygon List 300.

If the scene manager 112 maintains the model in nested bounding boxes, these can be handled with recursive calls to Process Batch of Boxes 700, as indicated by optional steps 722 and 724. If there are "child" boxes inside the current box (step 722), in step 724 the scene manager 112 organizes these boxes into one or more batches and processes each batch with this same procedure 700.

Preferably, batches are processed in near-to-far order, since this improves culling efficiency. When all child boxes have been processed (or if there are no child boxes), control returns to step 718, and when all visible boxes have been processed the procedure 700 terminates at step 726.

Culling With the Z-pyramid

Figure 8:
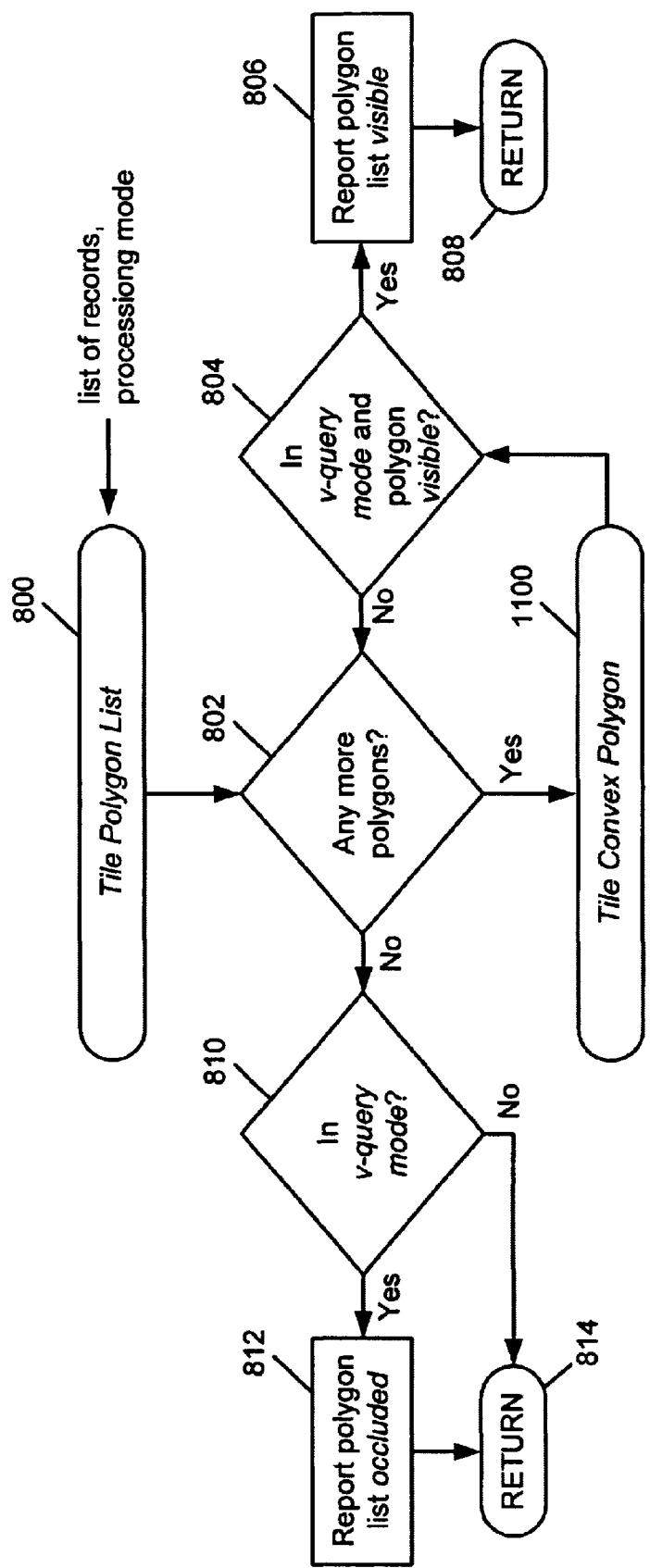
FIG. 8 is a flowchart of the method for tiling a list of polygons.

Tile Polygon List 800 (FIG. 8) is the procedure used by the culling stage 130 to tile a list of polygons. The procedure 800 receives as input from the geometric processor 120 the processing mode, either v-query or render, and a list of records for polygons. When in render mode the geometric processor 120 outputs a tiling record for each polygon (geometric information that the culling stage 130 needs to perform hierarchical tiling) and a rendering record for each polygon (information needed by the z-buffer renderer 140 to render the polygon). When in v-query mode, the geometric processor 120 only outputs a tiling record for each polygon.

Tile Polygon List 800 operates in render mode at step 304 of procedure Render Polygon List 300, and it operates in v-query mode at step 708 of procedure Process Batch of Boxes 700.

While polygons remain to be processed (step 802), Tile Polygon List 800 passes the processing mode, a tiling record and, if in render mode, a rendering record to Tile Convex Polygon 1100, the hierarchical tiling procedure employed by the culling stage 130. When in v-query mode, this procedure 1100 just determines whether the polygon is visible with respect to the z-pyramid 170.

When in render mode, the procedure 1100 updates the z-pyramid 170 when visible samples are encountered, and if the polygon is visible, outputs its rendering record to the z-buffer renderer 140. At step 804, if in v-query mode and the polygon is visible, step 806 reports that the polygon list is visible and the procedure terminates at step 808.

Otherwise, the procedure returns to step 802 to process the next polygon. If the procedure 800 is still active after the last polygon in the list has been processed, if in v-query mode at step 810, step 812 reports that the polygon list is occluded and then the procedure terminates at step 814.

Instead, if in render mode at step 810, the procedure terminates immediately at step 814.

Tiling Records

Figure 9:
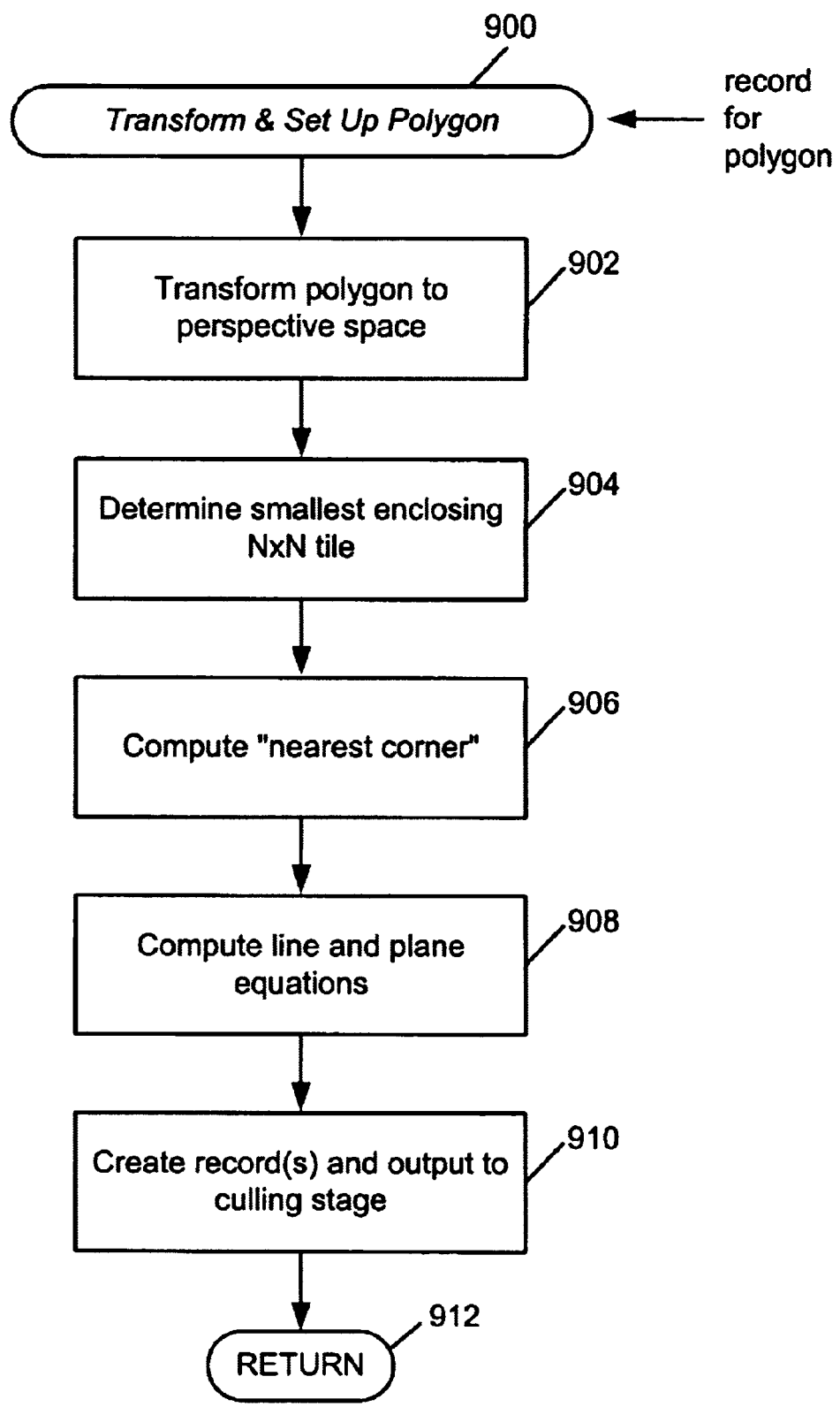
FIG. 9 is a flowchart of the method for geometric processing of a polygon.

Geometric computations are performed on polygons by the geometric processor 120 using procedure Transform & Set Up Polygon 900 (FIG. 9). This procedure 900 is employed in step 302 of procedure Render Polygon List 300 and also in step 704 of Process Batch of Boxes 700.

For each polygon, Transform & Set Up Polygon 900 receives input from the scene manager 112 in the form of a record for the polygon before it has been transformed to perspective space, and for each polygon received, the procedure 900 outputs a tiling record, and when in render mode, it also outputs a rendering record.

First, step 902 transforms the polygon's vertices to perspective space. Next, step 904 determines the smallest N×N tile in the pyramid that encloses the transformed polygon.

For example, in FIG. 2 tile 210 is the smallest enclosing 4×4 tile for triangle 214. (Triangle 214 is also enclosed by 4×4 tile 216, but this tile is considered "larger" than tile 210 because it is larger in screen area—it covers the whole screen, whereas tile 210 covers one-sixteenth of the screen.)

Next, step 906 establishes the corner of the screen where the plane of the polygon is nearest to the viewer (i.e., farthest in the "near" direction). A method for computing this "nearest corner" will be described later, in connection with step 1308 of procedure 1300.

Next, step 908 computes the equation of the plane of the polygon and the equation of each edge of the polygon. The coefficients in these equations are relative to the smallest enclosing N×N tile.

Next, step 910 creates.a tiling record for the polygon from the geometric information computed in the preceding steps and outputs this record to the culling stage 130. If in render mode, step 910 also creates a rendering record for the polygon which contains the information needed by the z-buffer renderer 140 to render the polygon, and outputs this record to the culling stage 130. Following step 910, the procedure terminates at step 912.

Geometric information computed for a polygon by Transform & Set Up Polygon 900 is stored in a tiling record 5000 containing the following information.

Tiling Record

1. Level number and index of smallest enclosing tile ("level," "index");
2. Screen corner where plane of polygon is nearest ("nearest_corner");
3. Number of edges ("n");
4. Coefficients $(A_1,B_1,C_1), (A_2,B_2,C_2), \ldots, (A_n,B_n,C_n)$ of edge equations (polygon has n edges); and
5. Coefficients $(A_p,B_p,C_p)$ of plane equation.

The level number and index specify the tile in the z-pyramid ("index" is an array index). The numerical values of the coefficients of the edge and plane equations depend on the coordinate frame in which they are computed, and FIG. 10 shows a "standard coordinate frame" that is used for an arbitrary 4×4 tile 1000.

The origin of the coordinate frame is located at the tile's lower-left corner 1002, and the x and y axes 1004 are scaled so that the centers 1006 of cells 1008 correspond to odd integer coordinates and cell borders correspond to even integer coordinates. Thus, if an N×N tile is at the finest level of the pyramid and image samples are arranged on a uniform grid, the coordinates of image samples are the odd integers 1, 3, 5, . . . , 2N−1. If an N×N tile is not at the finest level, its cells are squares whose borders lie on the even integers 0, 2, 4, . . . , 2N. The fact that cell coordinates are small integer values simplifies evaluation of line and plane equations.

Figure 10:
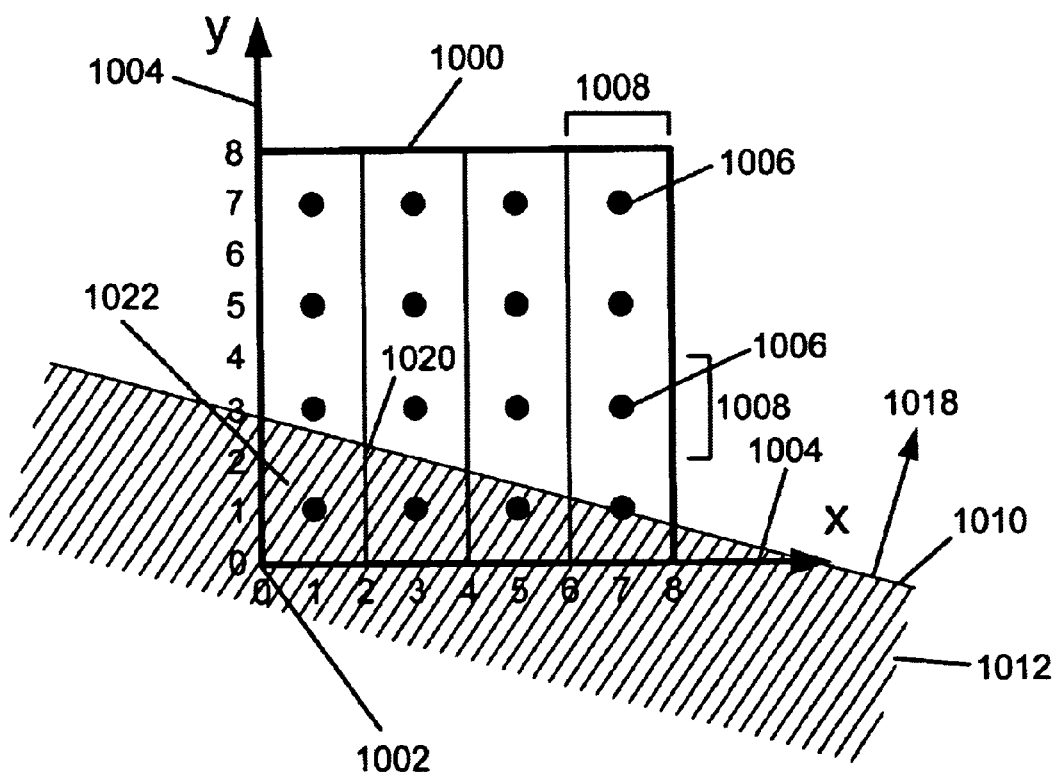
FIG. 10 is an illustration of a 4×4 tile showing its coordinate frame.

Each tile in the z-pyramid 170 has an associated coordinate frame positioned and scaled relative to that tile as illustrated in FIG. 10. For example, FIG. 2 shows the coordinate frames (e.g. 222, 224) of the eight 4×4 tiles that would be traversed during hierarchical tiling of triangle 214.

Algorithm for Hierarchical Z-buffering

Figure 11:
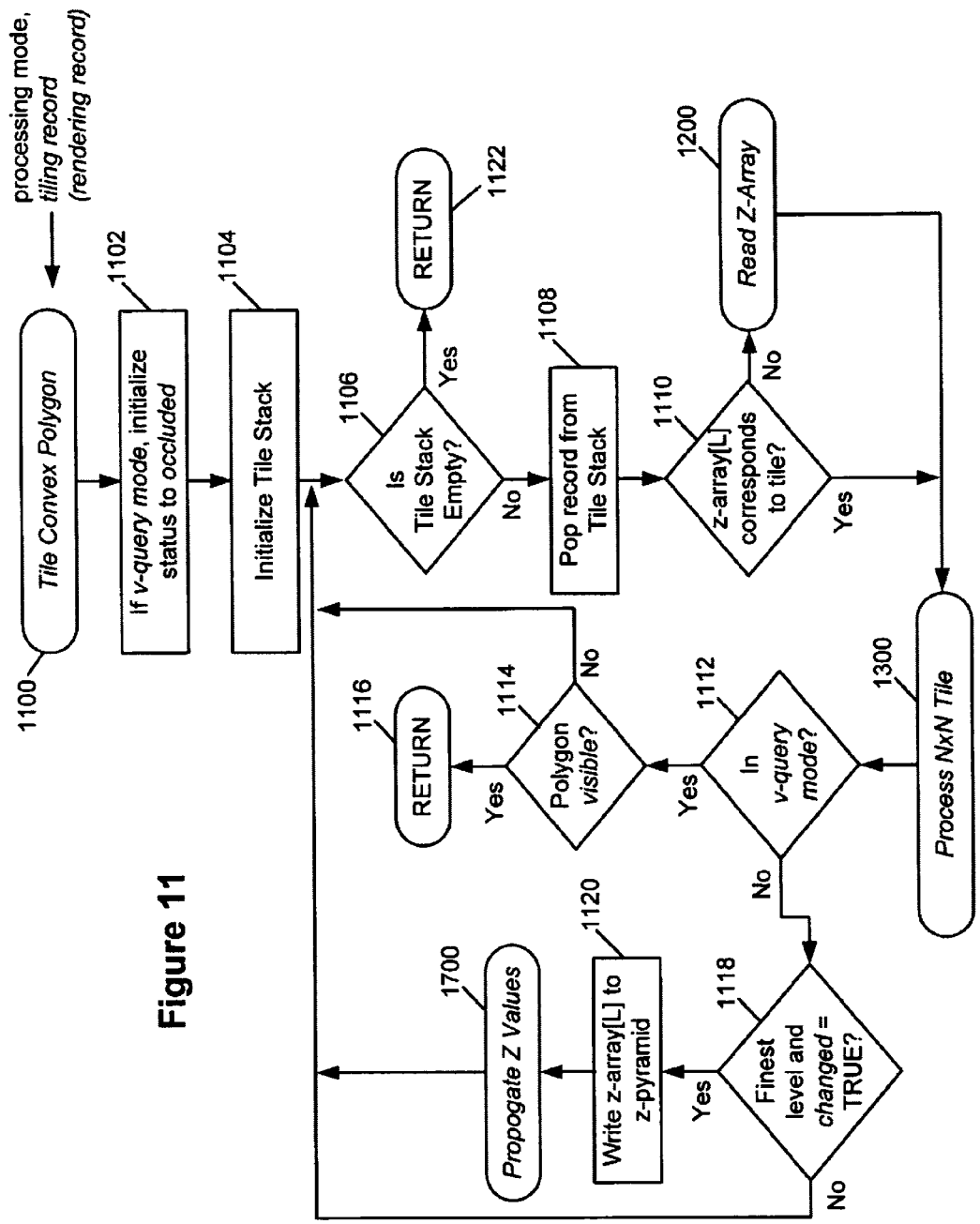
FIG. 11 is a flowchart of the method for tiling a convex polygon.

Within Tile Polygon List 800, a procedure that hierarchically z-buffers a convex polygon is Tile Convex Polygon 1100 (FIG. 11). The input to this procedure 1100 is the processing mode, either render or v-query, a tiling record, and if in render mode, a rendering record.

When in render mode, the procedure 1100 tiles the polygon into the z-pyramid 170, updates z-values when visible samples are encountered, and if the polygon is visible, outputs its rendering record to the z-buffer renderer 140.

When in v-query mode, the polygon is a face of abounding box and the procedure 1100 determines whether that face contains at least one visible image sample. When in v-query mode, the z-pyramid 170 is never written, and processing stops if and when a visible sample is found.

Now, data structures maintained by Tile Convex Polygon 1100 are described. The procedure 1100 maintains a stack of temporary tile records called the "Tile Stack," which is a standard "last in, first out" stack, meaning that the last record pushed onto the stack is the first record popped off.

The temporary records in the Tile Stack contain the same information as the tiling records previously described, except that it is not necessary to include the polygon's "nearest corner," since this is the same for all tiles.

For each level in the pyramid, Tile Convex Polygon 1100 maintains information about the z-pyramid tile within that level that was accessed most recently. Some of this information is relative to the tile currently being processed, the "current tile." The level record 5100 for level J of the pyramid contains:

Level Record[J]

1. index of corresponding z-pyramid tile, call this tile "T" ("index[J]");
2. N×N array of z-values for tile T ("z-array[J]");
3. farthest z-value in z-array[J], excluding cell containing "current tile" ("$zfar_x[J]$");
4. TRUE/FALSE flag: Is z-array[J] different than z-pyramid record? ("dirty_flag[J]"); and
5. TRUE/FALSE flag: Is tile T an ancestor of current tile? ("ancestor_flag[J]").

As listed above, the level_record[J] contains the index for the corresponding tile "T" in the z-pyramid ("index[J]"), the N×N array of z-values corresponding to tile T ("z-array[J]"), the farthest z-value in z-array[J], excluding the depth of the cell containing the current tile ("$zfar_x[J]$," where subscript "x" alludes to this exclusion rule), a flag indicating whether the values in z-array[J] differ from the corresponding values in the z-pyramid ("dirty_flag[J] "), and a flag indicating whether tile T is an "ancestor" of the current tile ("ancestor_flag[J]" is TRUE if the current tile lies inside tile T).

For example, assume that indexes 0, 1, . . . , F refer to the coarsest, next-to-coarsest, . . . , finest levels of the pyramid, respectively. In FIG. 2 of the drawings, while processing tile 220, level_record[0] would correspond to the root tile 216, level_record[1 ] would correspond to tile 210 (since this would be the most recently accessed tile at level 1), and level_record[2 ] would correspond to tile 220.

As for ancestor flags, ancestor_flag[0 ] would be TRUE, since tile 216 is the "grandparent" of tile 220 (in fact, ancestor_flag[0] is always TRUE), ancestor_flag[1 ] is TRUE since tile 210 is the "parent" of tile 220, and ancestor_flag[2] is FALSE, because a tile is not considered to be an ancestor of itself.

According to the algorithm, which will be described later, while processing tile 220, $zfar_x$ values are computed for each pyramid level in order to facilitate propagation of z-values when visible samples are found. After processing tile 220, $zfar_x[0]$ would be the farthest z-value in tile 216 excluding cell 208 (the cell that contains tile 220), $zfar_x[1]$ would be the farthest z-value in tile 210 excluding cell 218 (the cell that contains tile 220), and $zfar_x[2]$ would be the farthest of all the z-values in tile 220. Given these $zfar_x$ values, at each level of the pyramid, propagation of z-values only requires comparing one or two z-values, as will be described later.

The Tiling Algorithm

Tile Convex Polygon 1100 starts with step 1102. If in v-query mode, step 1102 initializes the visibility status of the polygon to occluded.

Next, step 1104 initializes the Tile Stack to the tiling record that was input. Ancestor_flags need to be computed when the tile stack is initialized at step 1104. While the Tile Stack is not empty (step 1106), step 1108 gets the record for the next tile to process (the "current tile") by popping it from the stack (initially, this is the tiling record that was input, which corresponds to the smallest enclosing tile).

The level in the pyramid of the current tile is called "L." Step 1110 checks to see if the z-values for the current tile are already in z-array[L] (this can be established by comparing the current tile's index to index[L]). If not, procedure ReadZ-Array 1200 reads the z-values for the current tile from the z-pyramid 170 and puts them in z-array[L].

Next, Process N×N Tile 1300 processes each of the cells within the current tile, and if L is not the finest level, for each cell where the polygon is potentially visible, appends a new record to the Tile Stack, as will be described later.

At step 1112, if in v-query mode, control proceeds to step 1114, where if the polygon's status is visible (this is determined in Process N×N Tile 1300), the procedure terminates at step 1116, and otherwise, control returns to step 1106.

If in render mode at step. 1112, if L is the finest level of the pyramid and the changed flag is TRUE at step 118 (this flag is set in Process N×N Tile 1300), step 1120 writes z-array[L] to the z-pyramid 170, Propagate Z-Values 1700 "propagates" z-values through the pyramid (if necessary), and control returns to step 1106.

If L is not the finest level of the pyramid or the changed flag is FALSE at step 1118, control returns directly to step 1106. If the Tile Stack is empty at step 1106, hierarchical tiling of the polygon is complete and the procedure terminates at step 1122. If step 1122 is executed when in v-query mode, the polygon is occluded, but since the polygon's visibility status was initialized to occluded at step 1102, it is not necessary to set the status here.

When in render mode, prior to returning at step 1122 the procedure 1100 can output additional information about a visible polygon to the z-buffer renderer 140. For example, if a polygon is being rendered with texture mapping and texture coordinates are computed during tiling, the bounding box of texture coordinates for the polygon could be output to inform the z-buffer renderer 140 which regions of a texture map will need to be accessed.

Summarizing the role of the Tile Stack in Tile Convex Polygon 1100 when operating in render mode, the tile stack is initialized to a tiling record corresponding to the smallest tile in the z-pyramid that encloses the transformed polygon.

Next, a loop begins with the step of testing whether the Tile Stack is empty, and if so, halting processing of the polygon. Otherwise, a tiling record is popped from the Tile Stack, this tile becoming the "current tile."

If the current tile is not at the finest level of the pyramid, Process N×N Tile 1300 determines the cells within the current tile where the polygon is potentially visible, creates tiling records corresponding to the potentially visible cells and pushes them onto the Tile Stack, and then control returns to the beginning of the loop. If the current tile is at the finest level of the pyramid, Process N×N Tile 1300 determines any visible samples on the polygon, and if visible samples are found, the z-pyramid is updated. Then, control returns to the beginning of the loop.

The basic loop is the same when in v-query mode except that when a visible sample is encountered, the procedure reports that the polygon is visible and then terminates, or if an empty Tile Stack is encountered, the procedure reports that the polygon is occluded and then terminates.

Procedure Tile Convex Polygon 1100 performs hierarchical polygon tiling and hierarchical v-query of polygons by recursive subdivision. The Tile Stack allows implementation of recursive subdivision with a simple, efficient algorithm that is well suited for implementation in hardware.

The procedure finishes processing one N×N tile before beginning another one, and reads and writes z-values in N×N blocks. Alternatively, other implementations of hierarchical tiling can be used which use depth-first traversal of the pyramid, processing all "children" of one cell in a tile before processing other cells in the tile. In such an alternative, the "traversal tree" describing the order in which z-pyramid tiles are traversed is topologically different than with the tiling algorithm presented above, which is better suited to implementation in hardware.

The following describes the three procedures called by Tile Convex Polygon 1100: Read Z-Array 1200, Process N×N Tile 1300, and Propagate Z-Values 1700.

Figure 12:
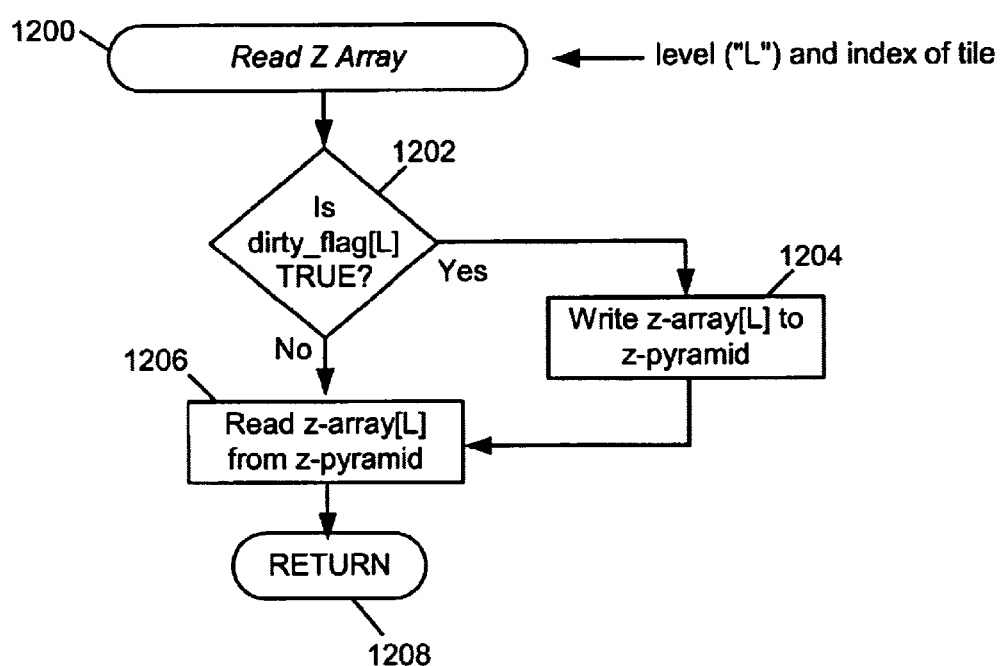
FIG. 12 is a flowchart of the method for reading an array of z-values.

Procedure Read Z-Array 1200 (FIG. 12) reads the N×N array of z-values corresponding to a tile specified by its level number ("L") and index ("I") from the z-pyramid 170 into z-array[L]. At step 1202, if dirty_flag[L] is TRUE (meaning that the values in z-array[L] have been modified), step 1204 writes z-array[L] to the z-pyramid 170, writes I to index[L], sets dirty_flag[L] to FALSE, and sets ancestor_flag[L] to TRUE.

Next, whether or not step 1204 was executed, step 1206 reads z-values for the specified tile from the z-pyramid 170 into z-array[L], and the procedure terminates at step 1208.

Processing of Tiles

Figure 13:
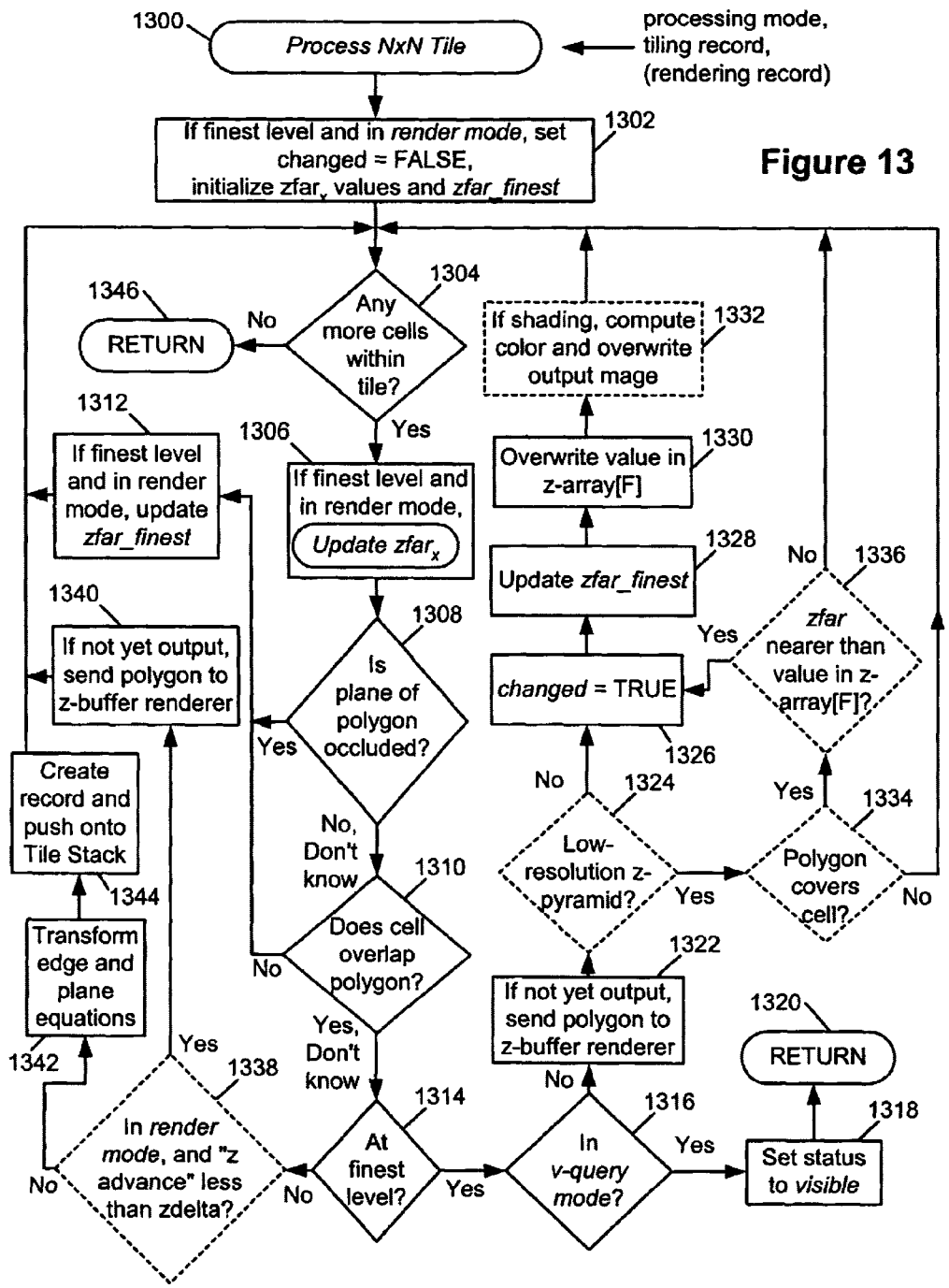
FIG. 13 is a flowchart of the method for processing an N×N tile.

Process N×N Tile 1300 (FIG. 13) loops over each of the N×N cells within a tile, processing them in sequence, for example by looping over the rows and columns of cells within the tile. The tile's level number in the pyramid is called "L" and the cell currently being processed will be called the "current cell."

If L is the finest level and in render mode, step 1302 sets a flag called changed to FALSE, sets a variable called zfar_finest to the depth of the near clipping plane, and sets all values in array $zfar_x$ to the depth of the near clipping plane. While cells remain to be processed (step 1304), if L is the finest level and in render mode, step 1306 updates array $zfar_x$ using procedure Update $zfar_x$ 1600.

Occlusion Test

Next, step 1308 determines whether the plane of the polygon is occluded within the current cell. The polygon's plane equation, which is stored in the tiling record, has the form:

$z=Ax+By+C.$

If the current cell corresponds to an image sample, the depth of the polygon is computed at this sample by substituting the sample's x and y coordinates into the polygon's plane equation.

If the polygon's depth at this point is greater than the corresponding z-value stored in z-array[L] (which is maintained in Tile Convex Polygon 1100), this sample on the polygon is occluded, and control proceeds to step 1312. At step 1312, if at the finest level of the pyramid and in render mode, if the z-value in z-array[L] which corresponds to the current cell is farther than variable zfar_finest, variable zfar_finest is overwritten with that z-value. Following step 1312, control returns to step 1304.

At step 1308, if the current cell corresponds to a square region of the screen (rather than an image sample), the nearest point on the plane of the polygon within that square is determined. This is done by evaluating the plane equation at the corner of the cell where the plane is nearest to the viewer.

Figure 14:
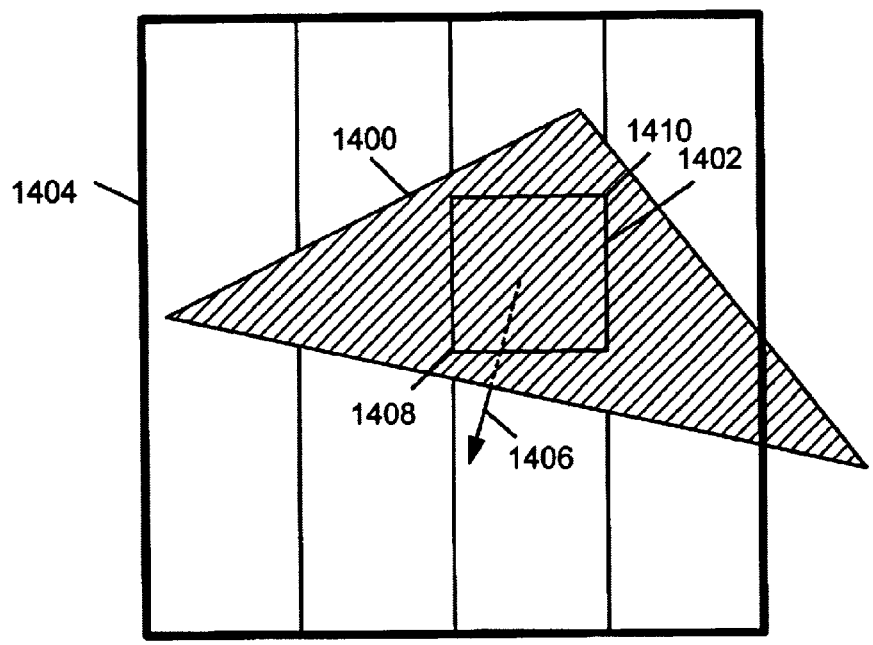
FIG. 14 is an illustration a 4×4 tile and a triangle.

This "nearest corner" can be determined easily from the plane's normal vector using the following method, which is illustrated in FIG. 14.

Suppose that triangle 1400 is being processed within cell 1402 of tile 1404, and vector 1406 is a backward-pointing normal vector (nx,ny,nz). Then the corner of the cell 1402 corresponding to the "quadrant" of vector(nx,ny) indicates the corner where the plane of the polygon is nearest to the viewer.

In this instance, the "nearest corner" is 1408, since nx and ny are both negative. (In general, the +x, +y quadrant is upper right, the +x, −y quadrant is lower right, the −x, −y quadrant is lower left, and the −x, +y quadrant is upper left.)

To help in visualizing this, the normal vector 1406 attaches to the center of the back of the triangle 1400, points into the page, and the dashed portion is occluded by the triangle 1400. Step 906 of Transform & Set Up Polygon 900 uses this method to compute the polygon's nearest corner, which is the same at all tiles.

In the case that the normal vector is forward-pointing instead of backward-pointing, a cell's nearest corner corresponds to the quadrant of vector (−nx, −ny) instead of vector (nx,ny).

The next step is to compute the depth of the plane of the polygon at the nearest corner of the current cell, called the plane's znear value within the cell, by substituting the corner's x and y coordinates into the polygon's plane equation, which has the form z=Ax+By+C, where x and y are even integers. Actually, this equation is evaluated hierarchically, as will be explained later.

Next, the plane's znear value is compared to the zar value stored in z-array[L] that corresponds to the current cell, and if the znear value is farther than the zfar value, the plane of the polygon is occluded within the current cell and control proceeds to step 1312. Otherwise, control proceeds to step 1310.

The depth comparison described above is the only occlusion test performed on a polygon with respect to a given cell. This single occlusion test is not definitive when the nearest corner of the cell lies outside the polygon.

In this case, rather than perform further computations to establish visibility definitively, the occlusion testing of the polygon with respect to the cell is halted and visibility is resolved by subdivision. This culling method is preferred because of its speed and simplicity.

Figure 28:
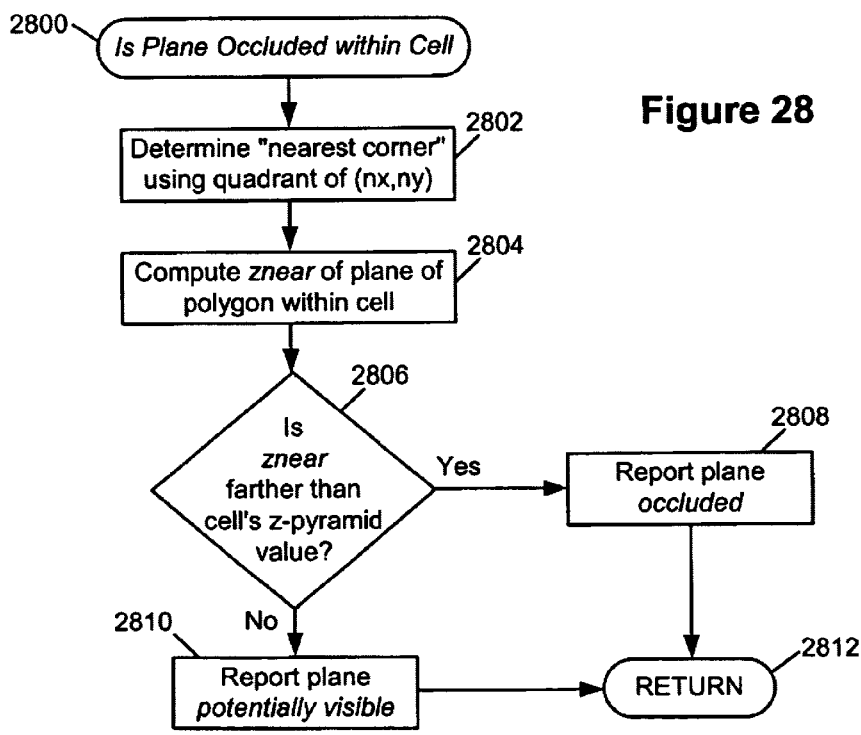
FIG. 28 is a flowchart of the method of determining whether the plane of a polygon is occluded within a cell.

The steps of the above method for testing a polygon for occlusion within a cell covering a square region of the screen are summarized in the flowchart of FIG. 28, which describes the steps performed at step 1308 when the current cell corresponds to a square region of the screen (rather than an image sample).

First, step 2802 determines the corner of the cell where the plane of the polygon is nearest using the quadrant of vector (nx,ny), where (nx,ny,nz) is a backward-pointing normal to the polygon (or if the normal is forward-pointing, the quadrant of vector (−nx, −ny) is used instead).

Next, step 2804 computes the depth of the plane at that "nearest corner," i.e., the plane's znear value. At step 2806, if the plane's znear value is farther than the z-value for the cell stored in the z-pyramid, step 2808 reports that the plane (and hence the polygon) is occluded and the procedure terminates at step 2812.

Otherwise, step 2810 reports that the plane (and hence the polygon) is potentially visible and no further occlusion testing is performed for the polygon with respect to the cell. Following step 2810, the procedure terminates at step 2812.

Figure 26:
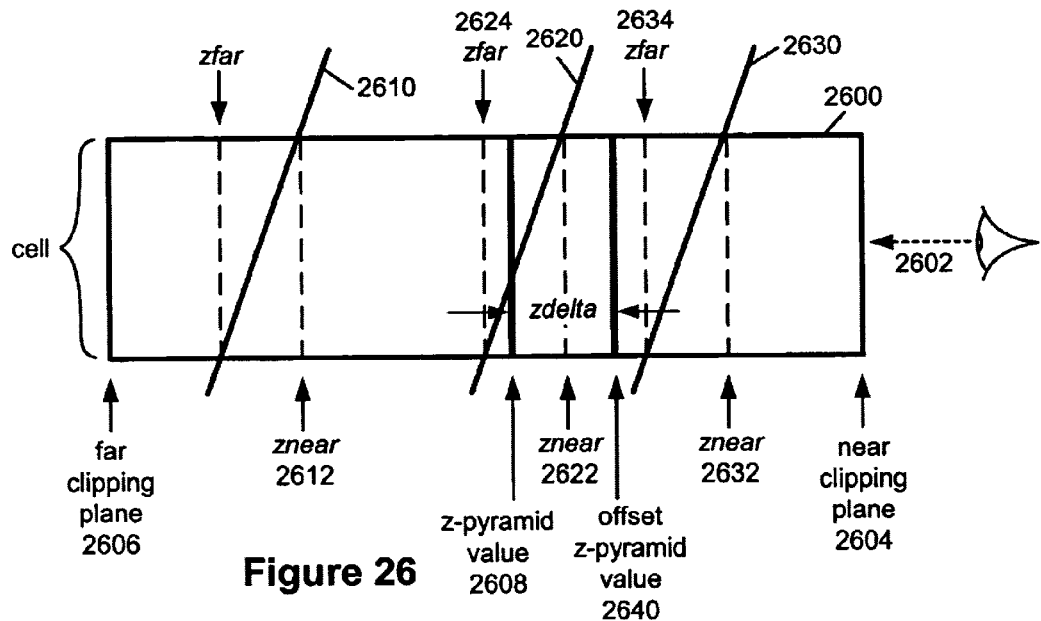
FIG. 26 is a side view of a cell in the z-pyramid which is covered by three polygons.

Examples of occlusion tests performed by procedure Is Plane Occluded within Cell 2800 are illustrated in FIG. 26, which shows a side view of a cell in a z-pyramid, which in three dimensions is a rectangular solid 2600 having a square cross-section. Given the indicated direction of view 2602, the right-hand end 2604 of the solid 2600 is the near clipping plane and the left-hand end 2606 of the solid 2600 is the far clipping plane.

The bold vertical line indicates the current z-value 2608 stored in the z-pyramid cell. The three inclined lines, 2610, 2620, and 2630, indicate the positions of three polygons, each covering the cell and each oriented perpendicular to the page to simplify illustration. For each polygon, the znear and zfar values of its plane within the cell are shown by dashed lines.

Procedure Is Plane Occluded within Cell 2800 would show that polygon 2610 is occluded at the illustrated cell because the znear value 2612 of the polygon's plane is farther than the cell's z-pyramid value 2608. Procedure Is Plane Occluded within Cell 2800 would show that polygon 2620 is potentially visible at the illustrated cell because the znear value 2622 of the polygon's plane is nearer than the cell's z-pyramid value 2608.

It is preferable that z-values within the z-pyramid 170 are stored at low-precision (e.g., in 8 bits), and this complicates depth comparisons slightly. A low-precision z-value can be thought of as representing a small range of z-values in the interval [near far].

If the plane's znear value computed at step 1308 is farther than far, the plane is occluded within the cell, and if znear is nearer than near, the plane is visible within the cell. But if znear is between near and far it cannot be determined whether the plane is visible within the cell.

In this last case, it is assumed that the polygon is visible so that culling will be conservative, never culling a polygon containing a visible image sample. This same analysis is applied in the other conservative culling procedures discussed herein when depth comparisons involving low-precision z-values are performed.

Overlap Tests

At step 1310 of procedure 1300, the objective is to determine whether the current cell and the polygon overlap on the screen. There can be no overlap where the current cell lies entirely outside an edge of the polygon. For each of the polygon's edges, it is determined whether the current cell lies outside that edge by substituting the appropriate point into its edge equation, which has the form:

$$Ax+By+C=0.$$

If the current cell corresponds to an image sample, the "appropriate point" is that image sample.

In FIG. 10, assume that tile 1000 is at the finest level of the pyramid and the half-plane 1012 lying outside edge 1010 is defined by the inequality Ax+By+C<0. Coefficients A, B, and C in this inequality (which were computed at step 908 of procedure 900) are computed relative to the tile's coordinate frame 1004, and image samples within the tile have odd integer coordinates.

To determine whether an image sample lies outside an edge, its x and y coordinates are substituted into the edge's equation and the sign of the result is checked. Step 1310 performs this test on each edge of the polygon (or until it is determined that the sample lies outside at least one edge). If the sample is outside any edge, control proceeds to step 1312. Otherwise, control proceeds to step 1314.

At step 1310, if the current cell corresponds to a square region of the screen (rather than an image sample), it must be determined whether that square lies entirely outside an edge of the polygon. For each edge, this can be done by substituting the coordinates of a single corner point of the current cell into the edge equation, using the corner that is farthest in the "inside direction" with respect to the edge.

In FIG. 10, the inside direction for edge 1010 is indicated by arrow 1018, the corner of cell 1022 that is farthest in the inside direction is corner 1020, and substituting the corner's x and y coordinates into the equation for edge 1010 shows that corner 1020 and cell 1022 lie outside of edge 1010. The corner points of cells have even integer coordinates, (2,2) in the case of point 1020.

Step 1310 determines whether the current cell lies outside any edge of a polygon by using this method to compare the cell to each edge.

This method is not a definitive cell-polygon intersection test, but it is simple and conservative, never culling a cell containing a visible image sample. If the current cell is outside any edge, control proceeds to step 1312. Otherwise, control proceeds to step 1314.

Step 1308 and each of the "outside-edge" tests of step 1310 can all be done in parallel.

At step 1314, if L is the finest level, a visible image sample has been found, and control proceeds to step 1316.

If in v-query mode at step 1316, step 1318 sets the polygon's visibility status to visible and the procedure terminates at step 1320. If not in v-query mode, if the polygon's rendering record has not yet been output to the z-buffer renderer 140, this is done at step 1322.

In one embodiment of the invention, the resolution of the finest level of the z-pyramid 170 is the same as the resolution of the image raster. However, it is also possible to use a low-resolution z-pyramid. This option and associated steps 1334 and 1336 will be described in more detail later.

Assuming a full-resolution z-pyramid 170, following step 1322, step 1326 sets the changed flag to TRUE. Next, step 1328 updates zfar_finest, a variable that keeps track of the farthest z-value encountered thus far within the current tile. Accordingly, if the z-value computed for the current cell at step 1308 is farther than zfar_finest, zfar_finest is overwritten with that z-value.

Next, step 1330 writes the z-value computed for the polygon at step 1308 to the appropriate entry in z-array[F] (where F is the index of the finest pyramid level).

It is possible to update the z-pyramid 170 directly at this step, but to improve efficiency, preferably, the z-pyramid is read and written in records for N×N tiles.

According to an embodiment of the present invention (FIG. 1), shading is not performed in the stage of the graphics system that is presently being described, but it is possible to do so. For example, it is possible to combine the culling stage 130 and its z-pyramid 170 with the z-buffer renderer 140 and its z-buffer 180 into a single stage: a hierarchical z-buffer renderer with a z-pyramid.

With this architecture, step 1332 would compute the color of the image sample and then overwrite the image buffer 150. Also, step 1322 would be omitted (as would step 1340), since there would no longer be a separate rendering stage. Step 1332 is shown in a dashed box to indicate that it is an option and not the method currently being described.

Whether or not pixels are shaded in this procedure 1300, control returns to step 1304.

At step 1314, if L is not the finest level control proceeds to step 1338, which is an optional step (as indicated by its depiction in dashed lines). If in render mode, step 1338 computes the maximum amount that continued tiling within the current cell can advance z-values in the pyramid, which is the difference between the znear value of the polygon's plane computed at step 1308 and the z-value stored for the current cell in z-array[L].

If the maximum "z advance" is less than some specified positive threshold value, call it zdelta, the current cell is not subdivided and the polygon is assumed to be visible. In this case, control proceeds to step 1340, which outputs the polygon's rendering record to the z-buffer renderer 140, if this has not already been done, after which control returns to step 1304.

In FIG. 26 the bold dashed line 2640 shows the z-pyramid value 2608 for a cell offset in the near direction by zdelta. Since the znear value 2622 for polygon 2620 is farther than this offset z-pyramid value 2640, tiling of polygon 2620 would stop within the illustrated cell, since the maximum amount that continued tiling could advance the z-pyramid value for the cell is less than zdelta. On the other hand, tiling of polygon 2630 would continue, since its znear value 2632 is nearer than the offset z-pyramid value 2640.

Although step 1338 can decrease the culling efficiency of the z-pyramid, it also reduces the amount of tiling the culling stage 130 needs to do, and in some cases, this is a good trade-off, improving the overall performance of the system.

If step 1338 is not employed or if its conditions are not satisfied, control proceeds to step 1342. Steps 1342 and 1344 create the tiling record for a new N×N tile corresponding to the current cell, this record including new coefficients for the polygon's edge and plane equations.

Step 1342 "transforms" the current tile's edge and plane equations so that their coefficients are relative to the coordinate frame of the new tile, using a method that will be described later. If tiling records also include the coefficients of shading equations, these equations are also transformed.

Step 1344 computes the level number and index of the new tile, creates a tiling record for the tile, and pushes this record onto the Tile Stack. Following step 1344, control returns to step 1304. When all cells within the tile have been processed at step 1304, the procedure terminates at step 1346.

Although procedure Process N×N Tile 1300 processes cells one by one, it is also possible to process cells in parallel, for example, by processing one row of cells at a time.

Hierarchical Evaluation of Line and Plane Equations

Before describing the hierarchical evaluation method employed by the invention, the underlying problem will be described. When z-buffering a polygon, it is necessary to evaluate the linear equations defining the polygon's edges and plane.

Edge equations have the form $Ax+By+C=0$ and plane equations are expressed in the form $z=Ax+By+C$. When performing hierarchical z-buffering, these equations must be evaluated at points on tiles in the image hierarchy.

Each of these equations includes two additions and two multiplications so direct evaluation is relatively slow, and if evaluation is performed with dedicated hardware, the circuitry required to perform the multiplications is relatively complex.

Efficient evaluation of these equations is the cornerstone of various prior-art algorithms for z-buffering polygons. However, prior-art methods are not particularly efficient when a polygon covers only a small number of samples, as is the case when tiling is performed on tiles of an image hierarchy, and they do not take advantage of coherence that is available in an image hierarchy.

The method described herein achieves efficiency by evaluating line and plane equations hierarchically, as will be described now.

Within Process N×N Tile 1300, at every cell it is necessary to evaluate a plane equation of the form $z=Ax+By+C$ at step 1308 and edge equations of the form $Ax+By+C=0$ at step 1310. Coefficients A, B, and C are computed relative to the standard coordinate frame of FIG. 10, and the advantage of this approach is that the values of x and y in the equations are small integers, which permits the equations to be evaluated with shifts and adds, rather than performing general-purpose multiplication.

For example, while looping over cells within a tile, equation $z=Ax+By+C$ can be computed incrementally as follows: at (0,0) z=C, at (2,0) z=C+2A, at (4,0) z=C+4A, and so forth. Even when incremental methods are not used, the equations can be evaluated efficiently with shifts and adds.

For example, if x is 5, the term Ax can be computed by adding A to 4A, where 4A is obtained by shifting.

At step 1342 of Process N×N Tile 1300, new coefficients of edge and plane equations are computed when cells are subdivided. The objective is to transform a linear equation of x and y from the coordinate frame of an N×N tile to the coordinate frame of cell (xt,yt) within it.

Figure 15:
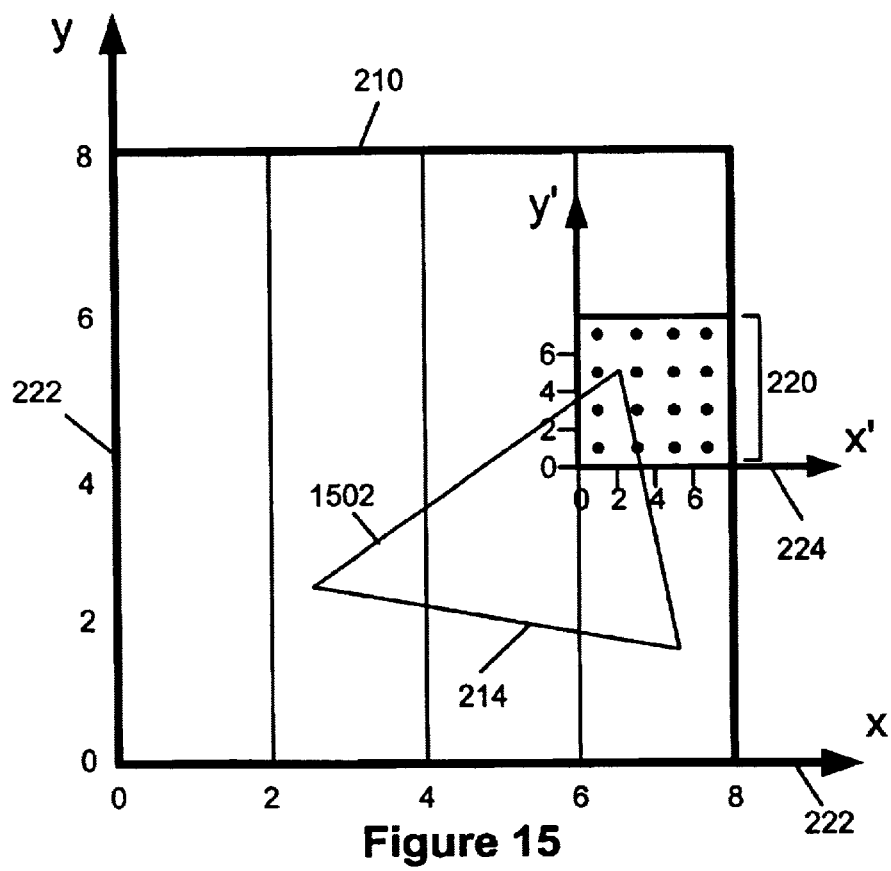
FIG. 15 is an illustration of nested coordinate frames.

More particularly, in FIG. 2 consider cell 218 within 4×4 tile 210, which corresponds to 4×4 tile 220 at the adjacent finer level of the pyramid. The relationship in screen space between the (x,y) coordinate frame 222 of cell 210 and the (x',y') coordinate frame 224 of cell 220 is shown in FIG. 15.

Relative to coordinate frame 222, coordinate frame 224 is translated by vector (xt,yt), in this case (6,4), and scaled by a factor of four (and in general for an N×N tile, a factor of N).

When the tiling record for triangle 214 is created by procedure Transform & Set Up Polygon 900, step 908 computes coefficients (A,B,C) in the edge equation $Ax+By+C=0$ for edge 1502 relative to coordinate frame (x,y) of tile 210 (this is the smallest enclosing tile). When tile 210 is subdivided and a record for tile 220 is created, this edge equation is transformed to edge equation $A'x'+B'y'+C'=0$, which is relative to coordinate frame (x',y') of tile 220.

New coefficients (A',B',C') are computed using the following transformation formulas 4000, which are applied to edge and plane equations at step 1342 of procedure 1300:

$A'=A/N$ $B'=B/N$ $C'=Axt+Byt+C.$

Assuming that N is a power of two, A' and B' can be obtained by shifting.

Frequently, $Ax+By+C$ has already been evaluated at (xt, yt) at step 1308 or 1310 of procedure 1300, in which case C' is already known. Whether or not this is exploited, C' can be efficiently computed since xt and yt are small integers.

Thus, computing new coefficients for the line and plane equations is done very efficiently at step 1342 of procedure 1300, without performing general-purpose multiplication.

The same transformation formulas 4000 can be applied to any linear equation of the form $w=Ax+By+C$ including edge equations, plane equations, and equations used in shading.

If shading is performed during hierarchical tiling at step 1332 of procedure 1300, the method can be applied to interpolating vertex colors of triangles (i.e., performing Gouraud shading). In this case, the intensities of the red, green, and blue color components can each be expressed as a linear equation (e.g. red=$Ax+By+C$) and evaluated in the same way as z-values.

Since both sides of an equation can be multiplied by the same quantity, equation $w=Ax+By+C$ is equivalent to equation $Nw=N(Ax+By+C)$. Hence, using the following transformation formulas 4001 would result in computing Nw rather than w:

$A'=A$ $B'=B$ $C'=N(Axt+Byt+C).$

In this case, coefficients A and B are unchanged but it is necessary to compute w from Nw by shifting (unless only the sign of the equation must be determined, as is the case when evaluating an edge equation).

Regardless of whether formulas 4000 or formulas 4001 are employed, transforming a linear equation from the coordinate frame of one tile to the coordinate frame of a "child" tile involves translation and scaling computations, where scaling is performed by shifting. With formulas 4000, scaling is performed by shifting coefficients A and B of the equation, and with formulas 4001, scaling is performed by shifting Axt+Byt+C, which is a linear expression of the coefficients of the equation.

This method for hierarchical evaluation of linear equations can also be applied in higher dimensions, and to higher degree polynomial equations. They can also be applied when the image raster has jittered samples by scaling up the coordinate frame of the tiles. For example, if the coordinate frame of a 4×4 tile is scaled up by a factor of 4, there would be 32 integer values across the tile instead of 8, and the x and y coordinates of jittered image samples could have any of these values.

In summary, the hierarchical evaluation methods described above can be applied to accelerating processing of geometric objects described by polynomial equations within a spatial hierarchy (e.g., an image pyramid, octree, quadtree, etc.) that is organized in nested tiles that progress in scale by powers of two. The method transforms a polynomial equation (e g., a linear or quadratic equation of x and y) from the coordinate frame of one tile to the coordinate frame of a "child" tile at the adjacent finer level of the hierarchy. This transformation is performed by translation and scaling computations, where scaling is performed by shifting the binary representation of the equation's coefficients or by shifting the binary representation of a polynomial expression of the equation's coefficients.

Shifting can be used to scale numbers represented in floating-point format, in addition to numbers represented in integer format. The advantage of this method of hierarchical evaluation is that evaluation can often be done without performing general-purpose multiplication, thereby accelerating computation and simplifying the required circuitry.

Hierarchical evaluation of equations can be applied to a variety of tiling, shading, and interpolation computations which require evaluation of polynomial equations at samples within a spatial hierarchy. The method is well suited to implementation in hardware and it works well in combination with incremental methods.

Propagation of Z-values

While looping over cells within a finest-level tile, Process N×N Tile 1300 determines zfar$_x$[] at each pyramid level L and the tile's zfar value (zfar_finest). Given this information, propagation can usually be performed with only one or two depth comparisons at each level of the pyramid (actually, this is only possible at levels where the ancestor_flag is TRUE, but this usually is the case).

One method of performing propagation during hierarchical z-buffering requires performing $N^2$ depth comparisons for N×N tiles at each level of propagation. The method described herein accelerates propagation by reordering most of these depth comparisons, performing them during tiling.

Another advantage of maintaining zfar$_x$ values is that when propagation to an ancestor tile is not necessary, this can be determined without accessing z-values for the ancestor tile.

Suppose that ZFAR[F] is the farthest z-value within the current tile C in the finest level (where F is the index of the finest level), ZFAR[F−1] is the farthest z-value within the parent tile of the current tile, and so forth. Then the farthest z-values within ancestor tiles can be computed from zfar_finest and the values in array zfar$_x$ as follows:

ZFAR[F]=zfar_finest (zfar within C),

ZFAR[F−1]=farthest of (ZFAR[F], zfar$_x$[F−1])(zfar within parent of C),

ZFAR[F−2]=farthest of (ZFAR[F−1], zfar$_x$[F−2])(zfar within grandparent of C), and so forth.

Figure 16:
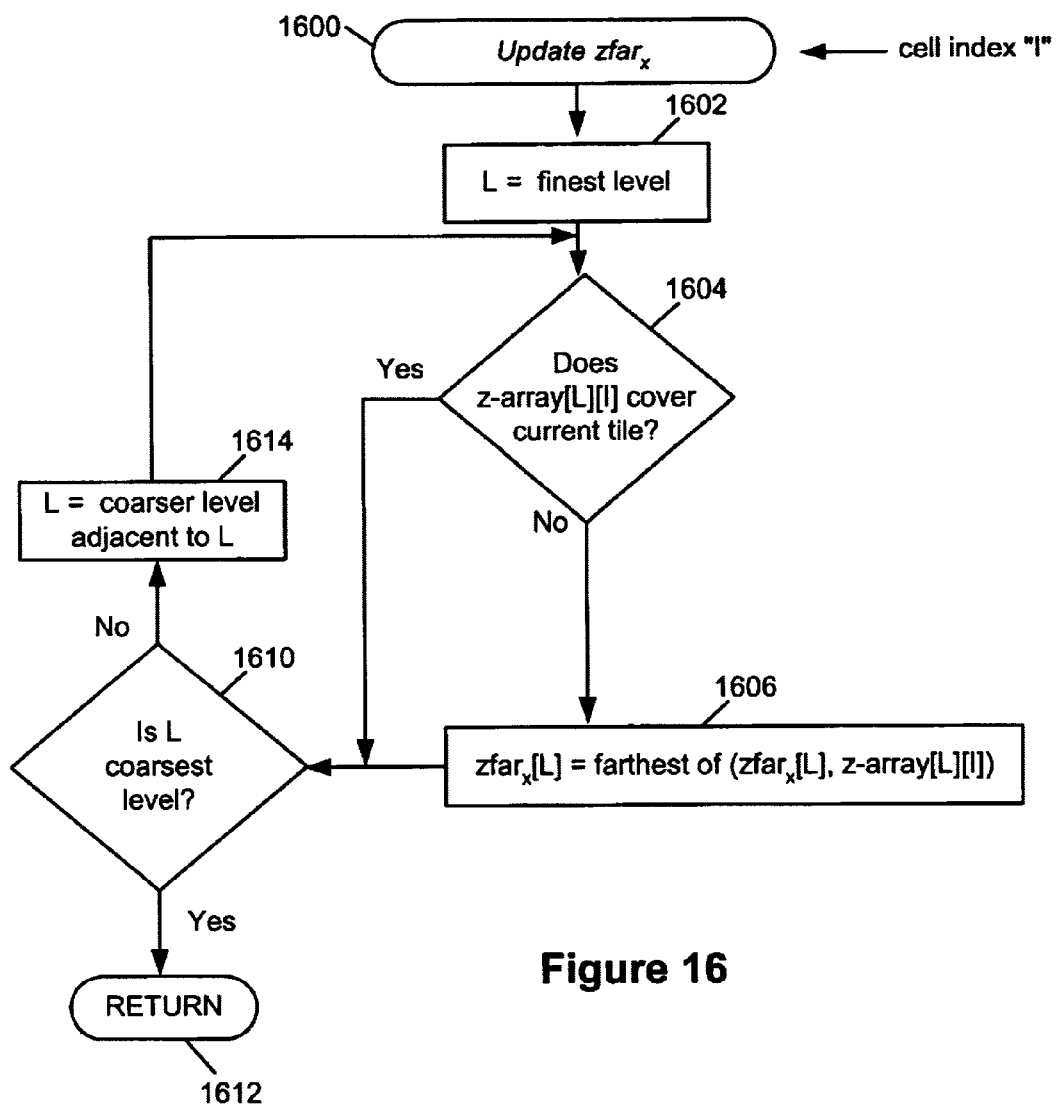
FIG. 16 is a flowchart of the method for updating array zfar$_x$.

Propagation can stop whenever it fails to change the existing value in an ancestor tile. The actual algorithm used to perform propagation will be presented after discussing procedure Update zfar$_x$ 1600 (FIG. 16), which maintains array zfar$_x$.

Procedure Update zfar$_x$ 1600 is called at step 1306 of Process N×N Tile 1300 to update zfar$_x$ values. The procedure receives as input the index "I" of the current cell within the current tile.

Step 1602 initializes variable "L" to the finest level of the pyramid.

Next, at step 1604, if the z-pyramid cell with index I in z-array[L] (i.e., z-array[L][I]) covers the current tile, control proceeds to step 1610. Otherwise, at step 1606, if z-array [L][I] is farther than the current value of zfar$_x$[L], zfar$_x$[L] is set equal to z-array [L][I], and then control proceeds to step 1610.

At step 1610, if L is the coarsest level, the procedure terminates at step 1612. Otherwise, step 1614 sets L to the index of the adjacent coarser level and control returns to step 1604.

At any level L where ancestor_flag[L] is FALSE, zfar$_x$[L] is not a valid value and it will need to be recomputed later, but this is a relatively rare event. Although the method just described computes zfar$_x$ values one by one, all values can be computed in parallel.

Figure 17:
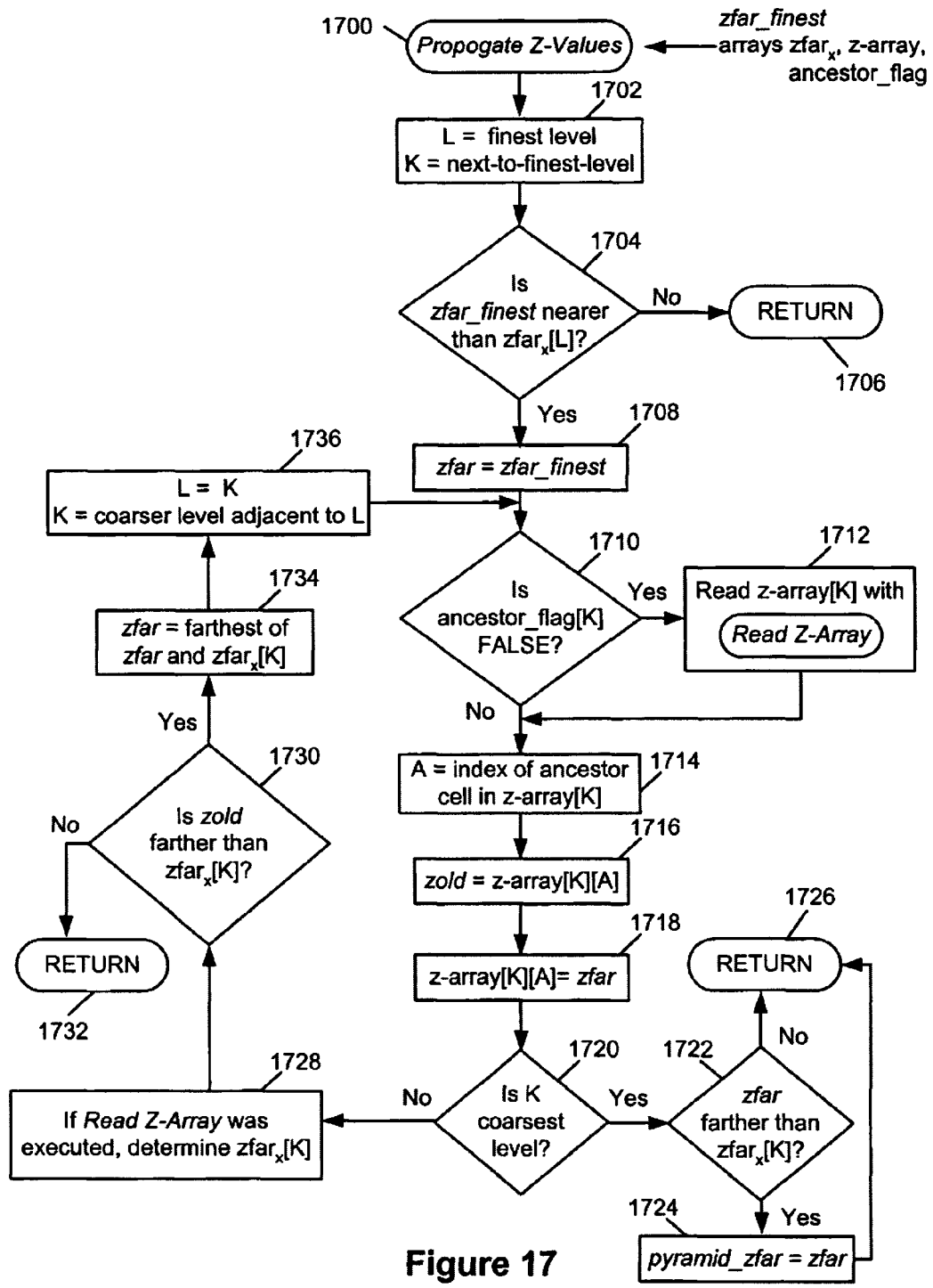
FIG. 17 is a flowchart of the method for propagating z-values.

The propagation procedure, Propagate Z-Values 1700 (FIG. 17), is called after step 1120 of Tile Convex Polygon 1100. Step 1702 initializes variable L to the finest level of the pyramid and variable K to the next-to-finest level.

Next, if variable zfar_finest (zfar of the most recently processed finest-level tile) is not nearer than zfar$_x$[L], no propagation can be performed, so the procedure terminates at step 1706. Next, step 1708 sets variable zfar to variable zfar_finest. Next, if ancestor_flag[K] is FALSE (step 1710), step 1712 reads the z-values corresponding to the level-K ancestor of the current cell from the z-pyramid into z-array [K] using procedure Read Z-Array 1200. If ancestor_flag[K] is TRUE at step 1710, control proceeds directly to step 1714.

Step 1714 determines the index "A" of the cell within array z-array[K] that is an ancestor of the z-value being propagated. Next, step 1716 sets variable zold to the depth value for cell A in z-array[K] (i.e., z-array[K][A]).

Next, step 1718 overwrites z-array [K][A] with the value of variable zfar. Next, if K is the coarsest level (step 1720), step 1722 determines whether zfar is farther than zfar$_x$[K]. If so, zfar is a new zfar value for the entire z-pyramid, and step 1724 sets variable pyramid_zfar to variable zfar.

Whether or not step 1722 is executed, the procedure terminates at step 1726.

If K is not the coarsest level at step 1720, control proceeds to step 1728, where if Read Z-Array 1200 was executed at step 1712, zfar$_x$[K] is computed from the values in z-array [K] (this is a relatively slow procedure, but usually it is not required). Next, at step 1730, if zold is not farther than zfar$_x$[K], the procedure terminates at step 1732.

Otherwise, step 1734 sets variable zfar equal to the farthest of variables zfar and zfar$_x$[K]. Next, step 1736 sets L equal to K and sets K equal to the level that is adjacent to and coarser than L, and control returns to step 1710.

Although procedure Process N×N Tile 1300 updates array zfar$_x$ while looping over individual cells in an N×N tile, the same approach could also be applied if several cells were computed in parallel for example, if tiles were processed row-by-row instead of cell-by-cell.

When a new value of variable pyramid_zfar is established at step 1724, the far clipping planes maintained by the scene manager 112 and the z-buffer 180 can be reset to this nearer value.

Variable pyramid_zfar is part of the tip of the z-pyramid which is copied to the scene manager. 112 at step 716 of procedure 700. The scene manager 112 uses pyramid_zfar to reset the far clipping plane, and it uses pyramid_zfar and other copied depth values to cull occluded bounding boxes, as described below.

Culling With the Tip of the Z-pyramid

When culling boxes with az-pyramid, occlusion can sometimes be detected with a single depth comparison. However, when culling is performed with procedure Process Batch of Boxes 700, culling an occluded box requires transforming the box's front faces to perspective space, processing them with the culling stage 130, and reporting results to the scene manager 112.

To avoid the latency caused by these steps, an alternative is for the scene manager 112 to maintain some z-pyramid values and cull a box if it (or its bounding sphere) is occluded by az-pyramid cell. Only if occlusion cannot be detected at this stage is a box sent through the rest of the system.

According to the method of FIG. 7, after v-query results are reported to the scene manager 112 on the feedback connection 190 at step 714 of Process Batch of Boxes 700, step 716 copies the tip 174 of the z-pyramid 170 to the host memory 115, where it is given the designation numeral 116. The "tip" includes the zfar value for the entire z-pyramid (i.e., pyramid_zfar), the coarsest N×N tile in the pyramid, and perhaps some additional levels of the pyramid (but not the entire pyramid, since this would involve too much work).

The amount of data that needs to be copied may be very modest. For example, if the copied tip includes pyramid_zfar, the coarsest 4×4 tile, and the 164×4 tiles at the adjacent finer level, a total of 273 z-values need to be copied. In some cases, the scene manager 112 can cull a substantial amount of occluded geometry using this relatively small amount of occlusion information.

Figure 18A:
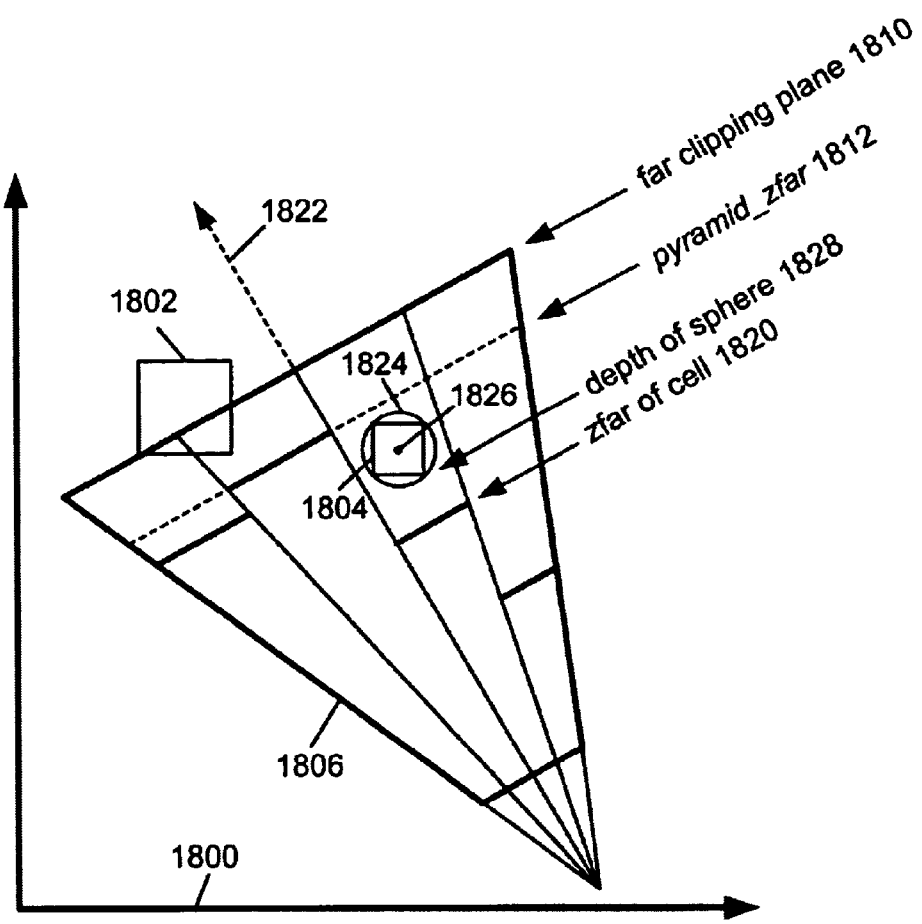
FIG. 18a is an illustration of a view frustum in model space.
Figure 18B:
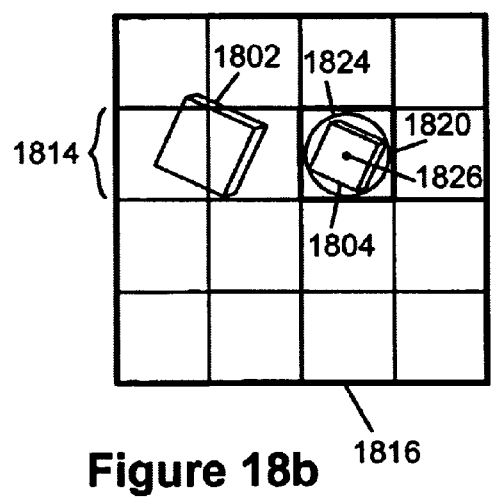
FIG. 18b is an illustration of the coarsest 4×4 tile in a z-pyramid.
Figure 19:
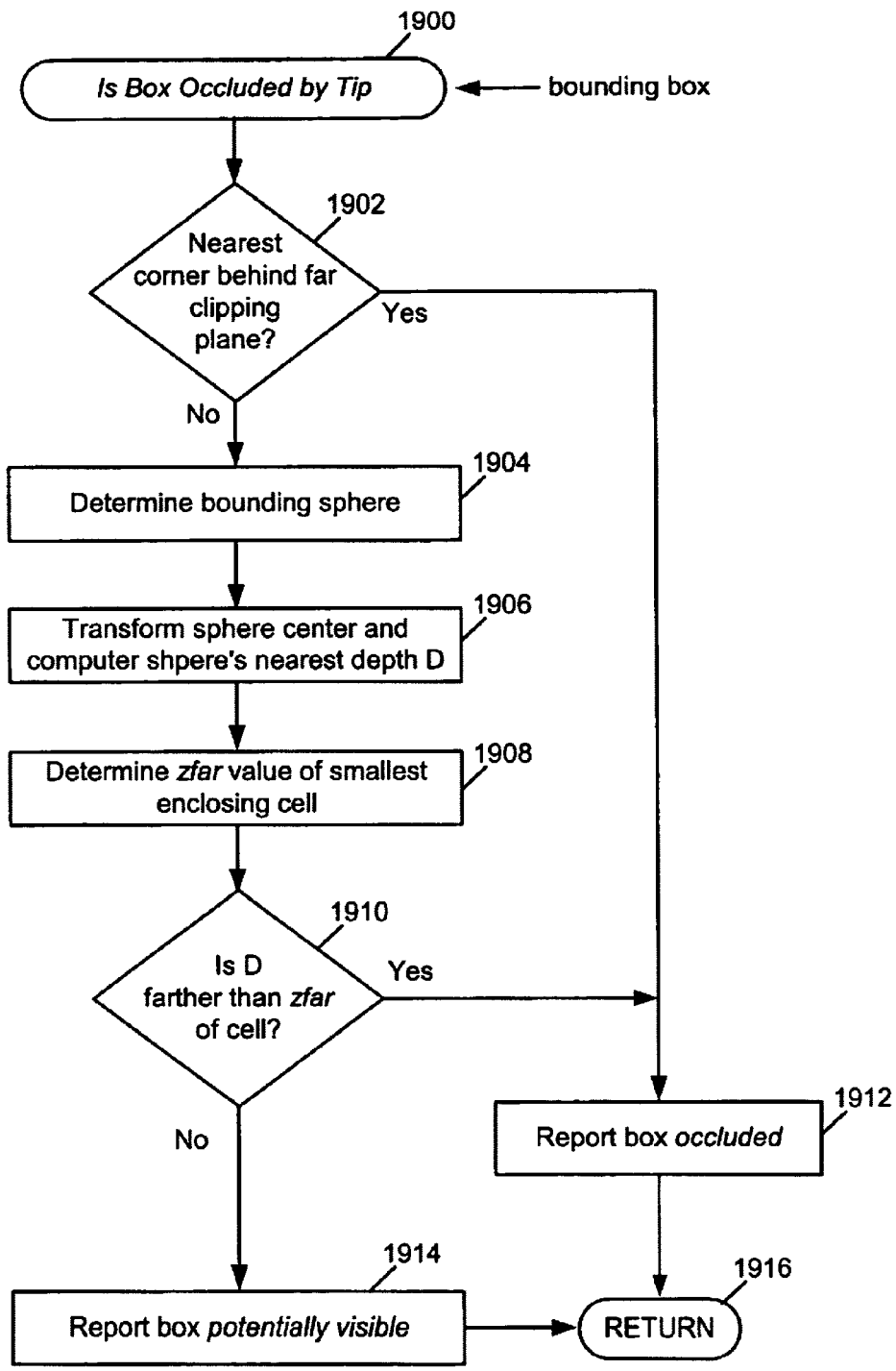
FIG. 19 is a flowchart of a method for determining whether a bounding box is occluded by the "tip" of the z-pyramid.

At step 702 of procedure Process Batch of boxes 700, the scene manager 112 uses the z-tip 116 to perform conservative culling on occluded bounding boxes using procedure Is Box Occluded by Tip 1900 (FIG. 19). This culling procedure 1900 is illustrated in FIGS. 18a and 18b, which show the coordinate frame of model space 1800 (the coordinate frame that the model is represented in), bounding boxes 1802 and 1804, the view frustum 1806 with its far clipping plane 1810, the current zfar value of the z-pyramid (i.e., pyramid_zfar) 1812, and the current zfar values for a row 1814 of cells within the coarsest N×N tile 1816 of the z-pyramid 170, including the zfar value of cell 1820.

To simplify illustration, the frustum is oriented so that the viewing axis 1822 is parallel to the page and four faces of the frustum are perpendicular to the page.

If pyramid_zfar 1812 is nearer than the depth of the far clipping plane 1810, this establishes a nearer value for the far clipping plane, so the far clipping plane is reset to this value. In FIG. 18a, resetting the far clipping plane to pyramid_far 1812 enables rapid culling of box 1802, since the depth of the nearest corner of box 1802 is farther than pyramid_zfar 1812.

Now the steps of procedure Is Box Occluded by Tip 1900 are described. The procedure is described infra as it applies to box 1804 in FIGS. 18a and 18b. Step 1902 determines whether the nearest corner of the box is farther than the far clipping plane. If so, step 1912 reports that the box is occluded, and the procedure terminates at step 1916. If not, control proceeds to step 1904, which determines a bounding sphere 1824 for the box 1804, and step 1906 transforms the sphere's center 1826 to perspective space and determines the depth D 1828 of the sphere's nearest point.

Next, step 1908 determines the smallest z-pyramid cell 1820 that encloses the sphere 1824 and reads the cell'szfar value. If depth D 1828 is farther than zfar (step 1910), step 1912 reports that the box is occluded (this is the case with box 1804) and the procedure terminates at step 1916.

Otherwise, step 1914 reports that the box is potentially visible and the procedure terminates at step 1916.

Summarizing this culling method, the scene manager 112 receives the tip of the z-pyramid 170 along with v-query results on connection 190 and uses these z-values to reset the far clipping plane and perform conservative culling of bounding boxes. The method described supra for culling boxes with the tip of the z-pyramid is very efficient because processing a box only requires transforming a single point (or none) and making a single depth comparison.

The tip of the pyramid is in fact a low-resolution z-pyramid, that is, a z-pyramid with lower resolution than the z-pyramid 170 maintained by the culling stage 130, or if there is no separate culling stage, than the z-pyramid maintained by a hierarchical rendering stage.

Data Flow within the Culling Stage

Figure 20:
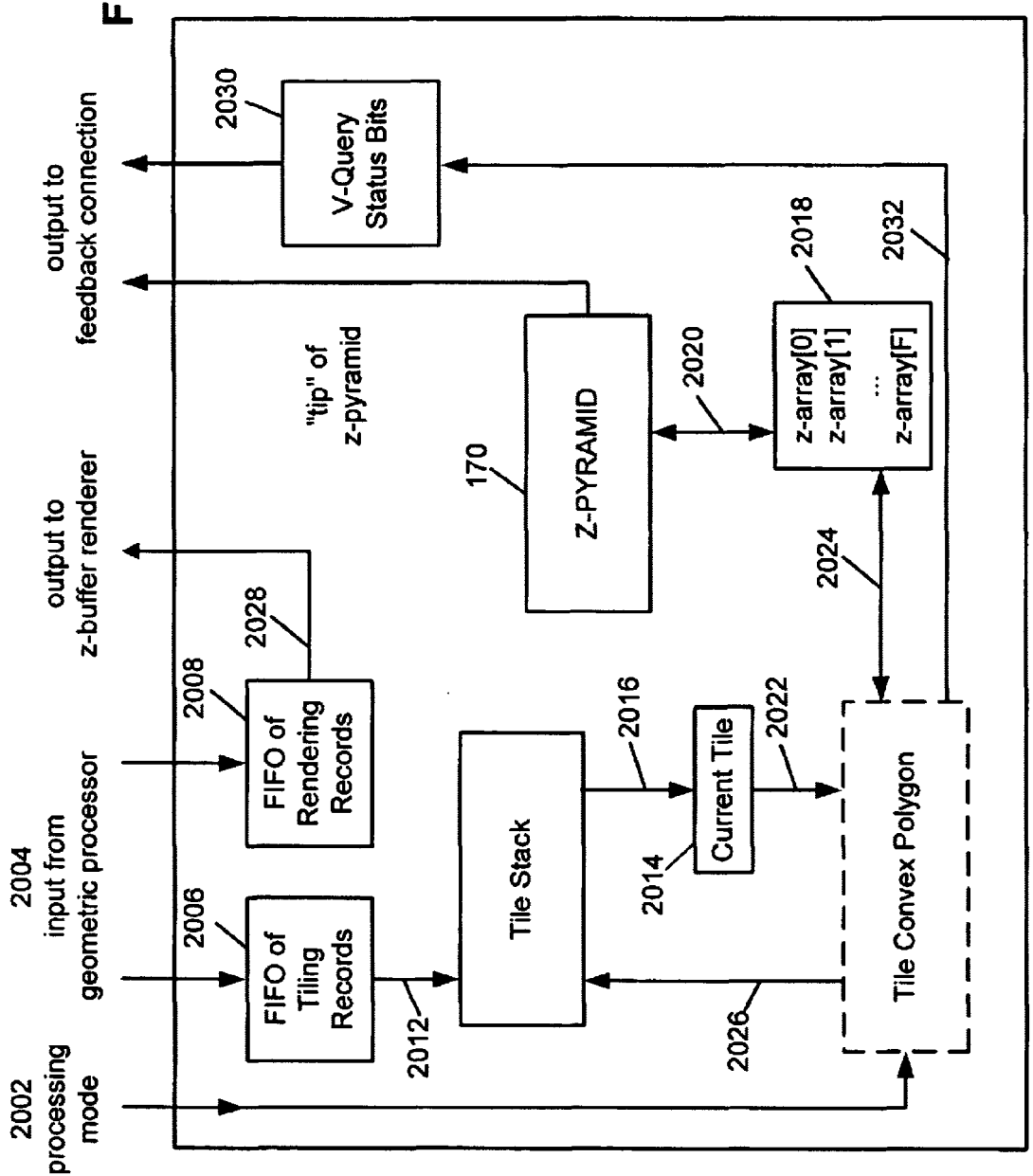
FIG. 20 is a block diagram of data flow within the culling stage.

FIG. 20 shows a block diagram of data flow within the culling stage 130. This is a high-level schematic diagram that does not include all data and signals that would be required in an implementation.

The input to the culling stage 130 is the processing mode 2002, either render of v-query, and a list of records for transformed polygons 2004 sent by the geometric processor 120. First, data flow is described when the culling stage 130 is operating in render mode and rendering a list of polygons with Tile Polygon List 800.

In this case, the geometric processor 120 outputs two records for each polygon, a tiling record and a rendering record, and these records are buffered in the FIFO of Tiling Records 2006 and the FIFO of Rendering Records 2008, respectively.

Tile Polygon List 800 processes polygons one by one until all polygons on the list have been tiled. For each polygon, the Tile Stack 2010 is initialized by copying the next tiling recording the FIFO of Tiling Records 2006 on connection 2012 (step 1104). The Current Tile register 2014 is loaded from the Tile Stack 2010 on connection 2016 (step 1108).

When Process N×N Tile 1300 performs occlusion and overlap tests (steps 1308 and 1310), edge and plane equations (which are part of tiling records) are read from the Current Tile register 2014 on connection 2022, and z-values are read from the list of z-arrays 2018 on connection 2024.

Whenever z-values are needed for a tile that is not stored in the list of z-arrays 2018, they are obtained from the z-pyramid 170, which involves writing an old tile record (if necessary) and reading a new tile record on connection 2020. When visible samples are encountered, z-values are written to the list of z-arrays 2018 on connection 2024 (step 1330). When z-values are propagated, z-values are read from and written to the list of z-arrays 2018 on connection 2024.

When new tiles are created (at step 1344), they are written to the Tile Stack 2010 on connection 2026.

When it is established that a polygon is visible (at step 1322 or step 1340), the polygon's record in the FIFO of rendering Records 2008 is output to the z-buffer renderer 140 on connection 2028. Records in the FIFO of rendering Records 2008 that correspond to occluded polygons are discarded.

Now data flow is considered when the culling stage 130 is operating in v-query mode and determining the visibility of bounding boxes with Process Batch of Boxes 700. In this case, the geometric processor 120 outputs tiling records and markers indicating "end of box" and "end of batch." Tiling records are buffered in the FIFO of Tiling Records 2006. When in v-query mode, the geometric processor 120 does not output rendering records, so none are loaded into the FIFO of Rendering Records 2008.

Flow of tiling records on connections 2012, 2016, 2022, and 2026 is the same as when in rendering mode.

z-values needed for depth comparisons at step 1308 are read from the list of z-arrays 2018 on connection 2024, but no z-values are written on this connection. If z-values are needed for a tile that is not stored in the list of z-arrays 2018, they are obtained from the z-pyramid 170, which involves writing an old tile record (if necessary) and reading a new tile record on connection 2020.

If a visible sample is discovered, the bit in V-Query Status Bits 2030 corresponding to the current box is set to visible on connection 2032 (step 710); otherwise the bit is set to occluded (step 712).

When the visibility of all boxes in the batch has been established, the V-Query Status Bits 2030 and the tip of the z-pyramid 170 are sent to the scene manager 112 on the feedback connection 190 (steps 714 and 716).

Other Ways of Reducing Image-Memory Traffic

The culling stage preferably uses a low-precision z-pyramid 170 in order to reduce storage requirements and memory traffic. The most straight forward way to implement a low-precision z-pyramid is to store each z-value in fewer bits than the customary precision of between 24 and 32 bits. For instance, storing z-values in 8 bits reduces storage requirements by a factor of 4 as compared with storing z-values in 32 bits.

Even greater reductions in the storage requirements of a z-pyramid used for conservative culling can be achieved with the modifications described below.

Reducing Storage Requirements with Coverage Masks

One way to reduce the storage requirements of a z-pyramid used for conservative culling is to maintain a coverage mask at each finest-level tile and the zfar value of the corresponding samples, which together will be called a mask-zfar pair. According to this method, the record for each finest-level tile in the z-pyramid consists of the following information, which will be called a mask-zfar record 7000 for a tile.

Mask-Zfar Tile Record 1. zfar value for the whole tile ($zfar_t$)
2. mask indicating samples within a region of the tile ($mask_t$)
3. zfar value for the region indicated by $mask_t$ ($zfar_m$)

The terms $zfar_t$, $mask_t$, and $zfar_m$ are defined above. Preferably, only tiles at the finest level of the z-pyramid are stored in mask-zfar records. At all other levels, tile records are arrays of z-values which are maintained by propagation. Preferably, individual z-values within these arrays are stored at low precision (e.g., in 12 bits) in order to conserve storage. Note that in embodiments having a separate z-buffer for final rendering, the finest level of the z-pyramid described here need not have a resolution that is as fine as that of the separate rendering z-buffer.

The advantage of using mask-zfar records is that they require very little storage. For example, if $zfar_t$ and $zfar_m$ are each stored in 12 bits, the record for a 4×4-sample tile would require only 40 bits, 24 bits for these z-values and 16 bits for mask, (one bit for each sample).

This is only 2.5 bits per sample, more than a three-fold reduction in storage compared with storing an 8-bit z-value for each sample, and more than a twelve-fold reduction in storage compared with storing a 32-bit z-value for each sample.

It is not essential to store zfar in mask-$zfar_t$ records, because the identical z-value is also stored in the record for the parent tile. Eliminating $zfar_t$ from mask-zfar records would reduce storage requirements to 1.75 bits per sample for a 4×4 tile, given the assumptions stated above. However, this approach requires that the parent tile's records be read more often when finest-level tiles are processed, which is a disadvantage.

Figure 23:
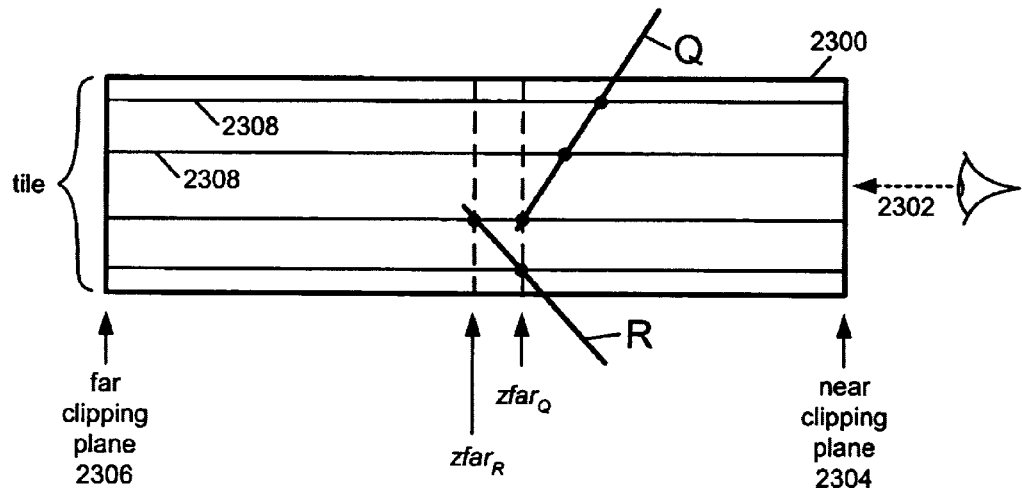
FIG. 23 is a side view of a 4×4 tile in the z-pyramid and two triangles that cover it.

FIGS. 22a, 22b and 22c (collectively referred to herein as FIG. 22), and FIG. 23, show an example illustrating how $zfar_t$ advances when polygons that cover a tile are processed.

FIG. 22 shows a 4×4 tile 2200 at the finest level of the z-pyramid having uniformly spaced samples 2202 that are covered by two triangles, labeled Q and R.

FIG. 23 shows a side view of the tile 2200, which in three dimensions is a rectangular solid 2300 having a square cross-section. Given the indicated direction of view 2302, the right-hand end 2304 of the solid 2300 is the near clipping plane and the left-hand end 2306 of the solid 2300 is the far clipping plane.

The four thin horizontal lines 2308 indicate the positions of rows of samples within the tile. The two inclined lines indicate the positions of triangles Q and R, which are oriented perpendicular to the page to simplify the illustration.

When the z-pyramid is initialized at the beginning of a frame, mask-zfar records in the z-pyramid are initialized as follows: $zfar_t$ is set to the depth of the far clipping plane and $mask_t$ is cleared to all zeros, meaning that no samples are covered. Thus, before processing any polygons at tile 2200, $zfar_t$ is the depth of the far clipping plane 2306 and $mask_t$ is all zeros.

Suppose that Q is the first polygon processed at tile 2200. When Q is processed, the bits in $mask_t$ are set that correspond to the samples covered by Q (these are the samples within the crosshatched region 2204 in FIG. 22b) and $zfar_m$ is set to the depth of the farthest sample covered by Q, labeled $zfar_Q$ in FIG. 23.

Later, when R is processed, its mask (indicated by the crosshatched region 2206 in FIG. 22c) and its zfar value within the tile (labeled $zfar_R$ in FIG. 23) are computed. Since R's mask 2206 and $mask_t$ (in this case, Q's mask 2202) collectively cover the tile 2200, a nearer value has been established for $zfar_t$, in this case $zfar_R$, so $zfar_t$ is set to $zfar_R$.

This illustrates how $zfar_t$ advances when one or more polygons covering a tile are processed, which enables conservative culling of occluded polygons that are encountered later.

Next, the general method is described for updating a mask-zfar record when a polygon is processed. Cases that need to be considered are schematically illustrated in FIG. 24.

Figure 24:
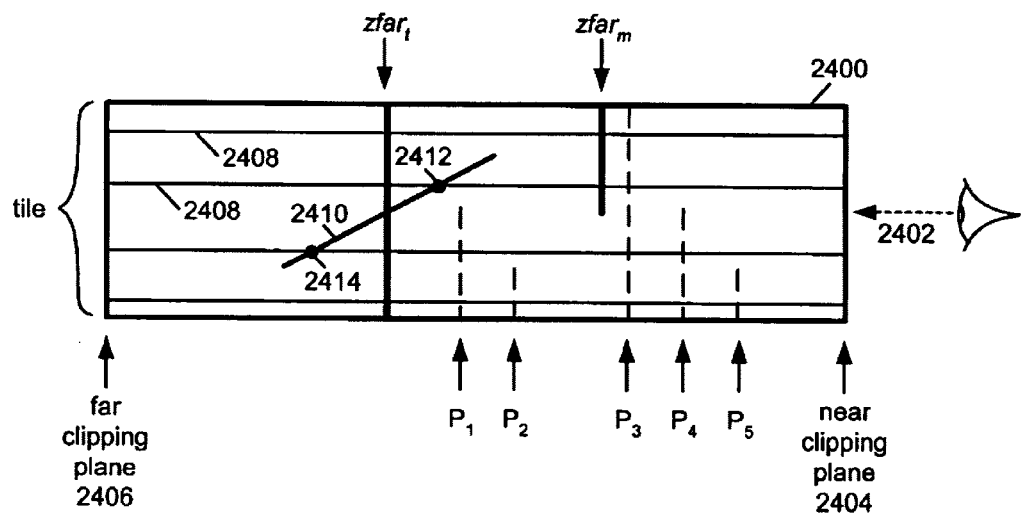
FIG. 24 is a schematic side view of a 4×4 tile in the z-pyramid.

FIG. 24 shows a side view of a 4×4 tile, which in three dimensions is a rectangular solid 2400 having a square cross-section. Given the indicated direction of view 2402, the right-hand end 2404 of the solid 2400 is the near clipping plane and the left-hand end 2406 of the solid 2400 is the far clipping plane.

The fourth in horizontal lines 2408 indicate the positions of rows of samples within the tile. The bold vertical lines at depths $zfar_t$ and $zfar_m$ represent the occlusion information stored in the tile's mask-zfar record. The bold line at depth $zfar_t$ covers the whole tile and the bold line at depth $zfar_m$ indicates the samples covered by $mask_t$.

The numeral 2410 identifies a polygon that is oriented perpendicular to the page.

The dashed vertical lines labeled $P_1$, $P_2$, $P_3$, $P_4$, and $P_5$ represent possible positions of the next polygon to be processed, indicating the region of the tile covered by visible samples on the polygon and the polygon's zfar value in relation to $zfar_m$ and $zfar_t$. Here, the "polygon's zfar value" is the farthest z of its potentially visible samples, so this z-value must be nearer than $zfar_t$.

Although coverage is only depicted schematically, the basic cases are distinguished: the polygon covers the whole tile (case $P_3$), the polygon covers the tile in combination with $mask_t$ (cases $P_1$ and $P_4$), and the polygon does not cover the tile in combination with $mask_t$ (cases $P_2$ and $P_5$).

If each sample on a polygon lies behind $zfar_t$ or is covered by $mask_t$ and lies behind $zfar_m$, the polygon is occluded within the tile. For example, polygon 2410 in FIG. 24 (oriented perpendicular to the page for convenience), is occluded because sample 2412 is inside $mask_t$ and behind $zfar_m$ and sample 2414 is behind $zfar_t$.

When using mask-zfar records in the z-pyramid, changes must be made when reading or writing a finest-level tile in procedures Tile Convex Polygon 100 and Read Z-Array 1200. When step 1206 of Read Z-Array 1200 reads the mask-zfar record of a finest-level tile (which includes $zfar_t$, $mask_t$, and $zfar_m$), the z-value of each sample is written to z-array[L] (where L is the finest level). The z-value of each sample covered by $mask_t$ is $zfar_m$ and the z-value of all other samples is $zfar_t$.

When writing the record for a finest-level tile, instead of writing z-array[L] at step 1120 of Tile Convex Polygon 1100, a new mask-zfar record is created from z-array[L] with procedure Update Mask-Zfar Record 2500 and this record is written to the z-pyramid.

If all samples on the polygon are occluded (as with polygon 2410, for example), step 1120 is not executed, so neither is Update Mask-Zfar Record 2500.

Figure 25:
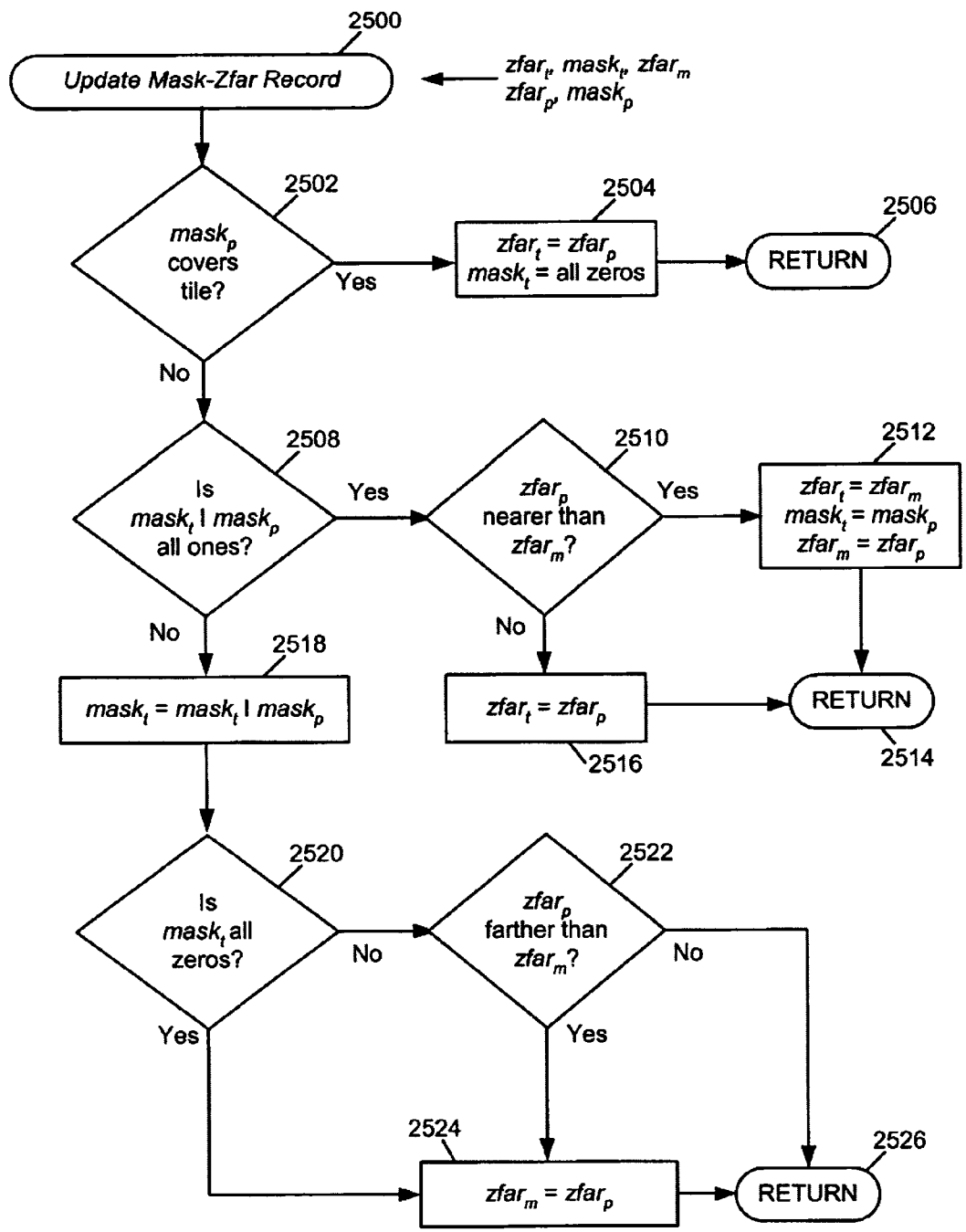
FIG. 25 is a flowchart of the method for updating a mask-zfar tile record.

Update Mask-Zfar Record 2500 (FIG. 25) receives as input the values in the old mask-zfar record (i.e., $zfar_t$, $zfar_m$, and $mask_t$), the mask for samples where the polygon is visible within the tile (call this $mask_p$), and the zfar value of these samples (call this $zfar_p$). $mask_p$ and $zfar_p$ can be computed efficiently within Process N×N Tile 1300 as it loops over the samples in a tile.

At step 2502, if $mask_p$ covers the whole tile (i.e., it is all ones, which means that the polygon is visible at all samples, as for case $P_3$ in FIG. 24), at step 2504 $zfar_t$ is set to $zfar_p$ and $mask_t$ is cleared to all zeros, and the procedure terminates at step 2506. Otherwise, control proceeds to step 2508 where if $mask_t/mask_p$ is all ones (where "|" is the logical "or" operation), the polygon and $mask_t$ collectively cover the tile, and in this case, control proceeds to step 2510.

At step 2510, if $zfar_p$ is nearer than $zfar_m$ (e.g. $P_4$ in FIG. 24), a nearer zfar value has been established and step 2512 sets $zfar_t$ to $zfar_m$, $mask_t$ to $mask_p$, and $zfar_m$ to $zfar_p$, followed by termination at step 2514. If $zfar_p$ is not nearer than $zfar_m$ at step 2510 (e.g. $P_1$ in FIG. 24), step 2516 sets $zfar_t$ to $zfar_p$, followed by termination at step 2514.

If $mask_t/mask_p$ is not all ones at step 2508, the polygon and $mask_t$ do not collectively cover the tile, and the occlusion information for the polygon and $mask_t$ are combined as follows. Step 2518 sets $mask_t$ to $mask_t/mask_p$ (where "|" is the logical "or" operation). Next, at step 2520, if $mask_t$ is all zeros, control proceeds to step 2524, which sets $zfar_m$ to $zfar_p$, followed by termination of the procedure at step 2526.

If $mask_t$ is not all zeros at step 2520, control proceeds to step 2522, where, if $zfar_p$ is farther than $zfar_m$, control proceeds to step 2524. For example, with $P_2$ in FIG. 24, $zfar_p$ is farther than $zfar_m$, so step 2524 would be executed.

If $zfar_p$ is not farther than $zfar_m$ at step 2522 (as is the case with $P_5$ in FIG. 24), the procedure terminates at step 2526.

Some of the operations performed by Update Mask-Zfar Record 2500 can be done in parallel.

In summary, the advantage of using mask-zfar pairs to store occlusion information in a z-pyramid used for conservative culling is that it requires very little storage (for example, 2.5 bits per image sample). The disadvantage of this approach is that maintaining occlusion information is more complicated and culling efficiency may not be as high.

To illustrate the savings in storage that can be achieved, when the finest level of a z-pyramid having 4×4 decimation is stored as mask-zfar tile records, each record including two 12-bit z-values and one 16-bit coverage mask, and the other levels of the z-pyramid are stored as arrays of 12-bit z-values, the z-pyramid requires approximately 3.30 bits of storage per sample in the finest level. In this case, the total bits of storage in a 32-bit z-buffer having the same resolution is approximately ten times greater than the total bits of storage in the z-pyramid.

Even though depth information in the finest level of the z-pyramid is not represented in a conventional form when mask-zfar records are employed, herein the terms "z-pyramid" and "hierarchical depth buffer" will still be applied to this data structure.

The prior art includes the A-buffer visible-surface algorithm that maintains pixel records that include coverage masks and z-values. At individual pixels, the A-buffer algorithm maintains a linked list of visible polygon fragments, the record for each fragment including a coverage mask indicating the image samples covered by the fragment, color and opacity values, and znear and zfar values, each stored in floating-point format. This record format is designed to resolve color and visibility at each image sample, enabling high-quality antialiasing of pixel values.

Although the A-buffer record format could be employed at finest-level tiles in the z-pyramid, its variable-length, linked-list format greatly complicates processing and requires dynamic memory allocation. By comparison, the method described herein of performing conservative occlusion culling using a single coverage mask at a tile is much simpler and much easier to implement in hardware.

Culling With a Low-resolution Z-pyramid

As previously mentioned, a separate culling stage 130 in the graphics system 100 enables conservative culling with a low-precision z-pyramid, that is, a z-pyramid having the same resolution as the z-buffer, but in which z-values are stored at low precision, for example, as 8-bit or 12-bit values. Alternatively, the culling stage 130 can employ a low-resolution z-pyramid, that is, a z-pyramid having lower resolution than the z-buffer. As previously mentioned, the resolution of a z-pyramid is the resolution of its finest level.

For example, a single zfar value could be maintained in the finest level of the z-pyramid for each 4×4 tile of image samples in the image buffer 150. As applied to the 64×64 image raster of FIG. 2 (only partially shown), level 230 would be the finest level of the low-resolution z-pyramid, and each cell within this level would represent a conservative zfar value for the corresponding 4×4 tile of image samples in the image raster. For instance, cell 218 would contain a conservative zfar value for the image samples in 4×4 tile 220.

Definitive visibility tests cannot be performed using a low-resolution z-pyramid, but conservative culling can be performed. The disadvantage of a low-resolution z-pyramid is that it has lower culling efficiency than a standard z-pyramid, and this increases the workload on the z-buffer renderer 140.

However, a low-resolution z-pyramid has the advantage of requiring only a fraction of the storage, and storage requirements can be further reduced by storing zfar values at low-precision (e.g., 12 bits per value). In cases where the reduction in storage requirements enables the z-pyramid to be stored entirely on-chip, the resulting acceleration of memory access can improve performance substantially. In short, using a low-resolution z-pyramid impairs culling efficiency but reduces storage requirements and can increase culling speed in some cases.

To illustrate the savings in storage that can be achieved with a low-resolution z-pyramid, consider a graphics system with a 1024 by 1024 z-buffer in the rendering stage and a 256 by 256 z-pyramid in the culling stage. Assuming 32-bit z-values in the z-buffer, 12-bit z-values in the z-pyramid, and 4×4 decimation from level to level of the z-pyramid, the total bits of storage in the z-buffer would be approximately 40 times greater than the total bits of storage in the z-pyramid.

Using a low-resolution z-pyramid requires only minor changes to the rendering algorithm that has already been described for the graphics system 100 of FIG. 1. In fact, it is only necessary to change procedure Process N×N Tile 1300.

At step 1324, control proceeds to step 1334, which determines whether the polygon completely "covers" the cell. This occurs only if the cell is completely inside all of the polygon's edges. Whether a cell lies completely inside an edge can be determined with the edge-cell test described in connection with step 1310, except that instead of substituting the cell's corner that is farthest in the "inside direction" into the edge equation, the opposite corner is substituted.

If the polygon does not completely cover the cell, control returns to step 1304. Otherwise, step 1336 computes the zfar value of the plane of the polygon within the cell, which is done as previously described for computing the plane's znear value at step 1308, but instead of substituting the "nearest corner" of the cell into the plane equation, the opposite corner is substituted, since this is where the plane is farthest within the cell.

In FIG. 14, for example, the corner 1408 is the "nearest corner" of cell 1402, meaning that the plane of polygon 1400 is nearest to the observer at that corner. Therefore, the plane of polygon 1400 is farthest from the observer at the opposite corner 1410, so to establish the z far value for the plane of polygon 1400 within cell 1402, the x and y coordinates of this corner 1410 are substituted into the plane equation, which has the form z=Ax+By+C.

If at step 1336 the plane's zfar value is nearer than the corresponding value for the current cell in z-array[F] (where F is the index of the finest level), control proceeds to step 1326, which sets changed to TRLE. Then step 1328 updates zfar_finest, overwriting zfar_finest with the plane'zfar value, if the plane's zfar value is farther than the current value of zfar_finest. Next, step 1330 overwrites the value for the current cell in z-array[F] with the plane's zfar value, and control returns to step 1304.

The optional shading step 1332 is not compatible with using a low-resolution z-pyramid. At step 1336, if the plane'szfar value is not nearer than the corresponding value in z-array[F], control returns directly to step 1304.

FIG. 26 shows a side view of a cell in the z-pyramid, which in three dimensions is a rectangular solid 2600 having a square cross-section. Given the indicated direction of view 2602, the right-hand end 2604 of the solid 2600 is the near clipping plane and the left-hand end 2606 of the solid 2600 is the far clipping plane. The bold vertical line indicates the current z-value 2608 stored in the z-pyramid cell.

The three inclined lines, 2610, 2620, and 2630, indicate the positions of three polygons, each covering the cell and each oriented perpendicular to the page to simplify illustration. For each polygon, its znear and zfar values within the cell are shown by dashed lines.

Now, the procedure Process N×N Tile 1300 processes these polygons within this cell, assuming a low-resolution z-pyramid.

Polygon 2610 would be determined to be occluded within the cell at step 1308, because its znear value 2612 is farther than the z-pyramid value 2608.

Polygon 2620 would be determined to be visible because its znear value 2622 is nearer than the current z-pyramid value 2608, but the z-pyramid would not be overwritten with the polygon's zfar value 2624 because the polygon's zfar value 2624 is farther than the current z-pyramid value 2608.

Polygon 2630 would be determined to be visible because its znear value 2632 is nearer than the current z-pyramid value 2608, and the z-pyramid would be overwritten with the polygon's zfar value 2634 because the polygon's zfar value 2634 is nearer than the current z-pyramid value 2608.

Now an alternative way of updating a low-resolution z-pyramid in the culling stage 130 is described. When the z-buffer renderer 140 encounters visible depth samples on a polygon, they are copied to the culling stage 130 and propagated through the z-pyramid 170. This method requires a connection 185 for copying z-values from the z-buffer renderer 140 to the culling stage 130, which is drawn in a dashed arrow in FIG. 1 to indicate that this is just an option. If z-values in the z-pyramid 170 are stored at lower precision than z-values in the z-buffer 180, z-values maybe converted to low-precision values before they are copied. When the culling stage 130 receives new depth samples on connection 185, they are propagated through the z-pyramid using the traditional propagation algorithm.

When this method is employed, it is not necessary to update the z-pyramid during tiling of polygons by the culling stage, which simplifies the tiling algorithm considerably. In fact, in procedures Tile Convex Polygon 1100 and Process N×N Tile 1300, only the steps performed in v-query mode are necessary, except for outputting rendering records when visible polygons are encountered.

Varying Z Precision Within a Z-pyramid

In the description of procedure Process N×N Tile 1300, for the preferred embodiment of the invention, the culling and rendering stages are separate and have their own depth buffers, but it is possible to combine the two stages in a single "hierarchical renderer" having a single z-pyramid used for both culling and rendering.

In this case, the finest level of the z-pyramid is a z-buffer in which z-values are stored at full precision (e.g., in 32 bits per z-value) so that visibility can be established definitively at each image sample. At other pyramid levels, however, it is not necessary to store z-values at full precision, since culling at those levels is conservative.

Thus, at all but the finest pyramid level, it makes sense to store z-values at low precision (e.g., in 12 bits) in order to conserve storage and memory bandwidth and improve caching efficiency. Frequently, only z-values at coarse levels of the pyramid need to be accessed to determine that a bounding box or primitive is occluded, so caching the coarsest levels of the pyramid can accelerate culling significantly. Using low-precision z-values enables more values to be stored in a cache of a given size, thereby accelerating culling.

When low-precision z-values are employed in a pyramid as described above, the average precision of z-values in the z-buffer is higher than the average precision of z-values in the entire z-pyramid. For example, for a z-pyramid having 4×4 decimation from level to level and a 1024 by 1024 z-buffer in which z-values are stored at 32 bits of precision, and in which z-values in the other pyramid levels are stored at 12 bits of precision, then the average z-precision in the z-buffer is 32 bits per z-value and average z-precision in the entire z-pyramid is approximately 30.9 bits per z-value.

Hierarchical Z-buffering With Non-conservative Culling

Even with the efficiency of hierarchical z-buffering, at some level of complexity it may not be possible to render a scene within the desired frame time. When this occurs, accuracy can be traded off for speed by culling objects that may be slightly visible, that is, by performing non-conservative occlusion culling. Although this can noticeably impair image quality, in some cases this is acceptable for faster frame generation. #### The speed versus accuracy tradeoff is controlled as follows. The error limit is defined as the maximum number of tiling errors that are permitted within a finest-level tile of the z-pyramid when tiling a particular polygon. A tiling error consists of failing to overwrite an image sample where a polygon is visible.

Using an error limit E permits non-conservative culling to be performed with one modification to the basic algorithm for hierarchical tiling. When propagating depth values through the z-pyramid, at each finest-level tile, instead of propagating the farthest z-value to its parent tile, the z-value of rank E is propagated, where the farthest z-value has rank 0 and the nearest z-value has rank N2−1.

Thus, when E is 0 the farthest z is propagated when E is 1 the next-to-the-farthest z is propagated, when E is 2 the next-to-the-next-to-the-farthest z is propagated, and so forth. When propagating at other levels of the pyramid (i.e., except when propagating from the finest level to the next-to-the-finest level), the farthest z value in the child tile is propagated, as in a traditional z-pyramid.

Using this propagation procedure, except at the finest level, each z-value in the z-pyramid is the farthest rank-E z-value for any finest-level tile in the corresponding region of the screen. It follows that the occlusion test performed at step 1308 of procedure Process N×N Tile 1300 will automatically cull a polygon in any region of the screen where it is potentially visible at E or fewer image samples within any finest-level tile.

This method avoids some of the subdivision required to definitively establish the visibility of polygons or portions of polygons that are potentially visible at only a small number of image samples, thereby reducing both memory traffic and computation. Moreover, this advantage is compounded when culling bounding boxes, since culling of a "slightly visible" box saves the work required to process all polygons inside it.

Each polygon which is potentially visible at more than E image samples within a finest-level tile is processed in the usual way, so all of its visible image samples within these tiles are written.

This method of non-conservative culling requires the following modifications to procedure Process N×N Tile 1300, assuming an error limit of E.

First, instead of maintaining the farthest of the existing z-values for a finest-level tile in variable zfarx[F] (where F is the index of the finest pyramid level), the z-value of rank E among the existing z-values for that tile is maintained. For example, if E is one, after looping over a finest-level tile in procedure Process N×N Tile 1300, variable zfarx[F] contains the next-to-the-farthest z-value of the z-values that were originally stored for that tile. This modification requires changing procedure Update zfarx 1600 when variable L is the index of the finest level.

Second, instead of maintaining the farthest z-value encountered so far for the tile being processed in variable zfar_finest, the z-value of rank E among those z-values is maintained in zfar_finest. For example, if E is one, after looping over a finest-level tile in procedure Process N×N Tile 1300, variable zfar finest would contain the next-to-the-farthest z-value in z-array[F], where F is the index of the finest pyramid level.

Given these two modifications, procedure Propagate Z-Values 1700 propagates the correct z-values through the z-pyramid.

One way of thinking of this method for non-conservative occlusion culling is that the error limit provides a convenient, predictable "quality knob" that controls the speed versus quality tradeoff. When the error limit is zero, the method performs standard hierarchical z-buffering and it produces a standard image that is free of visibility errors. Otherwise, the higher the error limit, the faster the frame rate but the poorer the image quality.

When it is important to maintain a particular frame rate, the error limit can be adjusted accordingly, either by the user or by the rendering program, either at the beginning of a frame or during frame generation.

The method can be applied whether the image is point sampled or oversampled, so the speed versus quality spectrum ranges from relatively fast generation of point-sampled images with numerous visibility errors to relatively slow generation of accurately antialiased images that are free of visibility errors.

One shortcoming of this method of non-conservative culling is that it is possible that up to E image samples may never be tiled within a finest-level tile, even though they are covered by polygons that have been processed. This behavior can be avoided by adding an additional propagation rule: always propagate the farthest z-value until all image samples within a finest-level tile have been covered.

Other simple modifications to propagation rules may also improve image quality. For example, to make errors less noticeable propagation rules could be structured to avoid errors at adjacent image samples.

If multiple depth values are maintained corresponding to multiple error limits in the z-pyramid, different error limits can be selected depending on circumstances. For example, a higher error limit could be used when tiling bounding boxes than when tiling primitives, since culling abounding box can save a lot of work. This approach does not require any changes to the finest level of the z-pyramid, but it requires propagating and storing multiple z-values for each cell at the coarser levels of the z-pyramid.

For example, if two z-values are maintained for each child tile at cells in levels of the z-pyramid that are coarser than the finest level, the farthest z-value and the next-to-the-farthest z-value within the corresponding region of the screen, then the farthest z-values could be applied to culling primitives and the next-to-the-farthest z-values could be applied to culling bounding boxes.

Summarizing the changes to the z-pyramid that are required when performing non-conservative culling for an error limit of E, the same information is stored at the finest level as with ordinary conservative culling, but at all coarser levels, instead of storing the farthest z-value within the corresponding region of the screen, the rank-E z-value for the corresponding region of the screen is stored. For example, if E is one, each z-value at levels that are coarser than the finest level is the next-to-the-farthest z-value for the corresponding region of the screen.

To support culling with K different error limits, it is necessary to store K z-values for each z-pyramid cell at levels of the pyramid that are coarser than the finest level, each of these K z-values corresponding to one of the error limits.

Implementation Issues

Although each of the stages in the graphics system 100 of FIG. 1 can be implemented in either software or hardware, at the present time, it is more practical to implement the scene manager 112 in software and to implement the culling stage 130 and the z-buffer renderer 140 in hardware. Software implementation of the scene manager 112 is preferred because of the relative complexity of the operations it performs and the flexibility that software implementation provides.

Hardware implementation of the culling stage 130 and the z-buffer renderer 140 is preferred because, presently, it is not practical to attain real-time rendering of very complex scenes with software implementations. Although operations of the geometric processor 120 can be accelerated by hardware implementation, a software implementation running on the host processor may provide adequate performance.

As processor performance improves over time, implementation of the entire system in software running on one or more general-purpose processors becomes increasingly practical.

OCCLUSION CULLING WITH Z-TIP COPYING

FIG. 7, described above, illustrates a box culling method which takes advantage of hardware assistance both by sending visibility queries to the hardware and by obtaining a hardware-created z-pyramid portion into host memory for testing directly by the host processor. Applicant has discovered that in many situations, visibility queries are not necessary. An embodiment will now be described in which the only assistance that the host system obtains from the graphics system is the obtaining of a hardware-created z-pyramid portion into host memory for testing directly by the host processor.

Apparatus

In FIG. 1, all of the memory in the graphics system 100 is considered herein to be "graphics memory." This includes the z-pyramid 170, the z-buffer 180, the image buffer 150, the display buffer 151 in some embodiments if pre sent, and may include other data structures as well. Graphics memory in different embodiments can be located entirely in a single memory device, or divided among a plurality of memory devices, or it can be on-chip with part or all of the graphics processor (the logic that performs graphics processing using the structures in graphics memory), or it can be partially on-chip and partially off-chip with the graphics processor. Similarly, the host memory 115 can be located entirely in a single memory device, or divided among a plurality of memory devices, or it can be on-chip with part or all of the host processor 110, or it can be partially on-chip and partially off-chip with the host processor 110. Host memory is distinguished from graphics memory in that the host processor is able to access host memory more quickly, and typically much more quickly, than it can access graphics memory. This may be the case, for example, where the host memory is located in the memory address space of the host processor while the graphic memory is accessible to the host processor only via an I/O access. In one embodiment, the graphics memory is located together with the graphics processor on a graphics card, which plugs into an Accelerated Graphics Port (AGP) bus on the motherboard of the host system. The AGP bus is described in Intel Corporation, "Accelerated graphics port interface specification," Rev. 2.0 (May 4, 1998), incorporated by reference herein, and as updated and clarified by documents released by the AGP Forum.

The host processor 110, as used herein, includes all processors that perform any part of the task of pre-culling objects from a model before sending them to the graphics system for rendering. In a multiple processor system, for example, the host processor 110 can include all processors. Similarly, the graphics processor can be integrated onto a single chip or several chips in different embodiments.

Host memory 115 may be either partially or completely cached for the host processor 110 but since caching is transparent to the graphics software running in host processor 110, any such cache is considered herein to be merely a part of host memory 115.

In the presently described embodiment, the z-pyramid 170 takes advantage of mask-zfar depth value encoding as described above. It is therefore sometimes referred to herein as "zm-pyramid" 170. Preferably, the zm-pyramid 170 has N×N decimation from level to level and is organized in N×N tiles, where N is a power of 2. Although the illustrations of the zm-pyramid 170 suggest pyramids with 2×2 decimation, this was done to simplify illustration, and 4×4 or 8×8 decimation is preferred.

The record for each N×N tile in the finest level 171 of the zm-pyramid 170 is represented by a coverage mask and a "zfar" value indicating the farthest z value of image samples indicated by the mask. For all coarser levels of the zm-pyramid 170, for example the level labeled 172, tile records are N×N arrays of z values as in a conventional z-pyramid. To conserve storage, preferably, z values throughout the zm-pyramid are stored at lower precision than the 24-bit or 32-bit "full-precision" z values that are typically used in conventional z-buffers. For example, 8-bit or 16-bit z values are sufficient for conservative culling operations performed by the culling stage. Preferably, the finest level 171 of the zm-pyramid 170 has the same arrangement of image samples as the z-buffer 180.

Preferably, the scene manager 112 is implemented in software running on host processor 110 which can quickly access host memory 115.

A "feedback connection" 190 enables the culling stage 130 to copy the "tip" of the zm-pyramid 170 into host memory 115. The tip of the z-pyramid will be called the "z-tip" 116. Thus, the scene manager 112 is able to quickly access the z-tip 116, thereby enabling it to perform culling operations efficiently.

The culling stage 130 and its zm-pyramid 170 together with the z-buffer renderer 140 and its z-buffer 180 form the "hierarchical culling and rendering subsystem" 135. Two variations of this subsystem 135 which may be substituted into the graphics system 100 are considered next, FIG. 6 is a block diagram of a first variation of the hierarchical culling and rendering system, which is labeled 635. In this variation, a hierarchical renderer 601 performs conventional hierarchical z-buffering using a conventional z-pyramid 670. In this case, the finest level 671 of the z-pyramid 670 is a conventional z-buffer in which depth values are stored at full precision so that visibility can be accurately established at individual image samples. In typical z-buffer systems, full-precision z values are each stored in 24 or 32 bits. In the coarser levels of the z-pyramid 670, for example the second level labeled 672, it is not necessary to store z values at full precision, and to conserve storage they may be stored in fewer bits. For example, 8-bit or 16-bit values may be used. Conserving storage is particularly important for pyramid levels that are stored "on chip," (on the same chip as part or all of the graphics processor) rather than in a memory device that is external to the chip containing the hierarchical renderer 601.

Figure 4:
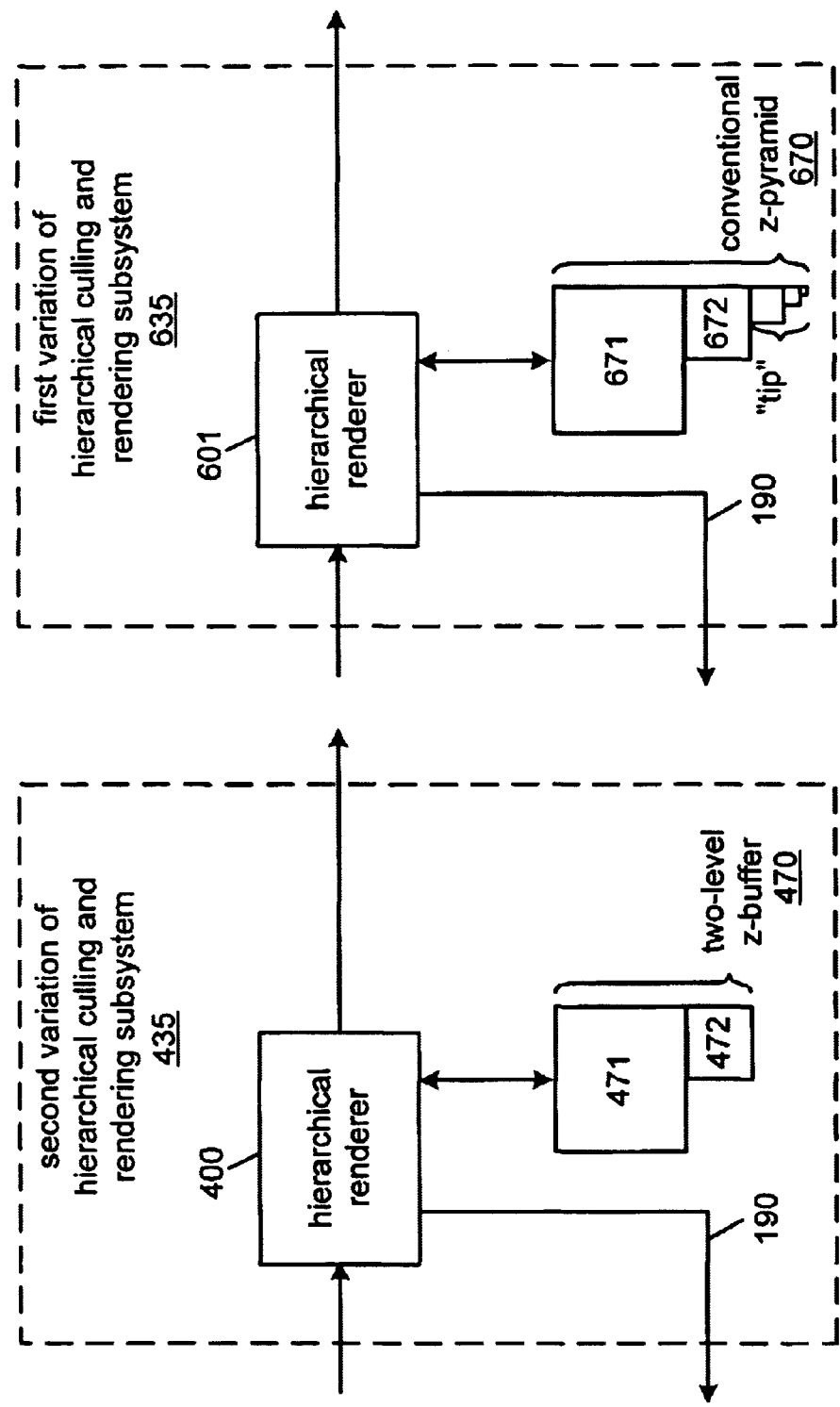
FIG. 4 is a block diagram of a second variation of a culling and rendering subsystem.

FIG. 4 is a block diagram of a second variation of the hierarchical culling and rendering system, which is labeled 435. In this variation, a hierarchical renderer 400 performs hierarchical z-buffering using a two-level z-buffer 470. In this case, the finer level 471 of the z-buffer 470 is a conventional z-buffer in which depth values are stored at full precision so that visibility can be accurately established at individual image samples. In the z-buffer's coarser level 472 it is not necessary to store z values at full precision, and to conserve storage they may be stored in fewer bits. For example, 8-bit or 16-bit values may be used. Conserving storage in the coarser level 472 is particularly important if it is stored "on chip,"

Z-pyramids and zm-pyramids each have a plurality of levels which each include a depth buffer, so they can also be referred to as "hierarchical depth buffers." Consistent with the definitions used herein, z-buffer 470 is a "hierarchical depth buffer" but, because it does not include the apex of a depth pyramid, it is only a "portion" of(specifically, two levels of) a z-pyramid.

Although the z-pyramids and zm-pyramids illustrated herein are organized as nested squares corresponding to a square image, in general, it is not necessary that the image be square or that the pyramid levels have the same number of rows and columns.

The scene manager 112 is implemented in software running on host processor 110. It reads the scene model from host memory 115, maintains geometric data structures for the scene model in host memory 115, and initiates the flow of polygons through the graphics system 100. It also issues commands, such as those that initialize the image buffer 150 and depth buffers 170, 180 prior to rendering a frame (all z values in the z-buffer 180 and zm-pyramid 170 are initialized to the depth of the far clipping plane). The scene manager 112 maintains the model in three-dimensional "model space" or "object space."

The geometric processor 120 transforms polygons from model or object space to two-dimensional "image space" or to "perspective space." In some systems, this is done in software on the host processor, in which case the geometric processor is the same as the host processor. In other systems, the geometric processor is another processor in the graphics pipeline or custom hardware that is dedicated to transforming polygons.

Although the system is structured to facilitate "box culling" and "rooms-and-portals" culling, it can also operate without using these culling methods. When these methods are not employed, the scene manager 112 sends every polygon in the scene through the system (or at least every "on-screen" polygon). Each polygon is transformed to perspective space by the geometric processor 120, tested for occlusion by the culling stage 130, and if it is not found to be occluded by the zm-pyramid 170, it is rendered by the z-buffer renderer 140. This is not an efficient way to render densely occluded scenes because all on-screen polygons must be processed, even though only a small fraction of them are actually visible.

Rendering a Scene with Box Culling

Figure 21:
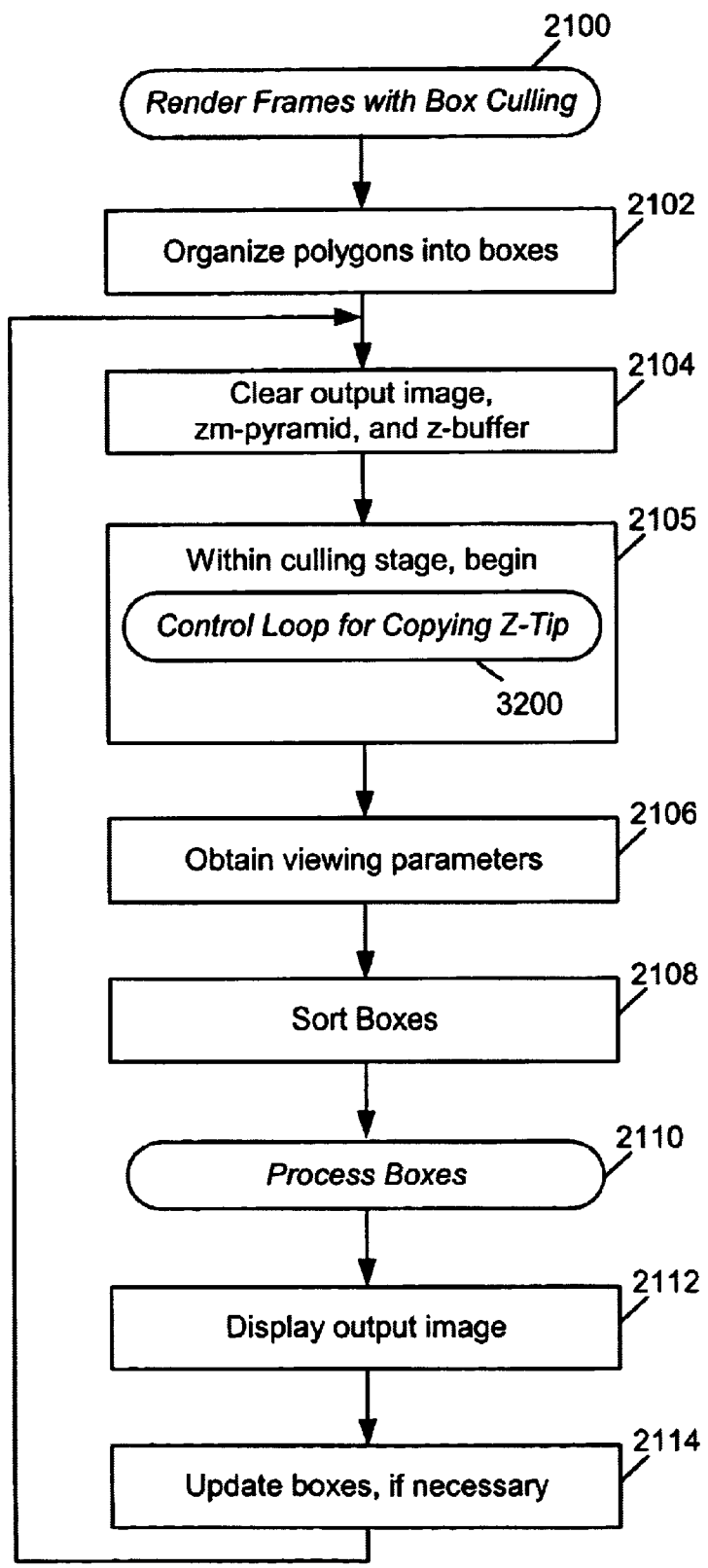
FIG. 21 is a flowchart of a method for rendering frames with box culling.

Preferably, densely occluded scenes are rendered with box culling (or "rooms-and-portals culling," which is similar), since this accelerates frame generation by reducing the number of polygons that need to be processed. Procedure Render Frames with Box Culling 500, outlined in FIG. 21, is used to render a sequence of frames with box culling. The procedure is simpler than that described above with respect to FIG. 5 because no visibility queries are necessary.

In step 2102, scene polygons are organized into bounding boxes having polygonal faces, each box containing some manageable number of polygons (e.g., between 200 and 5000). The record for each box includes a polygon list, which may be a list of pointers to polygons rather than polygon records. If a particular polygon does not fit conveniently in a single box, the polygon's pointer can be stored with more than one box. Alternatively, the polygon can be clipped to the bounds of each of the boxes that it intersects.

Next, rendering of the first frame is begun, starting with step 2104, which clears the image buffer 150, zm-pyramid 170, and z-buffer 180.

Initialization procedures at the beginning of a frame also include beginning procedure Control Loop for Copying Z-Tip 3200 within the culling stage 130, which is step 2105.

Next, at step 2106, viewing parameters for the current frame are obtained.

Next, procedure Sort Boxes 2108 sorts the bounding boxes into near-to-far or approximately near-to-far order. This can be done, for example, by setting up a list of "depth buckets" and assigning each bounding box to a bucket based on the depth of its nearest corner in perspective space. Alternatively, another method such as those described above can be used to sort boxes into a favorable traversal order.

Next, in step 2710, procedure Process Boxes 2700 processes the bounding boxes in the designated traversal order, and renders the polygons that are inside visible boxes. When all boxes have been processed, the output image is complete, so the image is displayed at step 2112.

If some polygons in the scene are "moving," the bounds of some bounding boxes may need to be recalculated each frame, and if necessary, this is done in step 2114. Following step 2114, control returns to step 2104 to begin processing the next frame.

Figure 27:
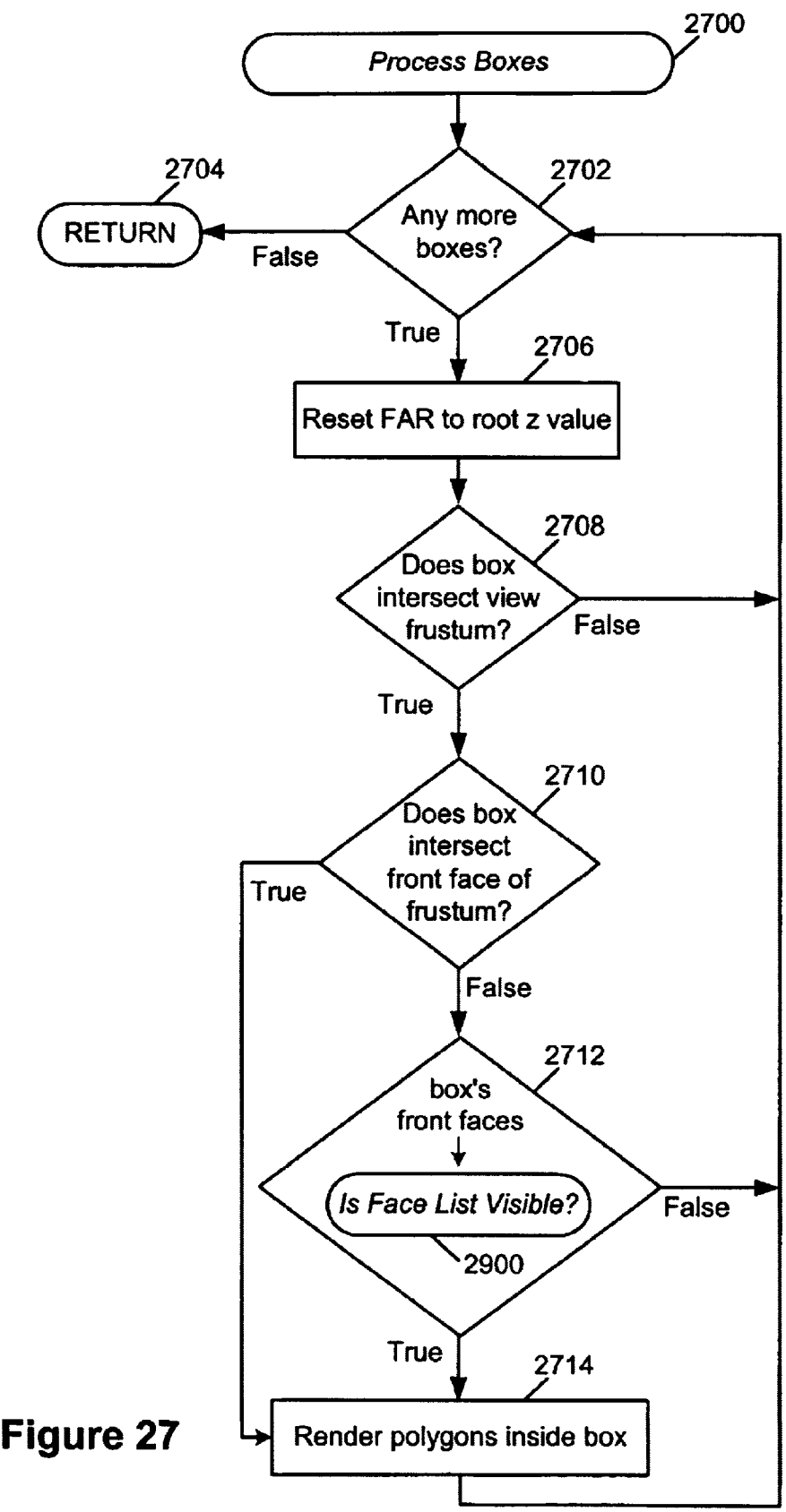
FIG. 27 is a flowchart of a method for processing bounding boxes.

Procedure Process Boxes 2700 processes the bounding boxes and renders the polygons that are inside visible boxes. The procedure loops over all bounding boxes, processing them in the designated traversal order. The procedure is illustrated in FIG. 27.

At step 2702, if all boxes have been processed, the procedure terminates at step 2704. If boxes remain to be processed, control proceeds to step 2706.

Step 2706 overwrites the value for the far clipping plane with the "root value" of the z-tip 116 stored in host memory 115. The "root value" is the value stored for the apex of the pyramid and is the farthest z for any image sample. It follows that any object which is behind the root value is known to be occluded, so when the root value advances, the far clipping plane can also be advanced. Since the far clipping plane forms the rear facet of the viewing frustum, advancing the far clipping plane enables bounding boxes that are behind the root value to be culled when "view-frustum culling" of bounding boxes is performed in step 2708.

Step 2708 determines if the current box intersects the view frustum. If not, the contents of the box can be ignored, so control returns to step 2702. If the box does intersect the view frustum, control proceeds to step 2710, which determines whether the current box intersects the front face of the view frustum. If so, the box is visible and control proceeds to step 2714. If not, control proceeds to step 2712.

Step 2712 calls procedure Is Face List Visible? 2900. The list of faces passed to this procedure contains the front-facing faces of the current bounding box. If Is Face List Visible? 2900 returns False, the box is not visible and its contents can be ignored, so control returns to step 2702. Otherwise, control proceeds to step 2714.

At step 2714, the current box is not known to be occluded, so it is assumed that the box is visible and the polygons inside the box are sent through the pipeline to be rendered.

Box culling can be done more efficiently than described above if the scene model is organized in nested bounding boxes, which enables several "child boxes" to be culled when a "parent box" is determined to be occluded. However, such "hierarchical box culling" requires additional work to maintain the scene model in nested boxes. This approach is not preferred unless the scene model is very complex. If hierarchical box culling is desired, it can be performed with a straightforward variation of procedure Process Boxes 2700.

Figure 29:
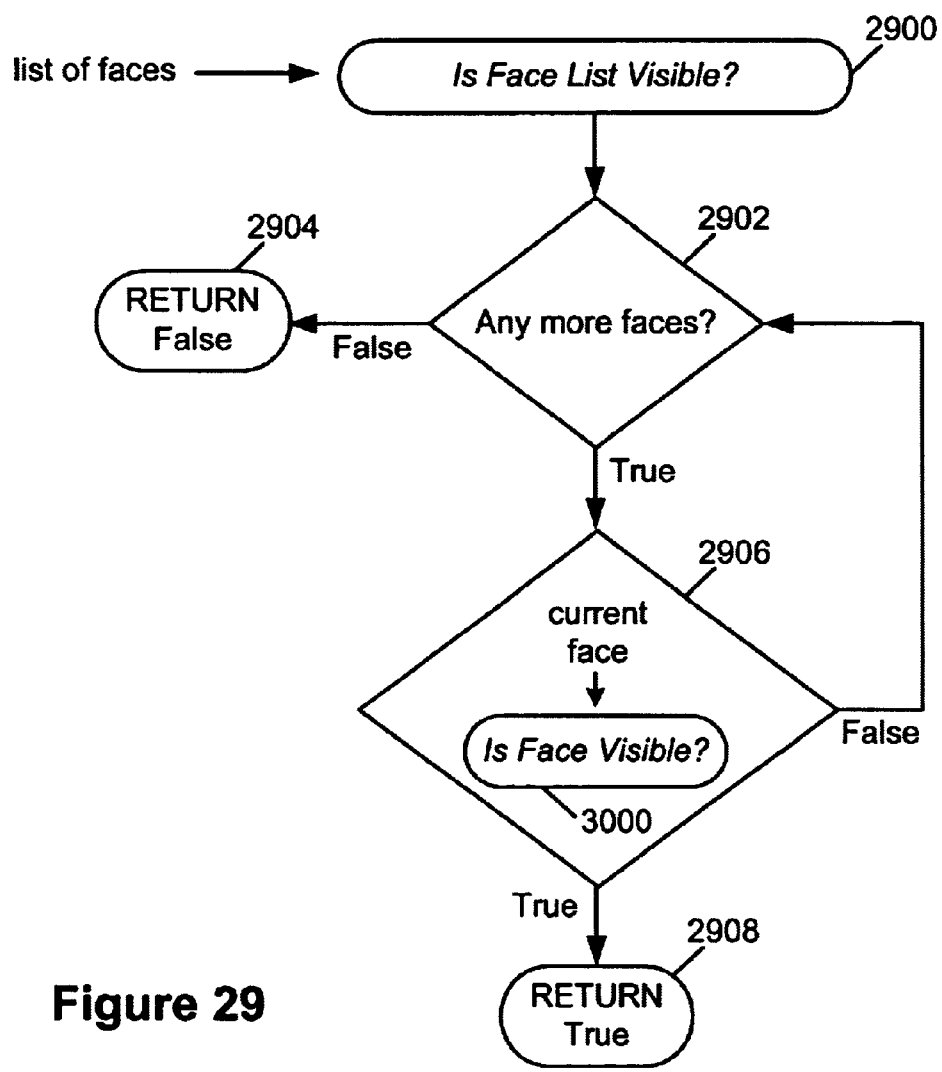
FIG. 29 is a flowchart of a method for testing a list of faces for visibility.

Now procedure Is Face List Visible? 2900, outlined in FIG. 29, is described. This procedure receives as input a list of one or more faces with coordinates in the model space coordinate frame. It loops over the faces on the list, returning True if at least one of the faces is not occluded with respect to the z-tip 116 and otherwise returning False.

At step 2902, if all faces have already been processed, the procedure returns False at step 2904. Otherwise, control proceeds to step 2906, where, if procedure Is Face Visible? 3000 returns True, control proceeds to step 2908, where the procedure terminates, returning True. If Is Face Visible? 3000 returns False, control returns to step 2902.

Figure 30:
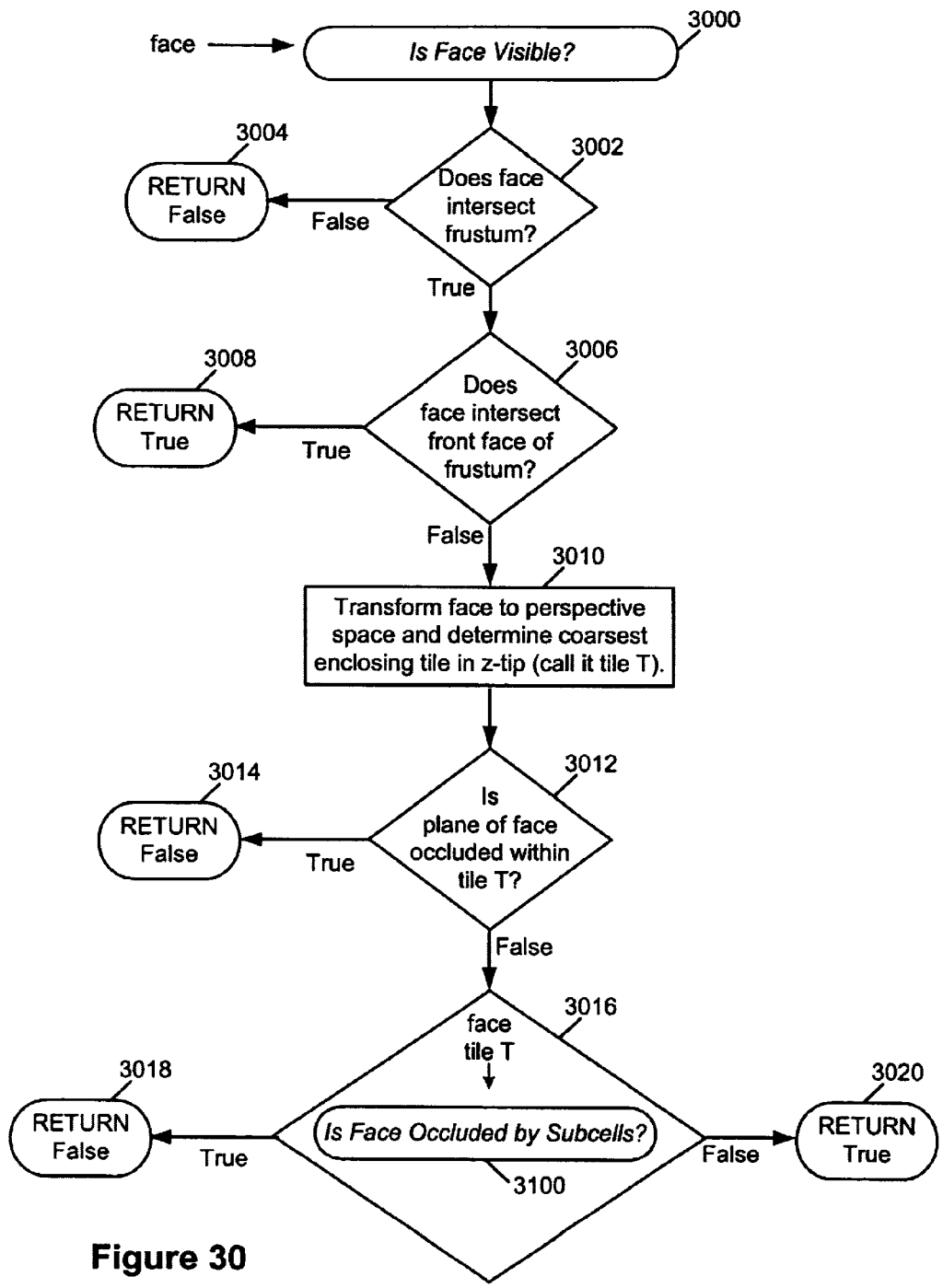
FIG. 30 is a flowchart of a method for testing a face for visibility.

Procedure Is Face Visible? 3000, outlined in FIG. 30, receives a face as input and returns False if that face is occluded by the z-tip 116 and otherwise returns True. In step 3002, if the face does not intersect the view frustum, it is not visible, so the procedure terminates at step 3004, returning False. Otherwise, control proceeds to step 3006, which determines whether the face intersects the front face of the view frustum. If so, the face is visible, so the procedure returns True at step 3008.

If the face does not intersect the front face of the view frustum, control proceeds to step 3010, which transforms the face to perspective space and determines the coarsest tile in the z-tip 116 which completely encloses the face (or the on-screen part of the face, if it is partially off screen). The coarsest enclosing tile will be called "T."

Next, step 3012 determines if the plane of the face is occluded within tile T, which occurs if the "znear" value of the plane of the face within tile T is farther than the zfar value for tile T stored in the z-tip 116. If the plane is occluded, the procedure terminates at step 3014, returning False. Alternatively, step 3012 could determine whether the face itself rather than the plane of the face is occluded within tile T, but this requires more computation.

If the plane is not occluded at step 3012, step 3016 calls procedure Is Face Occluded by Subcells? 3100. The face input is the same face that was input to procedure Is Face Visible? 3000, and the tile input is tile T.

If this procedure returns True, procedure Is Face Visible? 3000 terminates at step 3018, returning False. Otherwise, procedure Is Face Visible? 3000 terminates at step 3020, returning True.

Figure 31:
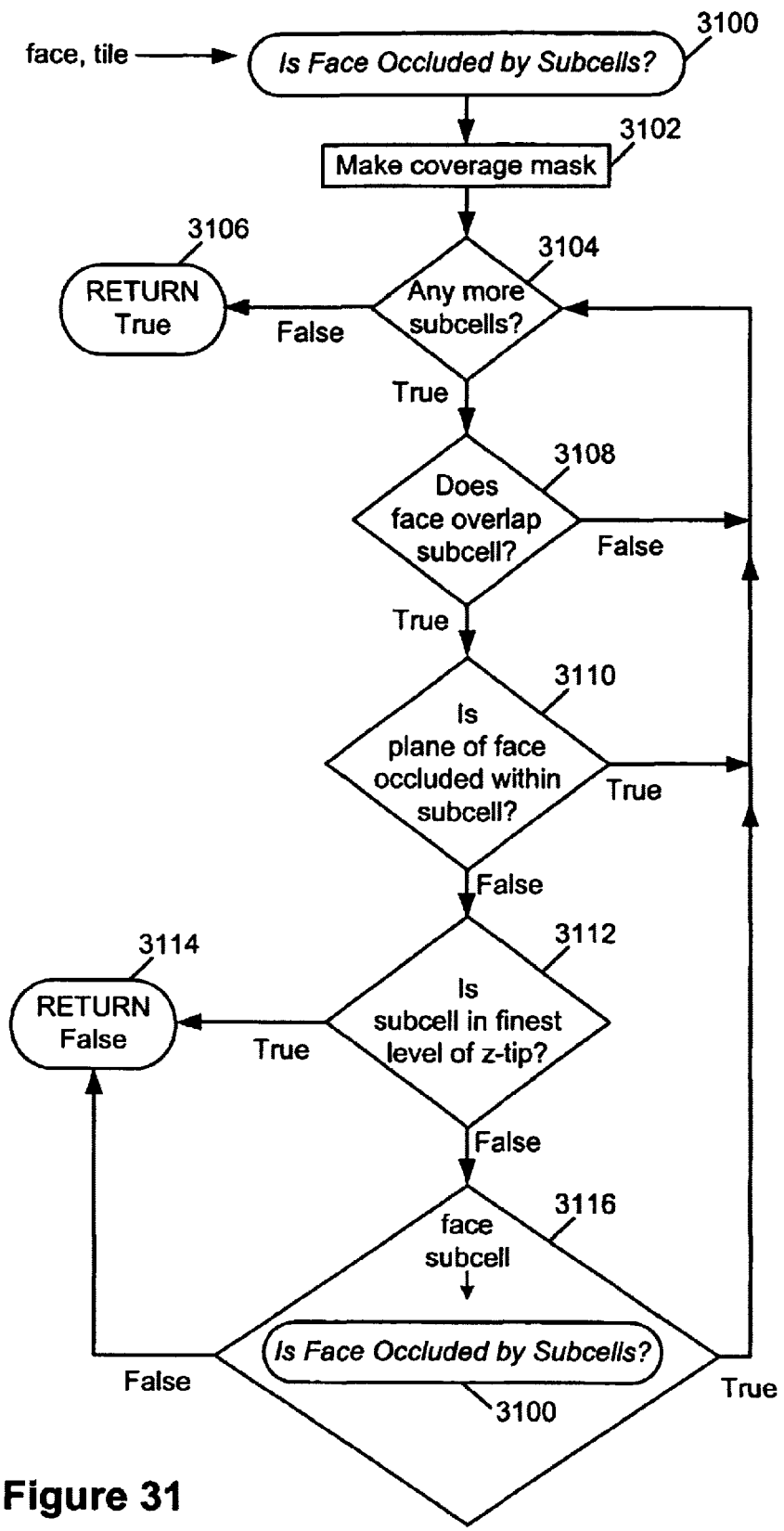
FIG. 31 is a flowchart of a method for testing a face for visibility with respect to the subcells of a tile.

Procedure Is Face Occluded by Subcells? 3100, outlined in FIG. 31, receives as input a face and a tile in the z-tip 116. This procedure returns True if the face is occluded within the tile, and otherwise returns False.

It is assumed that the z-tip 116 is organized in tiles, each of which is composed of an N×N array of "subcells." In step 3102, a coverage mask is created indicating for each of the N×N subcells of the tile whether the face overlaps that subcell.

Next, the procedure loops over each of the N×N subcells within the tile. If all subcells have already been processed at step 3104, the procedure terminates at step 3106, returning True. Otherwise, control proceeds to step 3108, where if the coverage mask indicates that the face does not overlap the current subcell, control returns to step 3104.

If the face does overlap the current subcell at step 3108, control proceeds to step 3110, which determines whether the plane of the face is occluded within the subcell. The plane is occluded if the nearest point on the plane within the subcell is farther than the zfar value for the subcell stored in the z-tip 116. If the plane is occluded, control returns to step 3104. Otherwise, control proceeds to step 3112, where, if the subcell currently being processed is in the finest level in the z-tip 116, control proceeds to step 3114, where the procedure terminates, returning False.

If the subcell's level is not the finest level, control proceeds to step 3116, which executes a recursive call to this same procedure. In the input parameter list, the face is the face input to procedure Is Face Occluded by Subcells? 3100, and the tile argument is the current subcell. If this recursive call to Is Face Occluded by Subcells? 3100 returns False, control proceeds to step 3114 where the procedure terminates, returning False. Otherwise, control returns to step 3104.

Procedures Is Face Visible? 3000 and Is Face Occluded by Subcells? 3100 determine whether the face of abounding box is visible by "tiling" the face into the z-tip 116. This method is preferred because it definitively determines whether or not a face is occluded by the z-tip 116. There are alternative methods that are faster but less definitive. For example, another method is to construct an axis-aligned rectangle in image space that is oriented parallel to the screen and is known to occlude the bounding box, and then test to see if this rectangle is occluded by the z-tip 116. If the rectangle is occluded, the bounding box is known to be occluded and is culled. Although this method is faster, it is not preferred because it often fails to cull bounding boxes that are occluded by the z-tip 116, and when this occurs, the polygons inside the occluded box need to be processed and unnecessary work is performed. For certain implementations, however, the faster but less definitive methods may be the better approach.

When a scene is rendered with "rooms-and-portals" culling instead of box culling, procedure Is Face Visible? 3000 can be used be determine whether a portal is occluded by the z-tip 116. Likewise, procedure Is Face List Visible? 2900 can be used to determine whether a list of polygons forming a portal is occluded by the z-tip 116.

Copying the Z-tip

As already described, the scene manager 112 uses the z-tip 116 stored in host memory 115 to test bounding boxes for visibility using procedure Is Face List Visible? 2900. Box-culling operations access the z-tip 116 rather than the zm-pyramid 170 because in typical graphics systems, the host processor can access its own memory, host memory 115, much faster than the graphics hardware's zm-pyramid 170.

To maintain z-tip values in host memory 115, as a frame is being generated, the culling stage 130 occasionally copies the z values in the tip of the zm-pyramid 170 on the feedback connection 190 into host memory 115. As used herein, the term "occasionally" means that it occurs now and then during the rendering of a frame. The term neither requires nor precludes any regularity of occurrence, nor does it require any frequency of occurrence. In one embodiment, copying is initiated by the culling stage 130 and done with "direct memory access" (DMA), so that it is not necessary to interrupt the host processor. As used herein, DMA is a technique by which a controller other than the host processor writes data into host memory. The DMA controller can be very simple, doing not much more than DMA accesses, or it can be as complex as a separate microprocessor. In addition, the DMA controller can be located in the host system, or in the graphics system, or in both or neither.

Preferably, only the tip of the zm-pyramid 170 is copied rather than the entire pyramid, since only the tip is needed to perform culling and the tip contains only a small fraction of the values in the full pyramid. Due to its compact size, the z-tip 116 can be copied much faster than the full pyramid and it requires much less storage in host memory.

For example, for a zm-pyramid having a finest level resolution of 1024×1024 and having 4×4 decimation, the zm-pyramid would be 5 levels deep and have the following resolutions:

| | |
|---|---|
| level 5 | 4 × 4 |
| level 4 | 16 × 16 |
| level 3 | 64 × 64 |
| level 2 | 256 × 256 |
| level 1 | 1024 × 1024 |

If the z-tip 116 consists of the coarsest three levels, it would contain a total of only 4,368 z values. This is significantly less than 1% of the total number of z values represented in the entire pyramid, and even significantly less than 1% of the total number of z values represented in the finest resolution level. If each z-value in the z-tip 116 is stored as 16-bit values in two bytes, the amount of data which must be transferred into host memory when the z-tip is copied is only 8,736 bytes, which is a very small fraction indeed of the storage in a full zm-pyramid. Occluded bounding boxes can be culled efficiently, often culling as much as 90% of occluded bounding boxes, with such a three-level z-tip, provided that the z-tip is copied 20 or 30 times during the rendering of each frame so that its depth information is reasonably current.

Figure 32:
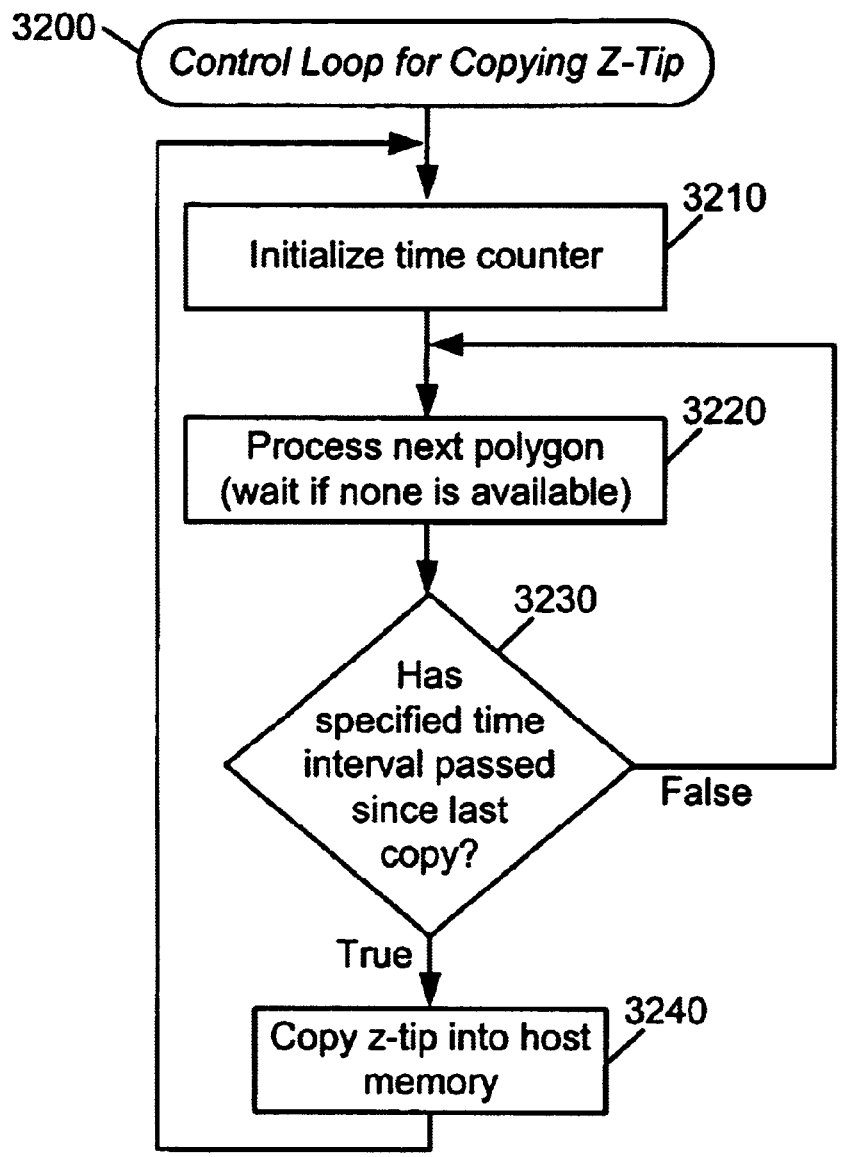
FIG. 32 is a flowchart of a loop that controls copying of the z-tip.

Procedure Control Loop for Copying -Tip 3200 outlined in FIG. 32 is the procedure running in graphics system 100 that controls copying of the z-tip into host memory 115 as the culling stage 130 tiles polygons into the zm-pyramid 170. This procedure is invoked at the beginning of a frame at step 2105 of procedure Render Frames with Box Culling 2100.

The first step 3210 is to initialize a counter that indicates how much time has elapsed. Next, step 3220 processes the next polygon to be processed by the culling stage, tiling it into the zm-pyramid 170. If the culling stage is waiting for the next polygon to arrive, the procedure waits for the next polygon. Next, step 3230 checks to see if the specified time interval has elapsed since the time counter was initialized. This specified time interval is a fraction of the desired frame time. For example, if the objective is to maintain a frame rate of fifty frames per second and to copy the z-tip twenty times a frame, the specified time interval would be 1/20 of 1/50 of a second, which.is one millisecond.

If the specified time interval has not elapsed at step 3230, control returns to step 3220 to process the next polygon. If the time interval has elapsed, control proceeds to step 3240, which copies the z-tip on the feedback connection 190 from the zm-pyramid 170 into host memory 115. Preferably, copying of z-tip values is performed with direct memory access, because this method does not interrupt the host processor. Following step 3240, control returns to step 3210.

In the procedure described above, elapsed time is used to determine when to copy the z-tip. As used herein, the copying of the z-tip is "triggered" upon expiration of the specified elapsed time period, even though the procedure may have to wait some time after triggering for a polygon to be processed (step 3220) before z-tip copying actually takes place (step 3240). In embodiments in which the time counter is free-running, and not re-initialized (as in step 3210) after every z-tip copy (step 3240), it will be appreciated that one z-tip copy might be "triggered" before the previously-triggered z-tip copy actually occurs. Both z-tip copy steps are nevertheless considered herein to have been "triggered," even though one of them never actually occurs.

In general, the writing of depth information to host memory 115 can be triggered in any manner desired. In addition to the trigger described above with respect to FIG. 32, the writing can be triggered for example in conjunction with each polygon rendered, or each predetermined number of polygons rendered, or once every predetermined number of microseconds. The writing can also be triggered by the host system in certain embodiments. Once triggered, the writing can take place deterministically or it can take place only at the next convenient time (unless superceded by the next trigger event). The writing of depth information to host memory 115 can in various embodiments take place in parallel or as a background process to other processes accessing graphics memory for other purposes, or can temporarily stop some of the graphics processing until the writing completes. The depth information that is written to host memory 115 at each triggered writing should be sufficient to cover the entire screen, although it is anticipated that embodiments might be developed in which only part of the scene area is covered by such information. Many other variations will be apparent.

When the subsystem for hierarchical culling and rendering employs a conventional z-pyramid 670 as diagramed in FIG. 6, the control loop for copying the z-tip is as outlined in procedure Control Loop for Copying z-Tip 3200 except that the tip of the z-pyramid 670 rather than the tip of the zm-pyramid 17 is copied on the feedback connection 190.

When the subsystem for hierarchical culling and rendering employs a two-level z-buffer 470 as diagramed in FIG. 4, the coarser level 472 is copied on the feedback connection 190 into host memory 115. Then, the host processor 110 constructs the z-tip 116 in host memory 115 from the copied level. The procedure for constructing the z-tip loops over N×N tiles in the copied level, determines the farthest of the z values in each N×N tile, and writes these far values to the adjacent, coarser level in the pyramid. This process is repeated on successively coarser levels of the pyramid until the z-tip 116 has been constructed in host memory 115. After the z-tip 116 has been constructed in host memory 115, it is used by host processor 110 to cull bounding boxes or portals as described above using procedure Is Face List Visible? 2900.

Alternatively, the host processor 110 can use the z-tip 116 to cull other structures indicative of the depth of elements of the model, or even, though not preferred, the individual primitives of the model directly.

In some embodiments of the invention the host system might never actually construct coarser levels of the z-pyramid from the copied depth information, but rather might perform its occlusion testing directly on the depth information at the resolution at which it was copied.

Also in some embodiments, the graphics system 100 might not actually maintain in graphics memory the z-pyramid levels which will be written into host memory 115. Instead, such an embodiment can maintain in graphics memory only finer resolution level(s), or even only a conventional single-level z-buffer, and calculate a coarser resolution pyramid level only when needed or triggered to write to host memory 115. In the example embodiment of FIG. 1, for example, the culling stage 130 might maintain its depth buffer 170 only through level 172, and the coarser levels 174 are calculated only when they are needed for writing to host memory 115.

Implementation

Figure 33:
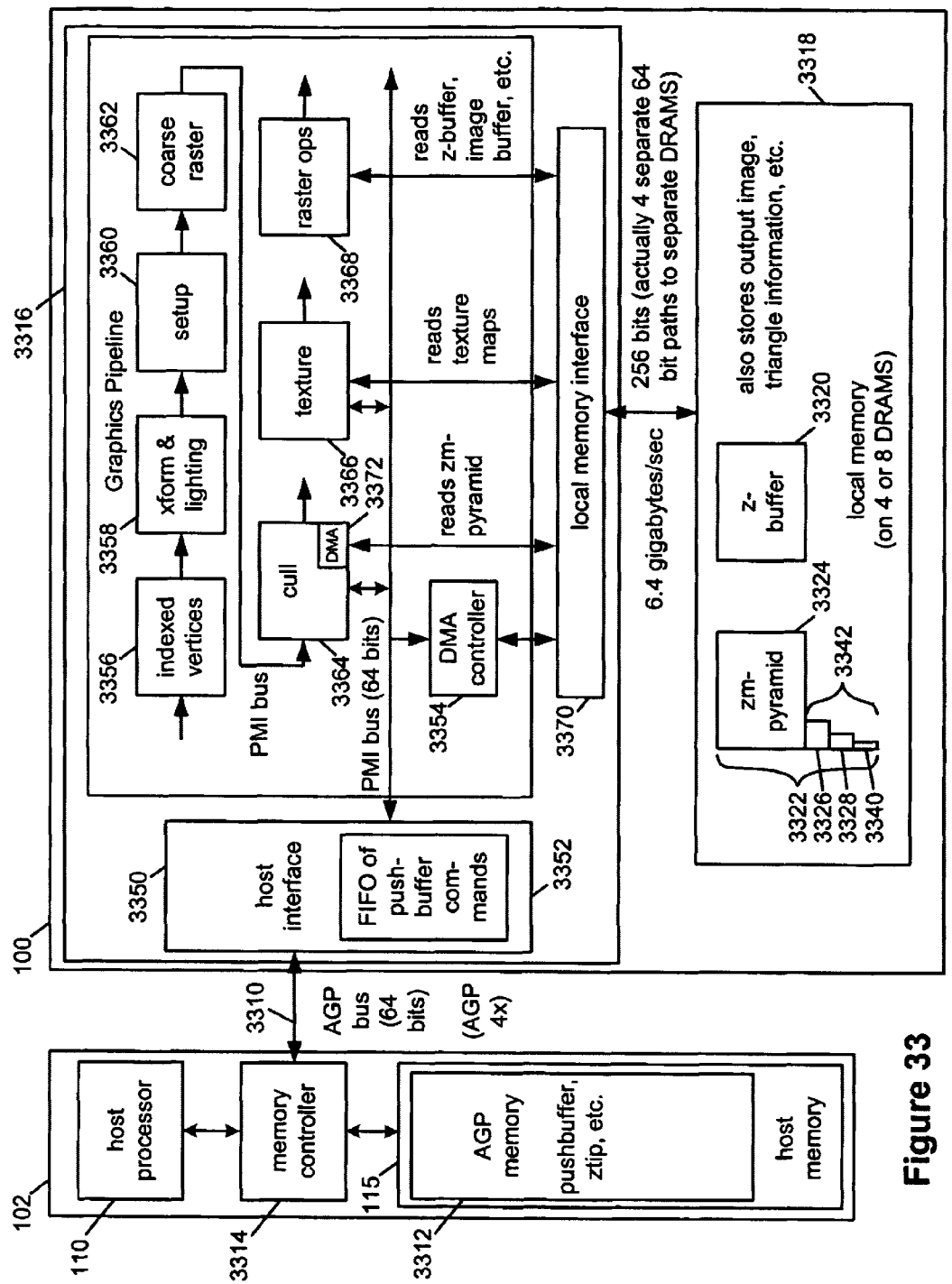
FIG. 33 illustrates an implementation of a computer system according to the invention.

FIG. 33 illustrates an implementation of a computer system according to the invention. The apparatus is similar to that of FIG. 1, except additional details are provided. In the apparatus of FIG. 33, all communication between the host system 102 and the graphics system 100, including both the input stream from the host 102 to the graphics system 100 of objects to be rendered, and the low resolution z-buffer information being written from graphics system 100 into host memory 115, take place via an AGP bus 3310 operating in 4x mode.

Host memory 115 includes a region 3312 which is used to contain commands that will be sent to the graphics system 100, information about polygons which will be sent to the graphics system 100 for transformation and rendering, and depth information copied from the graphics system 100. Preferably at least the depth information copied from graphics system 100 is allocated a non-cacheable part of region 3312. A memory controller 3314, which is part of a core logic chip set in the host system 102, manages access to the host memory 115 by a number of potential masters, including the host processor 110 and the AGP bus 3310. The graphics system 100 includes a graphics processor 3316 and local graphics memory 3318. Graphics memory 3318 includes a full resolution conventional 1-level z-buffer 3320 for the z-buffer renderer stage, as well as a multi-level low resolution zm-pyramid 3322. (In another embodiment, a one-level low resolution z-buffer or zm-buffer can substitute for zm-pyramid 3322.) The local graphics memory 3318 also stores the output image, triangle information, and other information created or used by the graphics processor 3316 during the processing of an input stream of polygons. Even though zm-pyramid 3322 and z-buffer 3320 are shown in FIG. 33 as two separate units, and even though they might be disposed in distinct regions of graphics memory and even on separate chips, as used herein the two buffers can still be considered a single hierarchical z-buffer.

The host processor 110 accesses host memory 115 at a data rate on the order of 1 GByte/sec or more. In the system of FIG. 33, host processor 110 (and therefore any scene manager or other software running on host processor 110) cannot access graphics memory 3318 at all, directly. Instead, any such access involves sending a command via AGP bus 3310 to the graphics processor 3316 for handling. Host memory 115 is therefore much more quickly accessible than the graphics memory 3318, by the host processor 110.

The z-buffer 3320 in graphics memory 3318 is a conventional singe-level depth buffer. The resolution of z-buffer 3320 is the same as that of the image buffer 150, also stored in graphics memory 3318. If the graphics system 100 is in operating in an oversampling mode, that resolution may be finer than that of the ultimate image. Depth values are stored in z-buffer 3320 with a precision of 16 or 24 bits, depending on the mode of operation ZM-pyramid 3322 contains, at its finest level 3324, a coverage mask corresponding to each 4×4 tile of cells in the z-buffer 3320. The coverage mask for a given cell defines two regions of the corresponding tile, and the cell also contains a conservative depth range (z-near, z-far) for each of the two regions. Coarser levels of the zm-pyramid 3322 are decimated 4×4 relative to their next finer level, and depth information at the coarser levels is maintained simply as one z-far value for each 4×4 tile which it covers in the next finer level. For illustration purposes, progressively coarser resolution levels 3326, 3328 and 3340 are shown in FIG. 33. All of the z values in zm-pyramid 3322 are maintained with a precision of only 8 or 12 bits per cell, depending on the mode of operation. The resolution of zm-pyramid 3322 is a coarser than that of z-buffer 3320 because each cell in the finest level of zm-pyramid 3322 contains information that is general to the individual cells in the tile it covers, and does not contain z information specific to each of the cells in the tile it covers.

The graphics processor 3316 includes a host interface 3350 for interfacing to the host system 102 via the AGP bus 3310. The host processor 110 typically communicates with the graphics processor 100 by sending commands onto the AGP bus 3310, which the host interface 3350 places in a FIFO 3352 of "pushbuffer" commands. Commands supported by the graphics processor 3316 include, among other things, commands to set up and start transfers of data by DMA between the AGP memory 3312 in host memory 115, on one hand, and graphics memory 3318 on the other hand. Such data transfers include both reads and writes, and occur over the AGP bus 3310 under the control of a DMA controller 3354 on the graphics processor 3316. In some circumstances, they can occur under the control of a separate DMA controller 3372 in culling stage logic 3364.

The graphics pipeline in graphics processor 3316 performs the geometric processing, object culling, and z-buffer rendering steps illustrated in FIG. 1. An input stream of objects to be rendered is provided first to an "indexed vertices" unit 3356, which converts the input stream of objects into a stream of individual full triangle records if necessary. This may involve expanding geometry information that was provided in a compacted form, and/or substituting actual vertex information for vertex pointers provided in a points-polygons list. It will be appreciated that records output from the indexed vertices unit 3356, or indeed from any of several of the downstream units in the graphics pipeline, can be considered as an input stream of objects provided ultimately by the host.

The stream of triangle records output from indexed vertices unit 3356 is provided to the input of a "transform and lighting" unit 3358, which transforms each triangle to image space and also performs certain preliminary lighting computations. The output of transform and lighting unit 3358 is provided to a setup unit 3360, which sets up various values which are used in incremental computations in downstream units. Coarse raster unit 3362 then, for each incoming triangle record, traverses all of the 4×4 tiles that the triangle record overlaps, and creates a tile record for each one. Coarse raster 3362 also determines a single depth range (z-near, z-far) for the entire triangle. (In another embodiment, coarse raster unit 3362 would instead determine an individual depth range for the portion of the triangle that overlaps each tile rather than a single depth range for the entire triangle). Coarse raster 3362 also computes a coverage mask for each tile, indicating which cells of the 4×4 tile are covered by the triangle. These tile records, each including a coverage mask and triangle depth range, and each specifying an individual cell in the finest resolution level 3324 of zm-pyramid 3322, are then sent to culling stage 3364.

The culling stage 3364 then compares the information in each incoming tile record to the depth information then in the indicated cell in level 3324 to determine whether to cull the tile record. In particular, the mask for the cell in level 3324 defines two regions of its covered tile. If the nearest z value of the triangle corresponding to the incoming tile record is farther away than the z-far value of each region that it overlaps, then the portion of the triangle represented in the incoming tile record is not going to be visible in the scene and is therefore culled. In addition, at least if the tile has not been culled, the culling stage 3364 also compares the farthest z value of the triangle's depth range, to the current z-near of the each of the two regions defined by the coverage mask. If the farthest z value of the triangle's depth range is nearer than the nearest z value of one of the regions, then all of the triangle's samples which overlap that region are known to be visible relative to all polygons that have been processed so far in the scene. As long as the polygons continue downstream in the same order, this means that the z-buffer renderer 3368 does not need to re-test such samples for occlusion against the second z-buffer 3320. The renderer 3368 therefore does not need to read z-buffer 3320 to perform the occlusion test for such samples, which can result in a still further reduction of memory bandwidth utilization to graphics memory 3318.

If a tile record is not culled, then the culling stage 3364 writes new z-near, z-far and coverage mask information into the corresponding cell in the finest level 3324 of the zm-pyramid 3322 corresponding to the tile record. Culling stage 3364 also then propagates this information up to the coarser levels of the pyramid 3322 in the manner described above. In order to preserve information about samples that have been proven visible, the culling stage sets an "accept" signal for each sample proven visible. The 4×4 input tile is then divided into four 2×2 "quads" for further downstream processing. Each quad includes only a single "accept" bit, which is set only if the "accept" signals of all four of the samples that it represents were set. The culling stage 3364 preferably includes a re-use buffer to cache recently accessed mask-zfar-znear values.

The output of culling stage 3364 is a stream of 2×2 quads, which then undergo conventional graphics processing in downstream of the graphics pipeline. For example, texturing occurs in texture unit 3366, and full conventional, fully determinative z-buffer rendering occurs in the raster operations unit 3368—except that if the "accept" bit is set for a given one of the quads, then no z-buffer read or occlusion testing is required for that quad. Raster operations unit 3368 uses its own z-buffer 3320 rather than the information already in zm-pyramid 3324. In addition, whereas graphics system 100 updates the coarser levels of zm-pyramid 3322 only from the finer resolution level 3324 of the zm-pyramid 3322, another embodiment can update one or more of the levels of zm-pyramid 3322 via a feedback connection from the z-buffer 3320.

The DMA controller 3354, culling stage 3364, texture unit 3366 and raster operations unit 3368, as well as other units not shown in FIG. 33, all access graphics memory 3318 via a local memory interface 3370 and an extremely fast and wide data path to graphics memory 3318. Graphics memory 3318 typically spans four or eight separate DRAMs.

In operation, the scene manager running in host processor 110 typically maintains the scene description represented as polygons (triangles in the present embodiment) in a three dimensional model in host memory 115. At the beginning of a frame, host processor 110 sends a command via AGP bus 3310 to the graphics processor 3316 to initialize zm-pyramid 3322, z-buffer 3320, and the image buffer 150. The host processor 110 then begins transmitting camera parameters and a stream of triangles to the graphics system 100 via the AGP bus 3310. In one embodiment, this is accomplished by setting up an appropriate structure in AGP memory 3312 and then sending a command to the DMA controller 3354 to copy the data (one or more triangles at a time) into the graphics pipeline in graphics processor 3316, where they are processed and rendered as described above. In another embodiment, triangle data can be copied into graphics memory 3318, and then read as needed from graphics memory 3318 by the graphics pipeline. Other variations will be apparent. Occasionally during the rendering of each frame, triggered either by events occurring in the graphics processor 3316 or in response to a command host processor 110, the DMA controller 3354 copies only the tip 3342 of zm-pyramid 3322, via the AGP bus 3310, into a known location in AGP memory 3312. Preferably this occurs at least 20 to 30 times during the rendering of each frame. The host processor 110 tests either bounding boxes or room portals of the model against whatever depth image happens to be in AGP memory 3312 at that point in time, in order to cull ("pre-cull") parts of the model that are known to be occluded before they are included in the input stream of triangles to the graphics pipeline. In this manner, even though this depth image has a coarse resolution and can be outdated, the host processor 110 is able to very efficiently cull a very substantial fraction of the occluded geometry in the three dimensional model, without ever providing it to the graphics system 100.

Note that the pre-culling which takes place on the host system 102 can be bounding box culling, rooms and portals culling, or primitive culling, or any other kind of object culling that is desired. However, a designer should consider, if implementing culling of primitives on the host, whether it would be faster to simply send all primitives into the hardware graphics pipeline without such culling by the host.

As another alternative, note that the occlusion testing performed by the scene manager can be done against a pyramid portion in host memory 115 which does not extend all the way to the apex of a full pyramid. It is also feasible for the pyramid portion that is used for this purpose to skip one or more of the levels that might be present in a z-tip maintained in graphics memory 3318.

As used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another signal, event or value is defined similarly.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. As one example, it will be appreciated that many of the steps illustrated in the flowcharts set forth herein can be performed in parallel or in a different sequence without affecting the functions achieved. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A graphics method, for use by a graphics system receiving from a host system an input stream of geometric objects for a scene, said graphics system including graphics memory and a graphics processor, said graphics memory including an image buffer and a first depth buffer, said image buffer having an image buffer resolution, said host system including host memory and a host processor, said host memory being more quickly accessible than said graphics memory by said host processor, comprising the steps of:

writing depth values into said first depth buffer in response to objects from said input stream;

developing, in response to objects from said input stream, depth information at a coarser resolution than said image buffer resolution; and writing to said host memory said depth information at said coarser resolution.

2. A method according to claim 1, wherein said graphics processor comprises a graphics chip, and wherein said first depth buffer is disposed entirely in an off-chip region of said graphics memory.

3. A method according to claim 2, wherein said graphics processor accesses said image buffer and said first depth buffer via a common memory bus.

4. A method according to claim 1, wherein said first depth buffer comprises a first depth pyramid level having a resolution that is at least as fine as said image buffer resolution and a second depth pyramid level having a resolution that is coarser than said first depth pyramid level, and wherein said step of writing depth values into said first depth buffer comprises the steps of:

writing depth values into said first depth pyramid level in response to objects from said input stream; and writing depth values into said second depth pyramid level in dependence upon depth values in said first pyramid level.

5. A method according to claim 4, wherein said step of writing to said host memory depth information at said coarser resolution comprises the step of occasionally copying depth information from said second depth pyramid level to said host memory.

6. A method according to claim 1, wherein said step of writing to said host memory occurs without storing said depth information at said coarser resolution in any level of said depth image buffer.

7. A method according to claim 1, wherein said first depth buffer comprises a depth pyramid having a plurality of levels including a first level having a resolution at least as fine as said image buffer resolution, a second level having said coarser resolution, and a third level having a resolution that is coarser than said second level, and wherein said step of writing depth values into said first depth buffer comprises the steps of:

writing depth values into said first level in response to objects from said input stream; and updating depth values in levels of said depth pyramid whose resolutions are more coarse than said first level, in dependence upon depth values in said first level.

8. A method according to claim 7, wherein said step of writing to said host memory depth information at said coarser resolution comprises the step of occasionally copying to said host memory depth information from each of the levels of said depth pyramid between said second level and said third level, inclusive.

9. A method according to claim 8, wherein said third level contains only a single depth value.

10. A method according to claim 1, wherein said step of writing depth information to said host memory occurs at least once per rendered frame.

11. A method according to claim 1, wherein said step of writing depth information to said host memory comprises the step of writing to said host memory sufficient depth information to completely cover said scene at said coarser resolution at least once per rendered frame.

12. A method according to claim 1, wherein said step of writing depth information to said host memory comprises the step of writing to said host memory sufficient depth information to completely cover said scene at said coarser resolution at least 5 times per rendered frame.

13. A method according to claim 1, wherein said step of writing depth information to said host memory comprises the step of writing to said host memory sufficient depth information to completely cover said scene at said coarser resolution at least 20 times per rendered frame.

14. A method according to claim 1, wherein said step of writing depth information to said host memory comprises the step of triggering said writing to said host memory at least once in conjunction with each N objects from said input stream for which depth values are written in said step of writing depth values into said first depth buffer, where N is a predetermined number.

15. A method according to claim 1, wherein said step of writing depth information to said host memory comprises the step of triggering said writing to said host memory at a predetermined time period after each prior writing of depth information to said host memory.

16. A method according to claim 1, wherein said step of developing depth information at a coarser resolution comprises the steps of:

developing, in dependence upon depth values written in said step of writing depth values into said first depth buffer, a plurality of progressively coarser resolution levels of depth information, including a second level having said second resolution and a third level having a resolution that is more coarse than said second resolution, all of said levels of depth information between said second level and said third level, inclusive, defining a depth pyramid portion; and wherein said step of writing to said host memory comprises the step of writing the depth information in said depth pyramid portion to said host memory.

17. A method according to claim 16, wherein said plurality of progressively coarser resolution levels further includes an additional level having a resolution that is coarser than said first resolution but finer than said second resolution.

18. A method according to claim 16, wherein the number of bytes of depth information written to said host memory in said step of writing the depth information in said depth pyramid portion to said host memory is less than 1% of the number of bytes in said first depth buffer.

19. A method according to claim 1, wherein the number of bytes of depth information written to said host memory in each occurrence of said step of writing to said host memory is less than 10% of the number of bytes in said first depth buffer.

20. A method according to claim 1, wherein the number of bytes of depth information written to said host memory in each occurrence of said step of writing to said host memory is less than 1% of the number of bytes in said first depth buffer.

21. A method according to claim 1, wherein said depth values written in said step of writing depth values into said first depth buffer have said coarser resolution.

22. A method according to claim 21, wherein said step of writing depth values into said first depth buffer comprises the step of writing into said first depth buffer depth information developed in said step of developing.

23. A method according to claim 1, wherein said depth values written in said step of writing depth values into said first depth buffer have a resolution at least as fine as said image buffer resolution, and wherein said step of developing depth information at a coarser resolution comprises the step of developing said depth information at a coarser resolution in dependence upon said depth values written in said step of writing depth values into said first depth buffer.

24. A method according to claim 1, wherein said graphics memory further includes a second depth buffer having a resolution at least as fine as said image buffer resolution, further comprising the step of writing depth values into said second depth buffer in response to objects from said input stream.

25. A method according to claim 24, wherein said step of developing depth information at a coarser resolution comprises the step of developing said depth information at a coarser resolution in dependence upon said depth values written in said step of writing depth values into said second depth buffer.

26. A method according to claim 24, wherein said depth values written in said step of writing depth values into said second depth buffer have a second average precision, and wherein said depth information written in said step of writing to said host memory includes depth values, the depth values in said depth information written in said step of writing to said host memory having an average precision which is less than said second average precision.

27. A method according to claim 24, further comprising the step of culling objects from said input stream using said first depth buffer, prior to said step of writing depth values into said second depth buffer.

28. A method according to claim 27, further comprising the step of writing color values into said image buffer in response to objects from said input stream, said step of culling objects from said input stream using said first depth buffer occurring prior to said step of writing color values into said image buffer.

29. A method according to claim 1, further comprising the step of writing color values into said image buffer in response to objects from said input stream.

30. A method according to claim 1, further for use by said host system, further comprising the steps of said host system:

testing structures against depth information written to said host memory in said step of writing to said host memory; and culling objects from said input stream which are determined in said step of testing to be occluded.

31. Graphics apparatus, for use with a host system having host memory and a host processor, comprising graphics memory and a graphics processor, said host memory being more quickly accessible than said graphics memory by said host processor, said graphics apparatus having an input for receiving an input stream of geometric objects for a scene, said graphics processor managing an image buffer and a first depth buffer in said graphics memory, said image buffer having an image buffer resolution, said graphics processor comprising:

a first depth buffer writing stage which writes depth values into said first depth buffer in response to objects from said input stream;

a renderer which, in at least one mode of operation, writes color values into said image buffer in response to objects from said input stream;

a coarse information developer which develops, in response to objects from said input stream, depth information at a coarser resolution than said image buffer resolution; and a data transfer controller which writes to said host memory said depth information at said coarser resolution.

32. Apparatus according to claim 31, wherein said graphics processor comprises a graphics chip, and wherein said first depth buffer is disposed entirely in an off-chip region of said graphics memory.

33. Apparatus according to claim 32, wherein said graphics processor accesses said image buffer and said first depth buffer via a common memory bus.

34. Apparatus according to claim 31, wherein said data transfer controller comprises a DMA controller.

35. Apparatus according to claim 31, wherein said renderer further writes depth values into a second depth buffer in response to objects from said input stream, said second depth buffer having a resolution at least as fine as said image buffer resolution.

36. Apparatus according to claim 35, further comprising culling means, disposed upstream of said renderer, for culling objects from said input stream using said first depth buffer.

37. Apparatus according to claim 31, further comprising said host system.

38. A graphics method, for use by a host system in communication with a graphics system, said graphics system including graphics memory and a graphics processor, said graphics memory including an image buffer having an image buffer resolution, said host system including host memory and a host processor, said host memory being more quickly accessible than said graphics memory by said host processor, comprising the steps of:

providing to said graphics system a stream of geometric objects from a 3D model; and pre-culling objects from said stream by reference to a depth buffer in said host memory, said depth buffer having a coarser resolution than said image buffer resolution, said depth buffer being written occasionally in dependence upon depth information in said graphics memory.

39. A method according to claim 38, wherein said 3D model is organized to include bounding boxes, and wherein said step of pre-culling comprises the steps of:

testing faces of a particular one of said bounding boxes against said depth buffer in said host memory; and culling from said stream of geometric objects all objects which are within said particular bounding box if said step of testing proves that said particular box is occluded.

40. A method according to claim 38, wherein said 3D model is organized to include rooms-and-portals, and wherein said step of pre-culling comprises the steps of:

testing a particular one of said portals against said depth buffer in said host memory; and culling from said stream of geometric objects all objects which are beyond said particular portal if said step of testing proves that said particular portal is occluded.

41. A method according to claim 38, wherein said depth buffer comprises at least a first level having said coarser resolution, and a second level having a resolution that is coarser than that of said first level.

42. A method according to claim 38, wherein said depth buffer in said host memory is written in dependence upon depth information in said graphics memory at least once per rendered frame.

43. A method according to claim 42, wherein the depth information written occasionally to said depth buffer in said host memory in dependence upon depth information in said graphics memory is sufficient to completely cover said image buffer.

44. A method according to claim 38, wherein the depth information written occasionally to said depth buffer in said host memory in dependence upon depth information in said graphics memory is sufficient to completely cover said image buffer and is written into said host memory at least 5 times per rendered frame.

45. A method according to claim 38, wherein the depth information written occasionally to said depth buffer in said host memory in dependence upon depth information in said graphics memory is sufficient to completely cover said image buffer and is written into said host memory at least 20 times per rendered frame.

46. A method according to claim 38, wherein each writing of said depth information written occasionally to said depth buffer in said host memory in dependence upon depth information in said graphics memory, is triggered by said host processor.

47. A method according to claim 38, wherein each writing of said depth information written occasionally to said depth buffer in said host memory in dependence upon depth information in said graphics memory, is performed by DMA.

48. Apparatus for use with a graphics system, said graphics system including graphics memory and a graphics processor, said graphics memory including an image buffer having an image buffer resolution, comprising:

a host memory and a host processor, said host memory being more quickly accessible than said graphics memory by said host processor;

means for providing to said graphics system a stream of geometric objects from a 3D model; and means for pre-culling objects from said stream by reference to a depth buffer in said host memory, said depth buffer having a coarser resolution than said image buffer resolution, said depth buffer being written occasionally in dependence upon depth information in said graphics memory.

49. Apparatus according to claim 48, wherein said 3D model is organized to include bounding boxes, and wherein said means for pre-culling comprises:

means for testing faces of a particular one of said bounding boxes against said depth buffer in said host memory; and means for culling from said stream of geometric objects all objects which are within said particular bounding box if said step of testing proves that said particular box is occluded.

50. Apparatus according to claim 48, wherein said 3D model is organized to include rooms-and-portals, and wherein said means for pre-culling comprises means for testing a particular one of said portals against said depth buffer in said host memory; and means for culling from said stream of geometric objects all objects which are beyond said particular portal if said step of testing proves that said particular portal is occluded.

51. Apparatus according to claim 48, wherein said depth buffer comprises at least a first level having said coarser resolution, and a second level having a resolution that is coarser than that of said first level.

52. Apparatus according to claim 48, comprising means for writing said depth buffer in said host memory in dependence upon depth information in said graphics memory at least once per rendered frame.

53. Apparatus according to claim 48, comprising writing means for writing into said depth buffer in said host memory, at least once per rendered frame, sufficient depth information developed in dependence upon depth information in said graphics memory to completely cover said image buffer.

54. Apparatus according to claim 53, wherein said writing means is triggered by said host processor.

55. Apparatus according to claim 53, wherein said writing means is triggered by said graphics system.

56. Apparatus according to claim 53, wherein said writing means includes an interface that supports direct memory access by said graphics system to said host memory.

57. Apparatus according to claim 48, comprising writing means for writing into said depth buffer in said host memory, at least 5 times per rendered frame, sufficient depth information developed in dependence upon depth information in said graphics memory to completely cover said image buffer.

58. Apparatus according to claim 48, comprising writing means for writing into said depth buffer in said host memory, at least 20 times per rendered frame, sufficient depth information developed in dependence upon depth information in said graphics memory to completely cover said image buffer.

59. Apparatus according to claim 58, wherein said writing means comprises a DMA controller.

60. Apparatus according to claim 48, further comprising said graphics system.

61. A system including a scene manager for accessing geometric objects, a geometric processor for transforming the geometric objects, and renderer for rendering transformed geometric objects into an output image, the scene manager connected to output geometric objects to the geometric processor and the geometric processor outputting transformed geometric objects to said renderer, the system comprising:

a first depth buffer connected to the renderer, said first depth buffer being a hierarchical depth buffer having a plurality of levels ranging from a finest level to a coarsest level, the finest level having a predetermined resolution;

a second depth buffer having a predetermined resolution that is coarser than said predetermined resolution of said finest level of said first depth buffer, said second depth buffer being more quickly accessible to said scene manager than is said first depth buffer;

a communication path from the first hierarchical depth buffer to said second depth buffer; and a controller which controls copying of depth values from said first depth buffer to said second depth buffer.

62. The system of claim 61, wherein said second depth buffer is a hierarchical depth buffer having a plurality of levels.

63. The system of claim 61, wherein said first depth buffer is not accessible to said scene manager.

* * * * *